US009588270B2

(12) United States Patent
Merrill et al.

(10) Patent No.: US 9,588,270 B2
(45) Date of Patent: *Mar. 7, 2017

(54) POST-FORMABLE MULTILAYER OPTICAL FILMS AND METHODS OF FORMING

(75) Inventors: William W. Merrill, White Bear Lake, MN (US); James M. Jonza, Woodbury, MN (US); Olester Benson, Jr., Woodbury, MN (US); Andrew J. Ouderkirk, Woodbury, MN (US); Michael F. Weber, Shoreview, MN (US); Janet T. Keller, Eagan, MN (US); Roger J. Stumo, Shoreview, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/344,770

(22) Filed: Jan. 6, 2012

(65) Prior Publication Data

US 2012/0105957 A1 May 3, 2012

Related U.S. Application Data

(63) Continuation of application No. 12/391,738, filed on Feb. 24, 2009, now abandoned, which is a
(Continued)

(51) Int. Cl.
*G02B 5/30* (2006.01)
*G02B 5/28* (2006.01)
(Continued)

(52) U.S. Cl.
CPC ................ *G02B 5/287* (2013.01); *B32B 7/02* (2013.01); *B32B 27/36* (2013.01); *B42D 25/29* (2014.10);
(Continued)

(58) Field of Classification Search
CPC ......... G02B 5/3083; G02B 5/32; G02B 5/305
(Continued)

(56) References Cited

U.S. PATENT DOCUMENTS 3,124,639 A 3/1964 Kahn
3,182,965 A 5/1965 Sluijters
(Continued)

FOREIGN PATENT DOCUMENTS

DE 4406426 8/1995
EP 0404463 12/1990
(Continued)

OTHER PUBLICATIONS

Alfrey, "Physical Optics of Iridescent Multilayered Plastic Films"; Polymer Engineering and Science, Nov. 1969, vol. 9, No. 6, pp. 400-404.

(Continued)

*Primary Examiner* — Ricky D Shafer
(74) *Attorney, Agent, or Firm* — Daniel J. Iden

(57) ABSTRACT

Articles including post-formed multilayer optical films with layers of at least one strain-induced birefringent material, methods of manufacturing such articles by post-forming multilayer optical films, and multilayer optical films that are particularly well-suited to post-forming operations are disclosed. The articles, methods and multilayer optical films of the present invention allow for post-forming of multilayer optical films including strain-induced index of refraction differentials while retaining the desired optical properties of the multilayer optical films.

6 Claims, 16 Drawing Sheets

10
12
14
no
Z
n1x
n1y
n1z
n2x
n2y
n2z
no
Y
X

Related U.S. Application Data continuation of application No. 10/883,059, filed on Jun. 30, 2004, now abandoned, which is a continuation of application No. 10/115,559, filed on Apr. 3, 2002, now Pat. No. 6,788,463, which is a continuation of application No. 09/126,917, filed on Jul. 31, 1998, now abandoned, which is a continuation-in-part of application No. 09/006,591, filed on Jan. 13, 1998, now Pat. No. 6,531,230, and a continuation-in-part of application No. 09/006,086, filed on Jan. 13, 1998, now Pat. No. 6,045,894.

(51) Int. Cl.
*G02B 5/32* (2006.01)
*B32B 7/02* (2006.01)
*B32B 27/36* (2006.01)
*B44F 1/14* (2006.01)
*G02B 5/08* (2006.01)
*B42D 25/29* (2014.01)
*B41M 3/14* (2006.01)

(52) U.S. Cl.
CPC .............. *B44F 1/14* (2013.01); *G02B 5/0841* (2013.01); *G02B 5/305* (2013.01); *G02B 5/3033* (2013.01); *G02B 5/3083* (2013.01); *G02B 5/32* (2013.01); *B41M 3/14* (2013.01); *Y10S 428/91* (2013.01); *Y10T 428/24479* (2015.01); *Y10T 428/24612* (2015.01); *Y10T 428/24628* (2015.01); *Y10T 428/24694* (2015.01); *Y10T 428/31504* (2015.04); *Y10T 428/31855* (2015.04)

(58) Field of Classification Search
USPC .......................... 359/489.01, 489.08, 489.12
See application file for complete search history.

(56) References Cited

U.S. PATENT DOCUMENTS 3,195,865 A 7/1965 Harder
3,213,753 A * 10/1965 Rogers .................... 359/489.16
3,438,691 A * 4/1969 Makas .................... 359/489.12
3,464,601 A 9/1969 Christensen
3,565,985 A 2/1971 Schrenk
3,576,707 A 4/1971 Schrenk
3,598,489 A 8/1971 Thomas
3,610,729 A 10/1971 Rogers
3,637,455 A 1/1972 Pearson
3,687,589 A 8/1972 Schrenk
3,711,176 A 1/1973 Alfrey
3,737,882 A 6/1973 Furuoya
3,759,647 A 9/1973 Schrenk
3,773,882 A 11/1973 Schrenk
3,801,429 A 4/1974 Schrenk
3,851,457 A 12/1974 Waters
3,858,977 A 1/1975 Baird
3,860,036 A 1/1975 Newman
3,884,606 A 5/1975 Schrenk
4,080,046 A 3/1978 Nishizaki
4,162,343 A 7/1979 Wilcox
4,249,011 A 2/1981 Wendling
4,329,382 A 5/1982 Truskolaski
4,446,305 A 5/1984 Rogers
4,476,168 A 10/1984 Aoyama
4,484,797 A 11/1984 Knop
RE31,780 E 12/1984 Cooper
4,515,837 A 5/1985 Cheng
4,520,189 A 5/1985 Rogers
4,521,588 A 6/1985 Rogers
4,525,413 A 6/1985 Rogers
4,526,466 A 7/1985 Sandercock
4,586,790 A * 5/1986 Umeda et al. ................ 349/102
4,647,157 A * 3/1987 Chiklis .......................... 349/96
4,705,356 A 11/1987 Berning
4,720,426 A 1/1988 Englert
4,735,869 A 4/1988 Morita
4,937,134 A 6/1990 Schrenk
5,084,351 A 1/1992 Philips
5,089,318 A 2/1992 Shetty
5,094,788 A 3/1992 Schrenk
5,094,793 A 3/1992 Schrenk
5,095,210 A 3/1992 Wheatley
5,103,337 A 4/1992 Schrenk
5,122,905 A 6/1992 Wheatley
5,122,906 A 6/1992 Wheatley
5,126,880 A 6/1992 Wheatley
5,149,578 A 9/1992 Wheatley
5,154,765 A 10/1992 Armanini
5,188,760 A 2/1993 Hikmet
5,211,878 A 5/1993 Reiffenrath
5,217,794 A 6/1993 Schrenk
5,233,465 A 8/1993 Wheatley
5,234,729 A 8/1993 Wheatley
5,235,443 A 8/1993 Barnik
5,262,894 A 11/1993 Wheatley
5,269,995 A 12/1993 Ramanathan
5,278,694 A 1/1994 Wheatley
5,294,657 A 3/1994 Melendy
RE34,605 E 5/1994 Schrenk
5,316,703 A 5/1994 Schrenk
5,319,478 A 6/1994 Funfschilling
5,339,198 A 8/1994 Wheatly
5,360,659 A 11/1994 Arends
5,389,324 A 2/1995 Lewis
5,437,931 A 8/1995 Tsai
5,448,404 A 9/1995 Schrenk
5,451,449 A 9/1995 Shetty
5,486,935 A 1/1996 Kalmanash
5,486,949 A 1/1996 Schrenk
5,510,171 A 4/1996 Faykish
5,540,978 A 7/1996 Schrenk
5,552,927 A 9/1996 Wheatley
5,568,316 A 10/1996 Schrenk
5,569,535 A 10/1996 Phillips
5,570,847 A 11/1996 Phillips
5,612,820 A 3/1997 Schrenk
5,628,950 A 5/1997 Schrenk
5,629,055 A 5/1997 Revol
5,629,093 A 5/1997 Bischof
5,644,432 A 7/1997 Doany
5,650,215 A 7/1997 Mazurek
5,683,774 A 11/1997 Faykish
5,684,633 A 11/1997 Lutz
5,686,979 A 11/1997 Weber
5,699,188 A 12/1997 Gilbert
5,721,603 A 2/1998 De Vaan
5,744,534 A 4/1998 Ishiharada
5,751,388 A 5/1998 Larson
5,767,935 A 6/1998 Ueda
5,770,283 A 6/1998 Gosselin
5,770,306 A 6/1998 Suzuki
5,783,120 A 7/1998 Ouderkirk
5,783,283 A 7/1998 Klein
5,793,456 A 8/1998 Broer
5,808,794 A 9/1998 Weber
5,825,542 A 10/1998 Cobb, Jr.
5,825,543 A 10/1998 Ouderkirk
5,882,774 A 3/1999 Jonza
5,999,317 A 12/1999 Whitney
6,012,820 A 1/2000 Weber
6,024,455 A 2/2000 O'Neill
6,045,894 A 4/2000 Jonza
6,049,419 A 4/2000 Wheatley
6,053,795 A 4/2000 Whitney
6,080,467 A 6/2000 Weber
6,082,876 A 7/2000 Hanson
6,096,247 A 8/2000 Ulsh
6,101,032 A 8/2000 Wortman
6,111,697 A 8/2000 Merrill
6,113,811 A 9/2000 Kausch
6,157,486 A 12/2000 Benson, Jr.

(56) References Cited

U.S. PATENT DOCUMENTS

| | | | | |
|---|---|---|---|---|
| 6,157,490 | A | 12/2000 | Wheatley | |
| 6,179,948 | B1 | 1/2001 | Merrill | |
| 6,207,260 | B1 | 3/2001 | Wheatley | |
| 6,256,002 | B1 | 7/2001 | Shinoda | |
| 6,256,146 | B1 | 7/2001 | Merrill | |
| 6,531,230 | B1 | 3/2003 | Weber | |
| 6,565,982 | B1 | 5/2003 | Ouderkirk et al. | |
| 6,569,515 | B2 | 5/2003 | Hebrink | |
| 6,667,095 | B2 | 12/2003 | Wheatley | |
| 6,749,427 | B1 | 6/2004 | Bretscher | |
| 6,788,463 | B2 | 9/2004 | Merrill | |
| 7,077,649 | B2 | 7/2006 | Bretscher | |
| 2005/0019530 | A1* | 1/2005 | Merrill et al. | 428/156 |
| 2009/0155540 | A1 | 6/2009 | Merrill | |

FOREIGN PATENT DOCUMENTS

| | | |
|---|---|---|
| EP | 0488544 | 6/1992 |
| EP | 0491551 | 6/1992 |
| EP | 0564925 | 10/1993 |
| EP | 0591055 | 4/1994 |
| EP | 0592284 | 4/1994 |
| EP | 0802034 | 2/2002 |
| FR | 2766199 | 1/1999 |
| JP | 11-142840 | 5/1999 |
| WO | WO 95-17303 | 6/1995 |
| WO | WO 95-17691 | 6/1995 |
| WO | WO 95-17692 | 6/1995 |
| WO | WO 95-17699 | 6/1995 |
| WO | WO 95-27919 | 10/1995 |
| WO | WO 96-19347 | 6/1996 |
| WO | WO 97-01440 | 1/1997 |
| WO | WO 97-01726 | 1/1997 |
| WO | WO 97-01774 | 1/1997 |
| WO | WO 97-07653 | 2/1997 |
| WO | WO 97-32224 | 9/1997 |
| WO | WO 97-32226 | 9/1997 |
| WO | WO 98-00469 | 1/1998 |
| WO | WO 99-36248 | 7/1999 |
| WO | WO 99-36256 | 7/1999 |
| WO | WO 99-36262 | 7/1999 |
| WO | WO 00-07046 | 2/2000 |

OTHER PUBLICATIONS

ASTM E1164-94 "Standard Practice for Obtaining Spectrophotometric Data for Object Color Evaluation"; 1994, pp. 783-789.

ASTM E308-96 (replaces E308-95) "Standard Practice for Computing the Colors of Objects by Using the CIE System"; 1996, pp. 682-712.

Boese, "Chain Orientation and Anisotropies in Optical and Dielectric Properties in Thin Films of Stiff Polyimides", Journal of Polymer Science: Part B: Polymer Physics, 1992, vol. 30, pp. 1321-1327.

Born, Principles of Optics, Electromagnetic Theory of Propagation, Interference and Diffraction of Light, 6th Ed, 66 (1980).

Padibjo, "A structural study of the tensile drawing behaviour of poly (ethylene terephthalate)," Polymer, Sep. 1983, vol. 24, pp. 1103-1112.

Radford, "Reflectivity of Iridescent Coextruded Multilayered Plastic Films"; Polyer Engineering and Science, May 1973, vol. 13, No. 3, pp. 216-221.

Rancourt;—"Introduction of Optical Thin Films", Optical Thin Films—Users' Handbook; 1-23 (1987).

Salem, "Crystallization during hot-drawing of poly (ethylene terephthalate) film: influence of the deformation mode," Polymer, Sep. 1995, vol. 36, No. 18, pp. 3605-3608.

Salem, "Crystallization during hot-drawing of poly (ethylene terephthalate) film: influence of temperature on strain-rate/draw-time superposition," Polymer, Nov. 1994, vol. 35, No. 4, pp. 771-776.

Salem, "Crystallization kinetics during hot-drawing of poly (ethylene terephthalate) film: strain-rate/draw-time superposition," Polymer, 1992, vol. 33, No. 15, pp. 3189-3192.

Salem, "Development of crystalline order during hot-drawing of poly (ethylene terephthalate) film; influence of strain rate," Polymer, 1992, vol. 33, No. 15, pp. 3182-3188.

Schrenk, "Nanolayer polymeric optical films", Tappi Journal, Jun. 1992, pp. 169-173.

Songer, "Multilayer Coatings Aid Display Design", Photonics Spectra, Nov. 1994, vol. 28, No. 11, pp. 88-89.

Valasek; "Introduction to Theoretical and Experimental Optics"; 124-128; 199-203 (1949).

Van Renesse, Optical Document Security, Artech House, ISBN-0-89006-619-1, 251-253 (1994).

Ward, "The Role of Molecular Networks and Thermally Activated Processes in the Deformation Behavior of Polyers," Polymer Engineering and Science, Jul. 1984, vol. 24 No. 10, pp. 724-736.

U.S. Appl. No. 08/472,241, filed Jun. 7, 1995, entitled Method for Manufacturing Large-Sized Quartz Glass Tube, (now abandoned).

* cited by examiner

POST-FORMABLE MULTILAYER OPTICAL FILMS AND METHODS OF FORMING

CROSS REFERENCE TO RELATED APPLICATIONS

This application is a continuation of U.S. patent application Ser. No. 12/391,738, filed on Feb. 24, 2009, published as U.S. Patent Application Publication No. 2009/0155540, now abandoned, which is a continuation of U.S. patent application Ser. No. 10/883,059, filed Jun. 30, 2004, now abandoned, which is a continuation of U.S. patent application Ser. No. 10/115,559, filed on filed Apr. 3, 2002, now issued as U.S. Pat. No. 6,788,463, which is a continuation of U.S. patent application Ser. No. 09/126,917, filed Jul. 31, 1998, now abandoned, which is a continuation-in-part of U.S. patent application Ser. No. 09/006,591, filed on Jan. 13, 1998, now issued as U.S. Pat. No. 6,531,230, and a continuation-in-part of U.S. patent application Ser. No. 09/006,086, filed on Jan. 13, 1998, now issued as U.S. Pat. No 6,045,894, and incorporated herein by reference.

FIELD OF THE INVENTION

The present invention relates to the field of birefringent multilayer optical films. More particularly, the present invention relates to post-formable multilayer optical films including at least one birefringent material and methods of manufacturing post-formed articles from multilayer optical films.

BACKGROUND OF THE INVENTION

Conventional methods of providing reflective objects typically include the use of metal or substrates coated with thin layers of metals. Forming the articles completely of metal is typically expensive and may also suffer from other disadvantages such as increased weight, etc. Metal coated articles are typically plastic substrates coated with a reflective metallic layer by vacuum, vapor or chemical deposition. These coatings suffer from a number of problems including chipping or flaking of the metallic coating, as well as corrosion of the metallic layer.

One approach to addressing the need for reflective objects has been the use of multilayer articles of polymers such as those discussed in U.S. Pat. No. 5,103,337(Schrenk et al.); U.S. Pat. No. 5,217,794 (Schrenk); U.S. Pat. No. 5,684,633 (Lutz et al.). These patents describe articles, typically films or sheets, that include multiple layers of polymers having different indices of refraction and, as a result, reflect light incident on the films. Although most of the listed patents recite that the articles are post-formable, only a few of them actually address the modifications needed to ensure that the articles retain their optical properties after forming. Among those modifications are the use of discontinuous layers (U.S. Pat. No. 5,217,794) and increasing the number of layers in the article or film (U.S. Pat. No. 5,448,404). Multilayer articles including layers of birefringent materials, their optical properties and methods of manufacturing them are disclosed in, e.g., PCT Publication Nos. WO 97/01774 and WO 95/17303. This class of articles includes alternating layers of a birefringent material and a different material in which the refractive index differential between the alternating layers is caused, at least in part, by drawing of the article, typically provided in the form of a film. That drawing causes the refractive index of the birefringent material to change, thereby causing the inter-layer refractive index differential to change. Those strain-induced refractive index differentials provide a number of desirable optical properties including the ability to reflect light incident on the films from a wide range of angles, high reflectivity over broad ranges of wavelengths, the ability to control the reflected and transmitted wavelengths, etc. For simplicity, multilayer articles including one or more layers of birefringent materials will be referred to below as "multilayer optical films."

None of the known multilayer articles and multilayer optical films and the patents/publications describing them, however, address the problems associated with post-forming multilayer optical films. As discussed above, multilayer optical films including alternating layers of materials including at least one birefringent material rely on strain-induced refractive index differentials.

Because multilayer optical films rely on refractive index differentials developed by drawing, post-forming of multilayer optical films poses a number of problems. The additional strain caused during the post-forming processes can affect the refractive index differentials in the multilayer optical films, thereby affecting the optical properties of the multilayer optical films. For example, a multilayer optical film designed to reflect light of one polarization orientation and transmit light of the orthogonal polarization orientation may be altered during post-forming such that it reflects light with both polarization orientations. In addition, many post-forming processes involve the use of heat during forming, and that heat may alter the strain-induced crystallization that serves as the basis for the refractive index differentials in many multilayer optical films. As a result, the multilayer optical film may exhibit altered optical characteristics due to the changed refractive index differentials. Furthermore, some multilayer optical films including strain-induced birefringent layers may be stretched to levels at or near their rupture or breaking points during manufacturing. As a result, any further processing that introduces additional strain may well result in rupture of the multilayer optical films.

SUMMARY OF THE INVENTION

The present invention provides articles including post-formed multilayer optical films including layers of at least one strain-induced birefringent material, methods of manufacturing such articles by post-forming multilayer optical films, and multilayer optical films that are particularly well-suited to post-forming operations. The articles, methods and multilayer optical films of the present invention allow for post-forming of multilayer optical films including strain-induced index of refraction differentials while retaining the desired optical properties of the multilayer optical films.

In one aspect, the present invention provides an article including multilayer optical film having an optical stack including a plurality of layers, the layers comprising at least one birefringent polymer and at least one different polymer, wherein the optical stack includes a strain-induced index of refraction differential along at least a first in-plane axis, and further wherein the thickness of the optical stack varies non-uniformly over the optical stack.

In another aspect, the present invention provides an article including multilayer optical film having an optical stack including a plurality of layers, the layers including at least one birefringent polymer and at least one different polymer, wherein the optical stack includes a strain-induced index of refraction differential along a first in-plane axis and substantially the entire optical stack reflects at least about 85% of light of desired wavelengths that is polarized along the first in-plane axis, and further wherein the thickness of the optical stack varies by at least about 10% or more.

In another aspect, the present invention provides an article including multilayer optical film having an optical stack including a plurality of layers, the layers including at least one birefringent polymer and at least one different polymer, wherein the optical stack includes a strain-induced index of refraction differential along a first in-plane axis, and further wherein the optical stack defines first and second major surfaces, the first major surface including at least one depressed area formed therein.

In another aspect, the present invention provides an article including multilayer optical film having an optical stack including a plurality of layers, the layers including at least one birefringent polymer and at least one different polymer, wherein the optical stack includes a strain-induced index of refraction differential along a first in-plane axis, wherein the thickness of the optical stack varies; and a substrate attached to the multilayer optical film.

In another aspect, the present invention provides a method of manufacturing an article including a multilayer optical film by providing a multilayer optical film having an optical stack including a plurality of layers, the layers including at least one birefringent polymer and at least one different polymer, wherein the optical stack exhibits a strain-induced index of refraction differential along a first in-plane axis, and further wherein the optical stack has a first thickness; and permanently deforming the optical stack from the first thickness to a second thickness, wherein the optical stack exhibits a post-formed strain-induced index of refraction differential along the first in-plane axis after deformation.

In another aspect, the present invention provides a multilayer optical film having a sequence of alternating layers of a birefringent polymer and a different polymer, the birefringent polymer including PEN, wherein the birefringent polymer exhibits a total polarizability difference in a range of from at least about 0.002 up to about 0.018, and further wherein the birefringent polymer exhibits a maximum in-plane birefringence of about 0.17 or less.

In another aspect, the present invention provides a multilayer optical film having a sequence of alternating layers of a birefringent polymer and a different polymer, the birefringent polymer including PET, wherein the birefringent polymer exhibits a total polarizability difference in a range of from at least about 0.002 up to about 0.030, and further wherein the birefringent polymer exhibits a maximum in-plane birefringence of about 0.11 or less.

In another aspect, the present invention provides a method of manufacturing an article including a multilayer optical film by providing a multilayer optical film with an optical stack that includes a plurality of layers, the layers including at least one birefringent polymer and at least one different polymer, wherein the optical stack includes a strain-induced index of refraction differential along at least a first in-plane axis; and corrugating the optical stack to cause a change in its visual appearance.

In another aspect the present invention provides an article including a multilayer optical film having an optical stack that includes a plurality of layers, the layers including at least one birefringent polymer and at least one different polymer, wherein the optical stack includes a strain-induced index of refraction differential along at least a first in-plane axis, and further wherein the optical stack has a corrugated configuration.

These and other features and advantages of the present invention are discussed below.

DETAILED DESCRIPTION OF ILLUSTRATIVE EMBODIMENTS OF THE INVENTION

Figure 1:
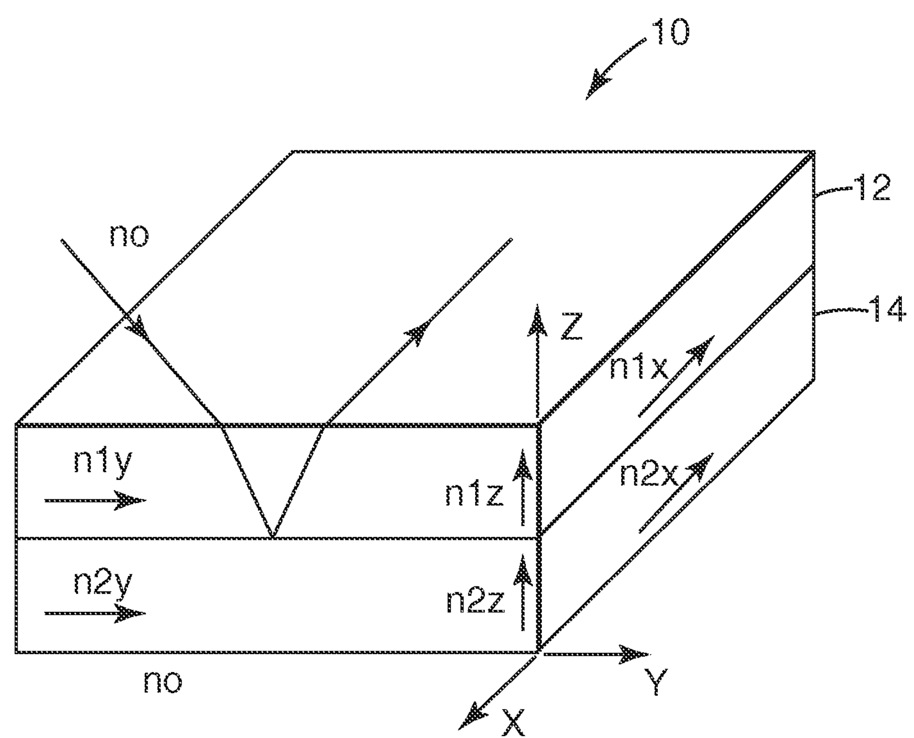
FIG. 1 is a schematic diagram of one multilayer optical film according to the present invention.

The present invention is directed at articles including post-formed multilayer optical films including layers of at least one strain-induced birefringent material, methods of manufacturing such articles by post-forming multilayer optical films, and multilayer optical films that are particularly well-suited to post-forming operations. Post-forming of multilayer optical films presents problems because most, if not all, post-forming processes result in deformation of the film from its manufactured state. Those deformations can adversely affect the optical and mechanical properties of the multilayer optical film.

While the present invention is frequently described herein with reference to the visible region of the spectrum, various embodiments of the present invention can be used to operate at different wavelengths (and thus frequencies) of electromagnetic radiation. For simplicity, the term "light" will be used herein to refer to any electromagnetic radiation (regardless of the wavelength/frequency of the electromagnetic radiation) capable of being reflected by the multilayer optical films of the present invention. For example, the multilayer optical films may be capable of reflecting very high, ultrahigh, microwave and millimeter wave frequencies of electromagnetic radiation. More preferably, the term "light" will refer to electromagnetic radiation including the ultraviolet through the infrared spectrum (including the visible spectrum). Even more preferably, "light" as used in connection with the present invention can be defined as electromagnetic radiation in the visible spectrum.

Furthermore, the multilayer optical films and processes of post-forming multilayer optical films according to the present invention rely on strain-induced index of refraction differentials between layers in the films. Typically, those differentials will not be expressed herein numerically. Where they are discussed with reference to specific indices of refraction, however, it should be understood that the values used are determined using light having a wavelength of 632.8 nanometers.

As used herein, the terms "reflection" and "reflectance" and variations thereof refer to the reflectance of light rays from a surface. Similarly, the terms "transmission" and "transmittance" and variations thereof are used herein in reference to the transmission of light through a surface, optical stack, film, etc. Except where dyes or colorants are intentionally added, the optical stacks of the present invention preferably exhibit low or minimal absorption losses (typically less than 1% of incident light), and substantially all of the incident light that is not reflected from the surface of an optical stack will be transmitted therethrough.

As used herein, the term "extinction ratio" is defined to mean the ratio of total light transmitted in one polarization to the light transmitted in an orthogonal polarization.

Multilayer Optical Films

Many multilayer optical films used in connection with the present invention and methods of manufacturing them are described in U.S. Pat. No. 5,882,774 (Jonza et al.); U.S. Pat. No. 6,101,032 (Ouderkirk); U.S. Pat. No. 6,157,490 (Wheatley et al.); U.S. Pat. No. 6,207,260 (Wheatley et al.); U.S. Ser. No. 09/006,288 (filed on Jan. 13, 1998, now abandoned); U.S. Pat. No. 6,179,948 (Merrill et al.); and U.S. Ser. No. 09/006,591 (filed on Jan. 13, 1998); as well as in various other patents and patent applications referred to herein. Briefly, however, multilayer optical films as used herein refers to optical films including at least one birefringent material provided in contiguous layers with at least one other material such that desired strain-induced refractive index differentials are provided between the layers making up the films. The multilayer optical films preferably exhibit relatively low absorption of incident light, as well as high reflectivity for both off-axis and normal light rays.

The reflective properties generally hold whether the films are used for pure reflection or reflective polarization of light. The unique properties and advantages of multilayer optical films provides an opportunity to design highly reflective post-formed articles that exhibit low absorption losses. One multilayer optical film used in the methods and articles of the present invention is illustrated in FIG. 1 and includes a multilayer stack 10 having alternating layers of at least two materials 12 and 14.

The multilayer optical films according to the present invention all include an optically active portion that will be referred to herein as the "optical stack," i.e., those layers that provide the desired reflective properties of the multilayer optical films by virtue of the refractive index differentials within the optical stack. Other layers and/or materials may be provided in addition to the optical stack. For example, skin layers may be provided on the outside of the optical stack to improve the mechanical properties of the films or provide some other desired property or properties including secondary optical effects such as retardation or polarization conversion, but the bulk of the reflective optical characteristics of the films are determined by the properties of the optical stacks.

Although only two layers 12 and 14 are illustrated, it will be understood that the optical stack of the multilayer optical film 10 can include tens, hundreds or thousands of layers, and each layer can be made from any of a number of different materials, provided that at least one of the materials is birefringent. The characteristics which determine the choice of materials for a particular optical stack depend upon the desired optical performance of the film. The optical stack may contain as many materials as there are layers in the stack. For ease of manufacture, however, preferred optical thin film stacks contain only a few different materials. Some considerations relating to the selection of materials for the optical stacks of multilayer optical films of the present invention are discussed below in the section entitled "Materials Selection."

The boundaries between the materials, or chemically identical materials with different physical properties, within the stack can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Further considerations relating to the selection of materials and manufacturing of optical films can be obtained with reference to U.S. Pat. No. 5,882,774 (Jonza et al.); U.S. Pat. No. 6,157,490 (Wheatley et al.); U.S. Pat. No. 6,207,260 (Wheatley et al.); U.S. Ser. No. 09/006,288 (filed on Jan. 13, 1998, now abandoned); U.S. Pat. No. 6,179,948 (Merrill et al.); and U.S. Ser. No. 09/006,591 (filed on Jan. 13, 1998).

The preferred optical stack is comprised of low/high index pairs of film layers, wherein each low/high index pair of layers has a combined optical thickness of ½ the center wavelength of the band it is designed to reflect at normal incidence. The optical thickness is the physical layer thickness multiplied by the index of refraction of the material in the layer for a given wavelength and polarization plane cross-section. Stacks of such films are commonly referred to as quarterwave stacks.

As indicated above, at least one of the materials is birefringent, such that the index of refraction (n) of the material along one direction is affected by stretching the material along that direction. The indices of refraction for each layer are $n1x$, $n1y$, and $n1z$ for layer 12, and $n2x$, $n2y$, and $n2z$ for layer 14. For the purposes of the present invention, the x and y axes will generally be considered to lie within the plane of the film and be perpendicular to each other. The z axis will be perpendicular to both the x and y axes and will generally be normal to the plane of the film.

The stack 10 can be stretched in two (typically) perpendicular in-plane directions to biaxially orient the birefringent material in the layer 14, or the stack 10 may be stretched in only one in-plane direction (uniaxially oriented). By stretching the multilayer stack over a range of uniaxial to biaxial orientation, a film can be created with a range of reflectivities for differently oriented incident light. The multilayer stack can thus be made useful as reflective polarizers or mirrors.

If the stack 10 is stretched in the x and y directions, each adjacent pair of layers 12 and 14 exhibit refractive index differentials between layers in each of the two mutually perpendicular in-plane directions (x & y). The values of the refractive index differentials can be represented by $\Delta x$ (which is equal to $(n1x-n2x)$ where $n1x$ is greater than $n2x$) and $\Delta y$ (where $\Delta y=n1y-n2y$). It will be understood that a reflective polarizer will preferably exhibit a $\Delta x$ in stack 10 that is sufficiently high to achieve the desired reflectivity and, further, that the stack 10 will exhibit a $\Delta y$ that is sufficiently low such that a substantial percentage of light with coincident polarization is transmitted.

An important parameter for improving the reflectivity of multilayer optical films at oblique angles of incidence is the control of $n1z$ and $n2z$ in relation to the other indices. First assume that $n1x$ is the larger of $n1x$ and $n2x$ such that $\Delta x$ is positive and $|\Delta x|>|\Delta y|$. To increase the reflectivity of the multilayer optical stack at oblique angles of incidence compared to normal incidence, it may be preferred that $\Delta z<\Delta x$. More preferably, $\Delta z\cong 0$, and even more preferably $\Delta z<0$.

For reflective mirror films, the desired average transmission for light of each polarization and plane of incidence generally depends upon the intended use of the reflective film. The average transmission at normal incidence for any polarization direction for a narrow bandwidth reflective film, e.g., a 100 nanometer bandwidth within the visible spectrum is desirably less than 30%, preferably less than 20% and more preferably less than 10%. A desirable average transmission along each polarization direction at normal incidence for a partial reflective film ranges anywhere from, for example, 10% to 50%, and can cover a bandwidth of anywhere between, for example, 100 nanometers and 450 nanometers, depending upon the particular application.

For a high efficiency reflective mirror film, average transmission at normal incidence for any polarization direction over the visible spectrum (400-700 nm) is desirably less than 10%, preferably less than 5%, more preferably less than 2%, and even more preferably less than 1%. The average transmission at 60 degrees from the normal axis for any plane of incidence and polarization direction for a high efficiency reflective film from 400-700 nanometers is desirably less than 10%, preferably less than 5%, more preferably less than 2%, and even more preferably less than 1%.

In addition, asymmetric reflective films may be desirable for certain applications. In that case, average transmission for one polarization direction may be desirably less than, for example, 50%, while the average transmission along another polarization direction may be desirably less than, for example 20%, over a bandwidth of, for example, the visible spectrum (400-700 nanometers), or over the visible spectrum and into the near infrared (e.g., 400-850 nanometers).

In summary, multilayer optical films used in the methods and articles of the present invention include a multilayer stack 10 having alternating layers of at least two diverse polymeric materials 12 and 14, at least one of which preferably exhibits birefringence, such that the index of refraction of the birefringent material is affected by stretching. The adjacent pairs of alternating layers preferably exhibit at least one strain-induced refractive index differential ($\Delta x$, $\Delta y$) along at least one of two perpendicular in-plane axes as discussed briefly below. The selection of materials and/or the orientation process conditions can be used to control the value of $\Delta z$ in relation to the values of $\Delta x$ and $\Delta y$.

By stretching the multilayer stack over a range of uniaxial to biaxial orientation, a multilayer optical film can be created with a range of reflectivities for differently oriented plane polarized light along with the plane of incidence or polarization parallel to various film axes (typically corresponding to the stretch directions) based on the values of $\Delta x$, $\Delta y$, and $\Delta z$. Preferably, those refractive index differentials are generally uniform throughout the film to provide uniform optical properties throughout the film. Variations in those refractive index differentials that fall below desired minimum values for the desired optical characteristics may cause undesirable variations in the optical properties of the films.

Although the articles including post-formed multilayer optical film, the methods of producing those articles, and the post-formable multilayer optical films are often described or explained below with reference to multilayer optical films designed to exhibit broadband reflectance over the visible spectrum, it will be understood that the same concepts could apply to articles, methods and films that exhibit reflectance of light having any desired range or ranges of wavelengths and any desired polarizing qualities. In other words, the present invention is useful with both polarizing multilayer optical films (that preferentially reflect light of one polarization orientation while transmitting light with the orthogonal polarization orientation), as well as multilayer optical films that provide uniform properties for light having any polarization orientation.

Other optical films suitable for use in the post-forming process of the present invention include, for example, multilayer films and films comprised of a blend of immiscible materials having differing indices of refraction. Examples of suitable multilayer films include polarizers, visible and infrared mirrors, and color films such as those described in Patent Publications WO 95/17303, WO 96/19347, and WO 97/01440; filed applications having U.S. Pat. No.; 6,531,230 (Weber et al.), U.S. Pat. No. 6,045,894 (Jonza et al.), U.S. Pat. No. 5,103,337(Schrenk), U.S. Pat. No. 5,122,905 (Wheatley et al), U.S. Pat. No. 5,122,906 (Wheatley), U.S. Pat. No. 5,126,880 (Wheatley), U.S. Pat. No. 5,217,794 (Schrenk), U.S. Pat. No. 5,233,465 (Schrenk), U.S. Pat. No. 5,262,894 (Wheatley), U.S. Pat. No. 5,278,694 (Wheatley), U.S. Pat. No. 5,339,198 (Wheatley), U.S. Pat. No. 5,360,659 (Arends), U.S. Pat. No. 5,448,404 (Schrenk), U.S. Pat. No. 5,486,949 (Schrenk) U.S. Pat. No. 4,162,343 (Wilcox), U.S. Pat. No. 5,089,318 (Shetty), U.S. Pat. No. 5,154,765 (Armanini), U.S. Pat. No. 3,711,176 (Alfrey, Jr. et al.); and Reissued U.S. Pat. No. RE 31,780 (Cooper) and U.S. Pat. No. RE 34,605 (Schrenk), the contents of which are incorporated herein by reference. Examples of optical films comprising immiscible blends of two or more polymeric materials include blend constructions wherein the reflective and transmissive properties are obtained from the presence of discontinuous polymeric regions, such as the blend mirrors and polarizers as described in Patent Publication WO 97/32224, the contents of which is incorporated herein by reference. Preferred films are multilayer films having alternating layers of a birefringent material and a different material such that there is a refractive differential between the alternating layers. Especially preferred are multilayer films wherein the birefringent material is capable of stress-induced birefringence, wherein the refractive index differential between the alternating layers is caused, at least in part, by drawing the film. The drawing or similar forming process causes the refractive index of the birefringent material to change, thereby causing the inter-layer refractive index differential to change. Those strain-induced refractive index differentials provide a number of desirable optical properties, including the ability to reflect light incident on the films from a wide range of angles, high reflectivity over broad ranges of wavelengths, the ability to control the reflected and transmitted wavelengths, etc.

Post-Forming of Optical Films

As used in connection with the present invention, post-forming can include a variety of processes designed to produce articles having a variety of shapes different from the smooth, planar-surfaced film shape of the multilayer optical film as manufactured. Preferred manufacturing processes involve casting or otherwise forming the film, followed by stretching the film in one direction for a uniaxially stretched film. If the film is to be biaxially stretched, it is typically stretched in both the longitudinal (i.e., machine) direction and in the cross-web direction although any two directions may be used (preferably two generally perpendicular directions). Both uniaxially and biaxially stretched multilayer optical films are manufactured as generally smooth, planar films with caliper or thickness variations of about ±5% or less as manufactured.

Post-forming, as discussed with respect to the present invention, involves further processing of the optical stacks in the multilayer optical films to obtain some permanent deformation in the optical stack. The deformation will preferably involve thinning of the optical stack and it may also involve deforming at least one surface of the film from the uniformly smooth, planar-surfaced film shape in which it is manufactured.

Because the deformations may cause the planarity of the optical stack to be disrupted, it should be understood that, where discussed, the in-plane directions are considered to be relative to a localized area of the optical stack or a point on the optical stack. For a curved optical stack, the in-plane axes can be considered to lie in a plane defined by the tangent lines formed at a particular point on the optical stack. The z-axis would then be perpendicular to that plane.

Post-forming may also include embossing in which the optical layers of the multilayer optical film, i.e., those layers responsible for the reflective properties of the multilayer optical film, are deformed to produce a change in the optical properties of the film. Embossing that provides a textured surface to a skin layer without significantly affecting the optical properties of the optical layers within the multilayer optical film is not considered post-forming within the meaning of that term as used herein. Embossing of a multilayer colored mirror films has been discussed in, e.g., U.S. patent application Ser. No. 08/999,624 (now abandoned) and U.S. Pat. No. 6,045,894 (Jonza et al.).

As can be seen in the embodiments discussed below, post-formed articles are produced by deforming a generally smooth, planar-surfaced film or sheet material to an article having three-dimensional characteristics. Articles including post-formed multilayer optical film can include post-formed multilayer optical film having relatively small deformations such as those experienced as a result of embossing the optical layers of the multilayer optical film, up to larger scale deformations such as thermoformed multilayer optical film used in, e.g., a deep lamp cavity, having a high aspect ratio (i.e., depth to width ratio).

Post-forming operations will typically, but not necessarily, employ heat to improve the working qualities of the multilayer optical film. The post-forming processes may also employ pressure, vacuum, molds, etc. to further improve the working qualities of the multilayer optical film, as well as increase the throughput of the process. For example, one typical post-forming method is thermoforming, including the various forms of vacuum or pressure molding/forming, plug molding, etc. Post-forming may also include re-drawing or stretching films or portions/areas of films in planar directions or stretching the films into non-planar or curved shapes.

It may be helpful to further describe post-forming in terms of the amount of draw induced in the optical stack. In general, post-forming can involve a texturing of the optical stack, shallow drawing of the optical stack, and deep drawing of the optical stack. In the cases where the post-forming involves texturing and/or shallow drawing, it may be possible to use both fully drawn and underdrawn multilayer optical films (as described below) to perform the methods because the draw ratios to be experienced may be relatively small. When performing deep draws, however, it may be advantageous to use underdrawn optical stacks because of their increased extensibility as compared to fully-drawn multilayer optical films. Some exemplary post-forming processes and the articles manufactured thereby are presented below.

One approach to characterizing deformation of the optical stack in a post-formed multilayer optical film according to the present invention is depicted in FIGS. 2 and 2A-2C. The optical stack 20 includes a first major side 24 and a second major side 26 (see FIG. 2A). Also illustrated are selected areas 22 in which the optical stack 20 has been deformed. The selected areas 22 are depicted as being substantially uniform in size and arranged in regular, repeating pattern. It will however, be understood that the selected areas 22 may be non-uniform and/or provided in pattern that irregular/non-repeating.

Figure 2:
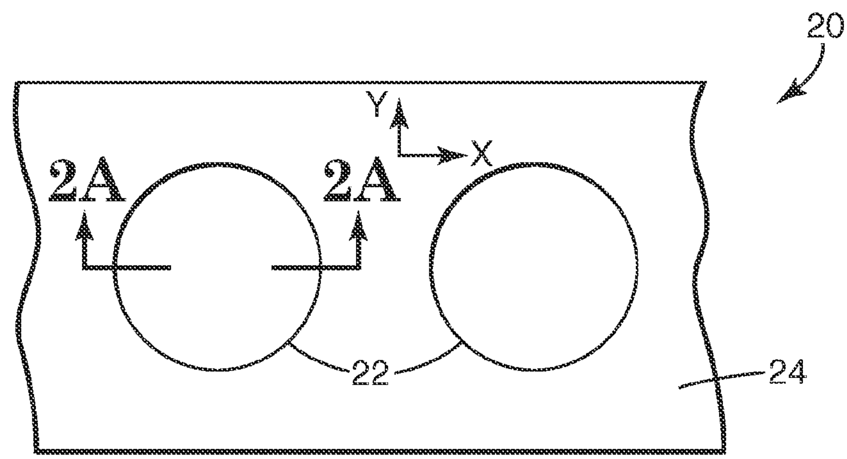
FIG. 2 is a plan view of a portion of one post-formed multilayer optical film according to the present invention including areas deformed along two in-plane directions.
Figure 2A:
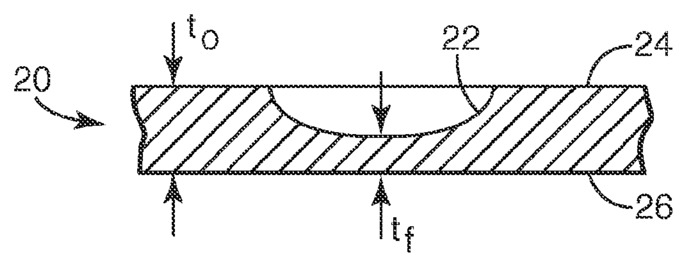
FIG. 2A is an enlarged partial cross-sectional view of the post-formed multilayer optical film of FIG. 2 taken along line 2A-2A.

One of the selected areas 22 and the surrounding optical stack 20 is seen in the enlarged, partial cross-sectional view of FIG. 2A. The result of the post-forming is that the thickness of the optical stack 20 varies. One of the ways in which that variation can manifest itself is that each of the selected areas 22 can form a depression in the otherwise generally smooth, planar first major side 24 of the optical stack 20. This post-forming may be considered as one example of texturing, i.e., causing deformations in one surface 24 of the optical stack 20 that do not necessarily find any corresponding deformation on the opposite surface 26 of the optical stack 20. Texturing does, however, differ from embossing of skin layers in that the optical stack 20 is itself deformed.

Figure 2B:
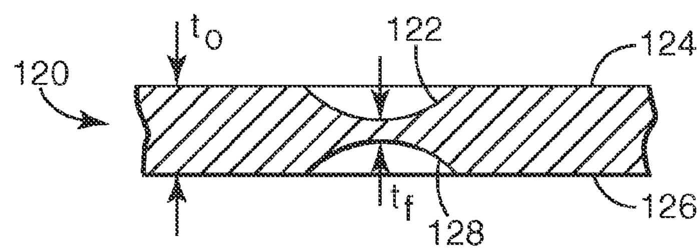
FIGS. 2B and 2C are enlarged partial cross-sectional views of alternative post-formed multilayer optical films deformed along two in-plane directions.

Another manifestation of the thickness variations in an optical stack 120 is illustrated in FIG. 2B where both the first and second major sides 124 and 126 are deformed in selected areas 122 and 128. Like selected area 122 on the first major side 124, selected area 128 on the second major side 126 is also formed as a depression in the otherwise generally smooth planar second major side 126. This is one example of a shallow draw that could be caused by pressure or by strain.

Figure 2C:
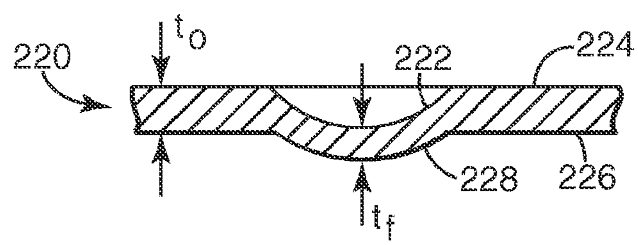

Yet another manifestation of the thickness variations in an optical stack 220 is illustrated in FIG. 2C where both the first and second major sides 224 and 226 are deformed in selected areas 222 and 228. While selected areas 222 are formed as depressions on the first major side 224, the selected area 227 on the second major side 226 is formed as a raised area extending outwards from the otherwise generally smooth, planar second major side 226. As depicted, it may be preferred that the raised area 228 on the second major side 226 be located opposite the depressed area 222 on the first major side 224.

The post-forming result depicted in FIG. 2C is another example of what could be considered a shallow draw, i.e., deformation of the optical stack 220 in the opposing sides 224 and 226 of the optical body 220.

Figure 3:
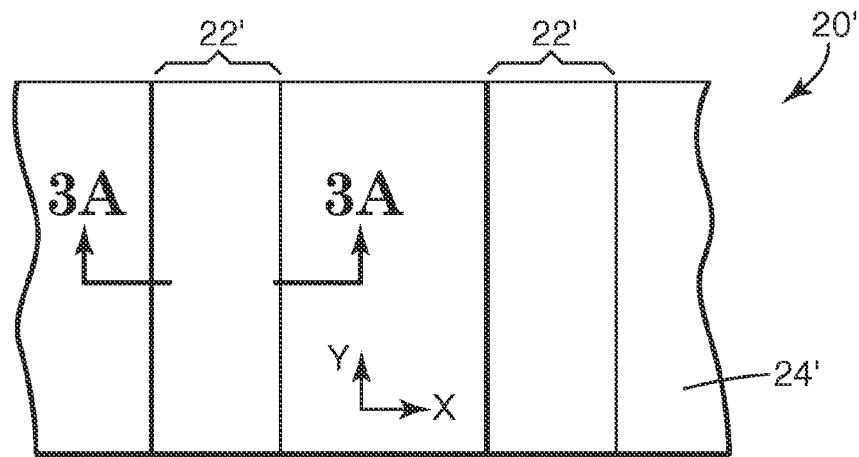
FIG. 3 is a plan view of a portion of one post-formed multilayer optical film according to the present invention including areas deformed along one in-plane direction.

FIG. 3 and cross-sectional views 3A-3C illustrate an alternative embodiment of a post-formed multilayer optical film according to the present invention. The optical stack 20' includes a first major side 24' and a second major side 26' (see FIG. 3A). Also illustrated are selected areas 22' in which the optical stack 20' has been deformed. The selected areas 22' are depicted as being substantially uniform in size. It will however, be understood that the selected areas 22' may be non-uniform.

Referring back to FIG. 2, the selected areas 22 of optical stack 20 are deformed along both in-plane axes (x & y). In contrast, the selected areas 22' of optical stack 20' are preferably deformed along only one in-plane axis (the x axis in FIG. 3). If the optical stack 20' is designed to operate as a reflective polarizer in the deformed areas 22', it may be desirable to deform those areas in the direction of maximum index difference. That should reduce post-forming extension in the matched refractive index direction. As a result, the reflective performance of the polarizing optical stack 20' may be better maintained and, in some cases, increased extension along the proper direction may increase the desired reflectivity of the optical stack 20'.

Figure 3A:
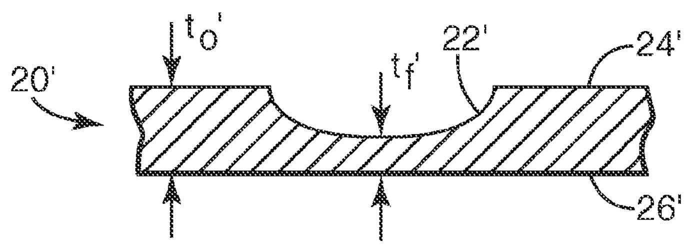
FIG. 3A is an enlarged partial cross-sectional view of the post-formed multilayer optical film of FIG. 3 taken along line 3A-3A.

One of the selected areas 22' and the surrounding optical stack 20' is seen in the enlarged, partial cross-sectional view of FIG. 3A. The result of the post-forming is that the thickness of the optical stack 20' varies. One of the ways in which that variation can manifest itself is that each of the selected areas 22' can form a depression in the otherwise generally smooth, planar first major side 24' of the optical stack 20'.

Figure 3B:
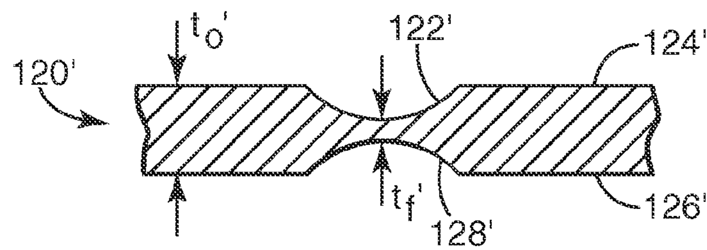
FIGS. 3B and 3C are enlarged partial cross-sectional views of alternative post-formed multilayer optical films deformed along one in-plane direction.

Another manifestation of the thickness variations in an optical stack 120' is illustrated in FIG. 3B where both the first and second major sides 124' and 126' are deformed in selected areas 122' and 128'. Like selected area 122' on the first major side 124', selected area 128' on the second major side 126' is also formed as a depression in the otherwise generally smooth, planar second major side 126'.

Figure 3C:
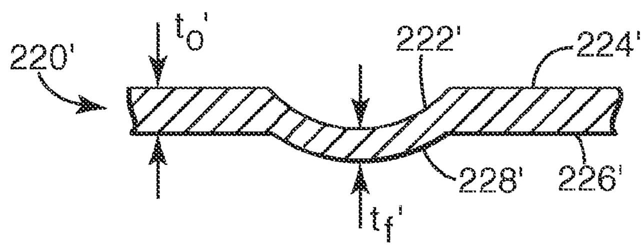

Yet another manifestation of the thickness variations in an optical stack 220' is illustrated in FIG. 3C where both the first and second major sides 224' and 226' are deformed in selected areas 222' and 228'. While selected areas 222' are formed as depressions on the first major side 224', the selected area 227' on the second major side 226' is formed as a raised area extending outwards from the otherwise generally smooth, planar second major side 226'. As depicted, it may be preferred that the raised area 227' on the second major side 226' be located opposite the depressed area 222' on the first major side 224'.

The deformations illustrated in FIGS. 2A-2C and 3A-3C can be characterized by the ratio of the thickness $t_o$ in the undeformed portions of the optical stacks to the thickness $t_f$ of the deformed portions of the optical stacks. Both of those thicknesses are preferably measured between the major surfaces of the optical stacks, i.e., the thickness of any skin layers is not considered. Typically, it may be desirable that the ratio $t_o$:$t_f$ be at least about 1.1:1 or greater. In some cases, it is desirable that the ratio $t_o$:$t_f$ be at least about 1.5:1 or greater, more preferably at least about 1.75:1 or greater, and even more preferably at least about 2:1 or greater.

Figure 4:
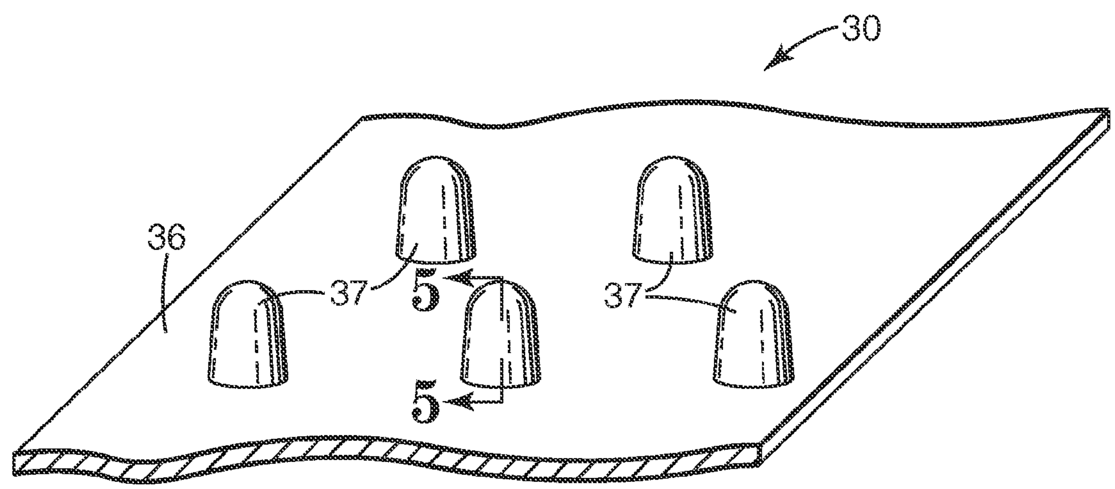
FIG. 4 is a perspective view of a portion of one post-formed multilayer optical film according to the present invention.
Figure 5:
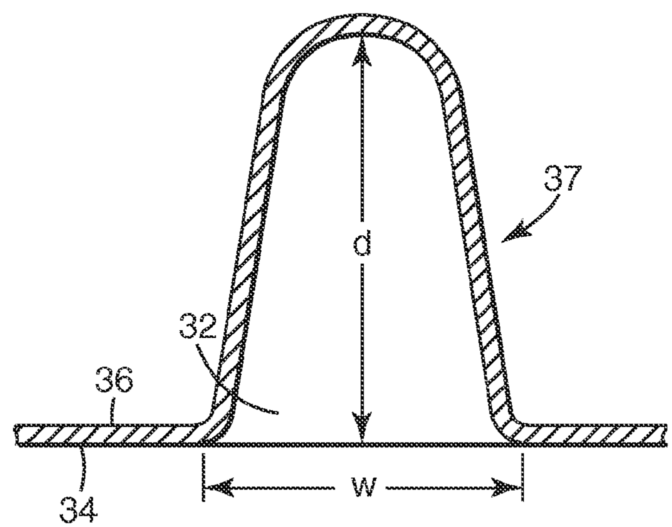
FIG. 5 is an enlarged partial cross-sectional view of the multilayer optical film of FIG. 4 taken along line 5-5 in FIG. 4.

FIGS. 4 & 5 illustrate a more extreme example of the post-formed optical stack 220 illustrated in FIG. 2C. The post-formed optical stack 30 illustrated in FIGS. 4 & 5 can be considered an example of a deep draw post-forming process. The optical stack 30 of FIG. 4 includes a first major side 34 (see FIG. 5) and a second major side 36 along with a plurality of selected areas 32 in which the optical stack 30 has been post-formed to provide depressed areas 32 formed on the first major side 34 of the optical stack and raised areas 37 formed on the second major side 36 of the optical stack 30.

The deformed areas of the deeply drawn optical stack can be characterized by the aspect ratio of the width (w) of the depressed areas 32 as measured across the opening 33 of the depressed area 32 to the depth (d) of the depressed areas 32 as measured from the first major side 34 of the optical stack 30. It is preferred that the width of the depressed area 32 be measured across its narrowest dimension. It may be desirable that the depressed areas 32 have an aspect ratio w:d of about 10:1 or less, more desirably 2:1 or less, even more desirably about 1:1 or less, and still more desirably about 0.5:1 or less.

Alternatively, the deformation in the optical stack 30 can be measured in absolute terms. For example, it may be preferred that the depth d be at least about 0.1 millimeter or more; more preferably at least about 1 millimeter or more; and even more preferably at least about 10 millimeters or more. It will be understood that where the depth d of the depressed areas 32 approaches or exceeds the thickness of the optical stack 30, the more likely it is that a raised area 37 will be formed on the second major side 36 of the optical stack.

Figure 6:
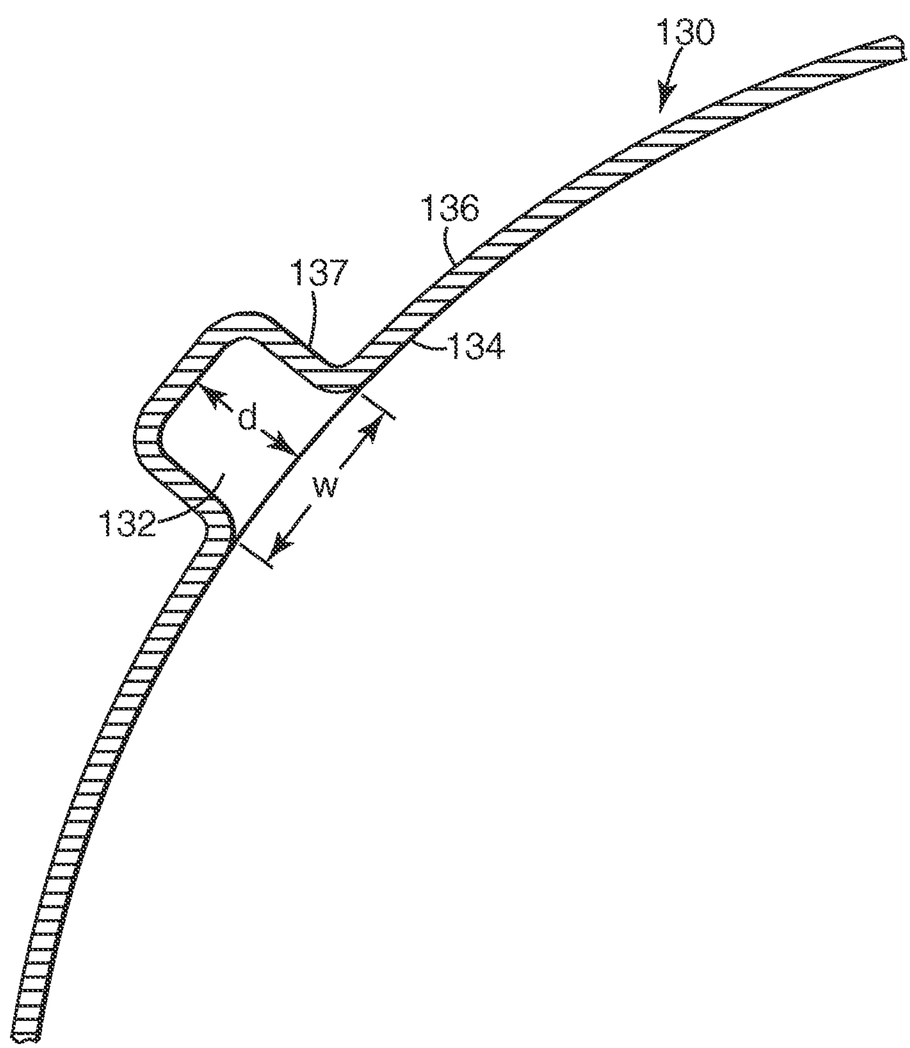
FIG. 6 is a partial cross-sectional view of another post-formed multilayer optical film according to the present invention.

The measurement of the depth d of the depressed areas 32 formed on the first major side 34 of the optical stack 30 is not limited to those instances in which the first major side is planar. Turning now to FIG. 6, where the optical stack 130 of a multilayer optical film is depicted in a curved configuration. The optical stack 130 includes a depressed area 132 formed on the first major side 134 of the optical stack 130 and a corresponding raised area 137 on the second major side 136 of the optical stack 130. The depth d of the depressed area 132 will preferably be measured from the geometric surface defined by the first major side 134 of the optical stack 130 and will typically be the largest depth from that geometric surface.

Figure 7:
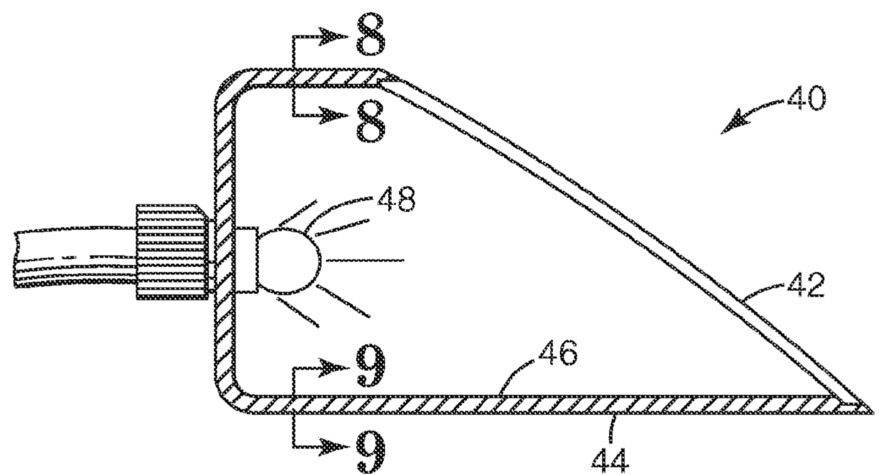
FIG. 7 is a partial cross-sectional view of a headlight assembly including post-formed multilayer optical film according to the present invention.
Figure 8:
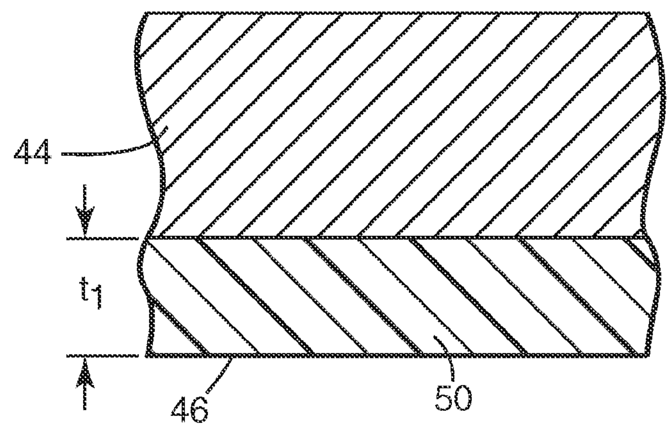
FIG. 8 is an enlarged cross-sectional view of one portion of the headlight assembly of FIG. 7 taken along line 8-8.
Figure 9:
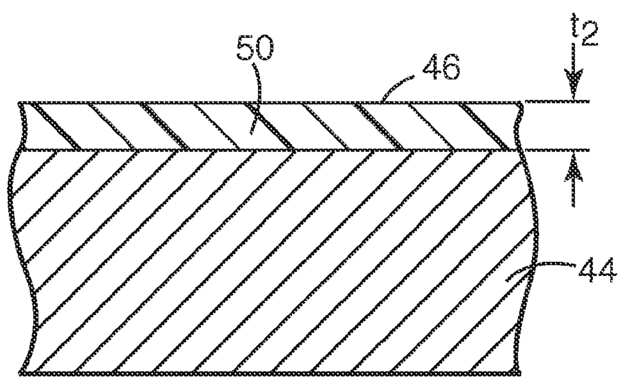
FIG. 9 is an enlarged cross-sectional view of one portion of the headlight assembly of FIG. 7 taken along line 9-9.

FIGS. 7-9 depict another illustrative article including post-formed multilayer optical film. FIG. 7 is a cross-sectional view of a headlight assembly 40 for, e.g., an automobile or truck. The headlight assembly 40 includes a lens 42, a lamp cavity 44 having a reflective inner surface 46, and a light source 48 mounted within the lamp cavity 44.

It is preferred that the reflective inner surface 46 of the lamp cavity 44 include post-formed multilayer optical mirror film manufactured according to the principles of the present invention. In this embodiment, it is preferred that the multilayer optical film used be highly reflective for visible light and it may also be helpful if the multilayer optical film is also reflective for light into the infrared spectrum to limit heat build-up of the lamp cavity 44 due to absorption of infrared energy by the substrate on which the reflective inner surface 46 is located. Alternatively, if the multilayer optical film has sufficient structural integrity such that entire lamp cavity 44 is constructed of the multilayer optical film, it may be preferable that the multilayer optical film be transmissive for infrared energy to limit heat build-up within the headlight assembly 40.

FIG. 8 is an enlarged cross-sectional view of the lamp cavity 44 taken along line 8-8 in FIG. 7, and FIG. 9 is an enlarged cross-sectional view of the lamp cavity 40 taken along line 9-9 in FIG. 7. Both of the views depict a layer of post-formed multilayer optical film 50 on the inner surface 46 of the lamp cavity 44. Because the multilayer optical film 50 typically lacks sufficient structural rigidity alone, it may be preferred to mount the multilayer optical film 50 on a substrate 52 or some other form of structural support, e.g. a frame, etc., by any suitable technique. Alternatively, the multilayer optical film can be laminated to or coextruded with a thicker layer that provides structural rigidity either before or after post-forming operations.

Post-forming processes do not typically deform a multilayer optical film uniformly and, as a result, the thickness of the optical stacks in post-formed multilayer optical films according to the present invention vary. The variations in thickness of the post-formed multilayer optical film are in direct contrast with the controlled uniform thickness of the multilayer optical film as manufactured. That uniform thickness is desired because the thickness of the optical layers within the multilayer optical film define, in part, its optical properties. As a result, variations in the multilayer optical film as manufactured are not desired because they can adversely impact the uniform optical properties of the film. For example, non-uniformities in the optical stack of multilayer optical film as manufactured can result in iridescence or other optical artifacts.

Thickness variations in the optical stack of post-formed multilayer optical film are, in large part, caused by variations in the strain experienced in different areas of the multilayer optical film during post-forming. In other words, some areas of the post-formed multilayer optical film may experience significant deformation (strain) while other areas may experience little or no deformation during post-forming.

The optical stacks of post-formed multilayer optical film in articles will, as a result, often include variations in thickness as illustrated in FIGS. 3A-3C, 8 and 9. For example, the thickness of the multilayer optical film 50 varies between the two points in the lamp cavity 44. The thickness $t_1$ of the optical stack of the post-formed multilayer optical film seen in FIG. 8 is thicker than the thickness $t_2$ of the optical stack of the post-formed multilayer optical film depicted in FIG. 9. In both areas, however, it is preferred that the reflectivity of the multilayer optical film 50 for the desired range of wavelengths remain high for normal, as well as off-axis, light. The importance of off-axis reflectivity can be seen in FIG. 7 where light from the light source 48 may approach portions of the light cavity 44 at high angles off of normal.

The thickness variations in the optical stack can cause what is commonly referred to as band shifting. In other words, the range of wavelengths of which any multilayer optical film is reflective is, in part, a function of the physical thickness of the layers in the multilayer optical film. Varying the physical thickness of the layers can cause the range of wavelengths over which the film is reflective to change. Because changes in thickness typically involve thinning of the multilayer optical film from its manufactured thickness, band shifting is usually downward. For example, a multilayer optical film that exhibits broadband reflectance of light with wavelengths over the range of 400-900 nanometers and is thinned by a factor of 2 during post-forming will, after thinning, typically exhibit broadband reflectance for light with wavelengths in the range of 200-450 nanometers.

One approach to compensate for the effects of thinning multilayer optical films (or any multilayer article exhibiting reflectivity as a result of refractive index differentials, is discussed in U.S. Pat. No. 5,448,404 (Schrenk et al.). Essentially, the thinning effect and corresponding band shift can be compensated for by adjusting the bandwidth of the multilayer optical film as manufactured such that, after post-forming, the multilayer optical film has layers with the appropriate optical thickness to reflect light with the desired wavelengths.

Although both the upper and lower band edges may be adjusted to compensate for thinning, for broadband mirrors it may be preferable to adjust only the upper edge of the range of reflected wavelengths upward by a factor that is at least as large as the expected maximum factor by which the multilayer optical film will be thinned during post-forming. By increasing the upper limit of the range of wavelengths over which the multilayer optical film reflects light before post-forming or drawing, the portions of the post-formed multilayer optical film that are thinned during post-forming will maintain their reflectivity over the desired range of wavelengths (assuming the maximum factor by which the multilayer optical film is thinned during post-forming does not exceed the factor by which the upper limit of the wavelength range has been adjusted to account for thinning during post-forming).

For broad band mirrors, it is typically not preferred to adjust the lower limit in the reflected wavelength range because some areas of the multilayer optical film may experience little or no deformation or thinning during post-forming. By supplying a multilayer optical film that, before post-forming, already reflects light at the lower end of the desired range of wavelengths, reflectivity of the entire post-formed multilayer optical film at the lower end of the desired range of wavelengths can be retained after post-forming.

For example, if the post-formed multilayer optical film in the article is to reflect substantially all visible light (i.e., 400-700 nanometer light), then before post-forming the multilayer optical film should reflect normal incident light in at least the wavelength range of from about 400 nanometers to about 900 nanometers multiplied by the expected thinning factor (the increase in the upper edge bandwidth from 700 to 900 nanometers is provided to compensate for light approaching at angles off of the normal axis). If the maximum factor by which the post-formed multilayer optical film is expected to be thinned during post-forming is 2, then the multilayer optical film will preferably reflect normal incident light in at least the wavelength range of from about 400 nanometers to about 1800 nanometers. If the maximum factor by which the post-formed multilayer optical film is expected to be thinned during post-forming is 3, then the multilayer optical film will preferably reflect normal incident light in at least the wavelength range of from about 400 nanometers to about 2700 nanometers.

If the optical stack of a multilayer optical film is designed to compensate for thinning, variations in the thickness of the post-formed multilayer optical film can be allowed without significantly affecting reflectivity of the optical stack over the desired wavelengths. For example, the ratio $t_1:t_2$ in the post-formed multilayer optical film article 50 illustrated in FIGS. 7-9 may be at least about 2:1 or more without significantly affecting the reflective properties of the multilayer optical film. In some cases, it may be possible to provide multilayer optical films that can support thickness ratios of 3:1 or more without significant degradation of the optical properties of the post-formed multilayer optical film over desired wavelengths.

Figure 10:
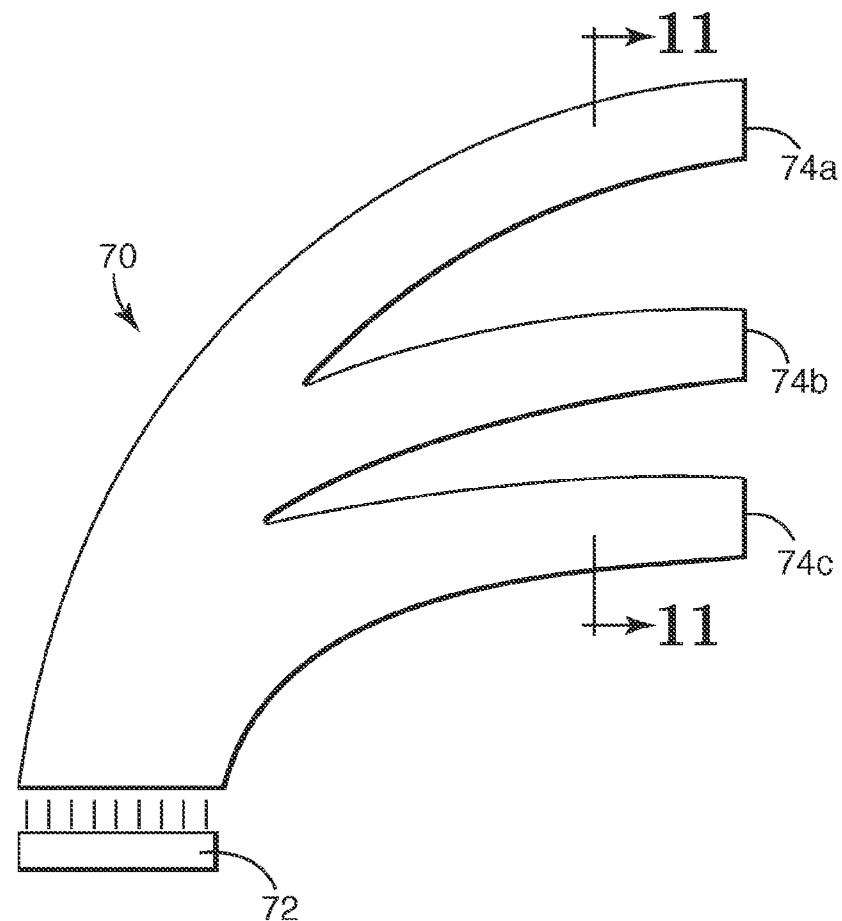
FIG. 10 is a plan view of one light guide including post-formed multilayer optical film according to the present invention.
Figure 11:
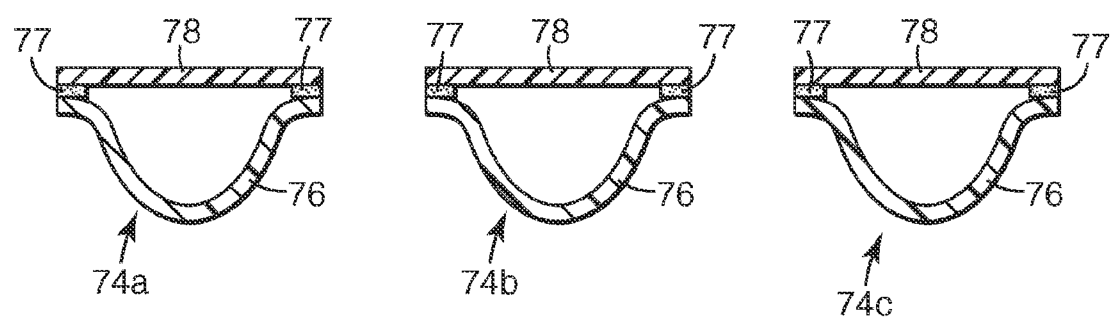
FIG. 11 is an enlarged partial cross-sectional view of the light guide of FIG. 10 taken along line 11-11.

FIGS. 10 & 11 illustrate another post-formed article according to the present invention. The article 70 is a light guide that can distribute light from a single source 72 to a plurality of distribution points 74*a*, 74*b* and 74*c* (collectively referred to as distribution points 74). Light guide 70 could be used in, e.g., lighting an instrument panel in an automobile or the like.

As seen best in the cross-sectional view of FIG. 11, the light guide 70 can be formed from film 76 that has been post-formed into the desired shape. Bonded over the post-formed film 76 is a cover film 78 that, in the depicted embodiment, is a substantially planar sheet of film 78. It will, however, be understood that the cover film 78 could also be post-formed if desired. Different areas of the post-formed film 76 and/or the cover film 78 can be post-formed to varying thicknesses to allow for the transmission of light of different wavelengths (e.g., visible light with different colors). The two multilayer optical films 76 and 78 can be bonded using a variety of techniques. In the depicted embodiment, the films 76 and 78 are adhesively bonded using an adhesive 77. Other techniques for bonding include mechanical fasteners or clamps, welding, etc.

Although some specific examples of articles including post-formed multilayer optical film have been described above, it will be understood that post-formed multilayer optical film may be included in any article in which it is desired to take advantage of the unique optical properties of multilayer optical films. For example, articles including post-formed multilayer optical film may find use in the automotive area for headlights, taillights, and other areas where the reflective properties of the post-formed articles according to the present invention would be advantageous. In addition, post-formed articles could also be used in the automotive industry as trim pieces for head lamps, bezels, knobs, automotive trim, and the like. The articles may also find application in trim articles such as the light work for consumer appliances including refrigerators, dishwashers, washers, dryers, radios, and the like. They may also find use as toys or novelty items. Other applications for post-formed articles according to the present invention include light guides and/or pipes, shaped reflectors for exterior lighting applications, bulb reflectors for use in, e.g., backlit computer displays, medical/dental instruments other than those described herein (e.g., disposable laparoscopic mirrors), etc. In still other applications, the post-formed articles may provide colored mirrors or filters for use in, e.g., center high mount stop lamps, decals, hood ornaments, etc. Other uses include jewelry, seasonal ornaments (e.g., Christmas tree ornaments), graphics, textured coatings, etc.

The post-formed articles of the present invention may also be used as decorative items. Decorative items that may be formed from the corrugated films include ribbons, bows, wrapping paper, gift bags, garlands, streamers, centerpieces, and ornaments. The post-formed articles may also be employed in a gift box or other decorative packaging (e.g., cosmetic or food packaging), yarns, or they may be arranged as a window in a gift bag. These examples of decorative items are presented for illustrative purposes only and should not be construed as a limitation on the variety of decorative items in which the post-formed articles of the present invention may be employed.

Furthermore, the articles according to the present invention may be constructed entirely of post-formed multilayer optical film or they may only include multilayer optical film in their construction. If the post-formed multilayer optical film constitutes only a portion of the article, it will be understood that the post-formed multilayer optical film could be integrated into larger assemblies by any suitable techniques, such as insert injection molding, ultrasonic welding, adhesive bonding, and other techniques.

Underdrawn Multilayer Optical Films

Of the multilayer optical films described in U.S. Pat. No. 5,882,774 (Jonza et al.), the mirror constructions of such films are typically optimized for a high index differential. The films typically have low extensibility limits (i.e., those limits beyond which the films typically deform without fracture or tear during deformation) because they are stretched during manufacturing to levels that provide the desired high index of refraction differential. In addition, some of the multilayer optical films may be heat-set during manufacturing. Heat setting induces further crystallization within the film and that increased crystallization will typically further reduce the extensibility limits of the films.

As a result of their relatively low extensibility limits, known multilayer optical films such as those described in U.S. Pat. No. 5,882,774 (Jonza et al.) may be difficult to post-form without resulting in significant negative effects on the optical properties of the resulting post-formed multilayer optical film. Although the methods described above may be helpful in providing articles including post-formed multilayer optical film and methods of forming the articles, another approach to providing articles including post-formed multilayer optical films can be pursued.

That other approach involves using multilayer optical films in which the extensibility limits of the film are increased for post-forming by deliberate underdrawing of the film during its manufacture to produce what will be described with respect to the present invention as an "underdrawn multilayer optical film" or "underdrawn film". Such underdrawn multilayer optical film can then be provided in a rolls or sheets for use in a subsequent post-forming process or it may be directed into an in-line post-forming process.

Multilayer optical film including layers of one or more birefringent materials alternating with another material may be characterized according to the strain-induced orientation and/or crystallinity of the birefringent materials in the films. In fully drawn films, or at least films considered to be fully drawn for the purposes of the present invention, the birefringent materials will typically exhibit higher levels of orientation and/or crystallinity than a corresponding multilayer optical film constructed of the same materials that is underdrawn.

The higher level of crystallinity in the fully drawn films is, in large part, the result of the increased effective strain to which the multilayer optical film is subjected during manufacturing. As discussed above, fully drawn films are typically drawn to higher levels to improve their reflective properties. Those reflective properties are largely based on the orientation and/or crystallinity of the birefringent materials in the film, which can be correlated to the index of refraction of the birefringent materials. As a result, orientation and/or crystallinity are also related to the refractive index differentials (Δx, Δy) in any multilayer optical film.

Because an underdrawn multilayer optical film is not subjected to the same level of effective strain as is a fully drawn multilayer optical film with the same construction, the birefringent material in the underdrawn multilayer optical film will typically exhibit reduced crystallinity or at least one reduced in-plane refractive index differential (Δx or Δy) as compared to a fully drawn multilayer optical film manufactured with the same materials, layer thicknesses, numbers of layers, etc.

The reduced orientation and/or crystallinity may also typically result in reduced refractive index differentials in the underdrawn multilayer optical films as compared to the same construction in a fully drawn state. As a result, it may be helpful to increase the number of layers usually required to cover a given wavelength range with a given reflectance. Second order peaks from the thicker layers of the broader band may reduce the actual need for an increase in the layer numbers. Such considerations can, however, be determined based on the discussions in U.S. Pat. No. 5,882,774 (Jonza et al.).

It is important to note that, in addition to an upper limit on crystallinity for an underdrawn multilayer optical film, there is also preferably a lower limit as well. In other words, an underdrawn multilayer optical film including birefringent materials in its layers will include at least some level of strain-induced crystallinity. By providing underdrawn multilayer optical films with at least some level of strain-induced crystallinity, the post-forming of the underdrawn multilayer optical films will typically be more predictable as compared to a film in which no strain-induced crystallization is found in the birefringent materials.

Figure 12:
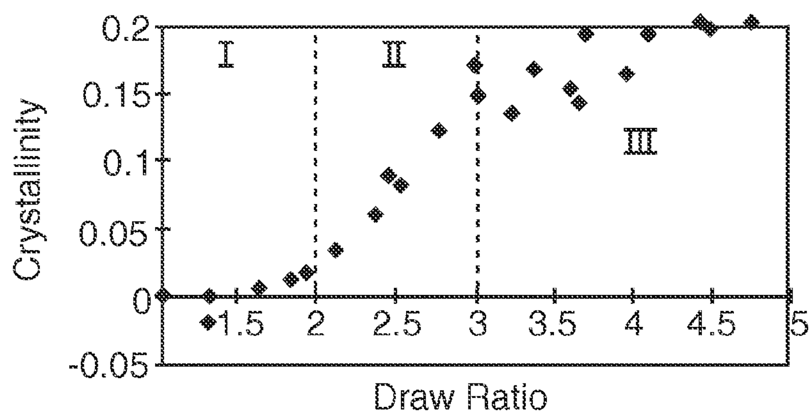
FIG. 12 is a graph illustrating the relationship between draw ratio (horizontal axis) and crystallinity (vertical axis) in the birefringent materials of a multilayer optical film.

The importance of providing an underdrawn multilayer optical film with at least some strain-induced crystallinity is illustrated in FIG. 12, an idealized graph of draw ratio (horizontal axis) versus crystallinity (vertical axis) for multilayer optical films including layers of at least one birefringent material alternating with another material. The behavior illustrated in FIG. 12 is typical of polyesters such as PEN, PET or co-polymers comprising them which can develop birefringence and which can be cast from a die and quenched efficiently resulting in an initial cast web or film with very little crystallinity. FIG. 12 may also characterize other quenchable, birefringent polymeric materials that are susceptible to strain-induced crystallization. Again, such quenched films would preferably exhibit only low levels of crystallinity caused by crystallization during quenching prior to drawing. As drawing of the film is begun, the crystallinity of the birefringent materials in the multilayer optical film may begin to increase, but the increases are at relatively low initial rates. Those draw ratios at which the strain-induced crystallinity increases at a relatively low initial rate are included in what will be defined as Regime I for the purposes of the present invention. As the draw ratio increases past Regime I into what will be referred to as Regime II, the crystallinity of the birefringent material in the multilayer optical film as a function of the draw ratio increases at a significantly faster rate than in Regime I.

In Regime I of FIG. 12, the effect of drawing is approximately reversible in as much as cessation of drawing and continued heating allows for the relaxation of orientation (i.e. a reduction in the index of refraction differences in the three principal material directions) with minimal crystallization. The reversibility is not necessarily complete because Regime I typically appears in a temperature region of large supercooling. Thus crystallization is thermodynamically favored but kinetically hampered. Accumulated time during drawing and relaxation at these temperatures (e.g. via cycling) may eventually bring the material into Regime II via the relatively slow accumulation of crystallinity. Nevertheless, it is this approximate reversibility that distinguishes Regime I from Regime II. In general, the degree of crystallinity (or total polarizability as described later) tolerable in this regime depends on the particular polymer, its quenching conditions and its pre-drawing post process conditions.

The draw ratio at which the rate of crystallization of the birefringent material in the multilayer optical film begins to increase significantly and move into Regime II can be influenced by a number of factors including draw rate, temperature, etc. After the birefringent material has experienced sufficient strain-induced crystallization to enter Regime II, however, it will typically follow the crystallization curve defined by that initial drawing. In other words, the film cannot continue to be drawn without inducing crystallization in the birefringent materials at the increased rates associated with Regime II in the graph of FIG. 12. As a result, the characteristics of the film will be subject to less variability when drawn further in post-forming processes because the crystallization rate of the birefringent materials is, in large part, set by the pre-stretching required to put the film into Regime II.

For a multilayer optical film including birefringent materials that have not experienced sufficient strain-induced crystallization to enter Regime II, further stretching or drawing during post-forming will not be as predictable because the point at which the crystallization rate starts to increase significantly is subject to the factors listed above, e.g., temperature and draw rate. As a result, the film could experience small increases in the draw ratio that result in significant increases in the rate of crystallization of the birefringent materials or it could experience large draw ratios with a relatively small increase in the rate of crystallization of the birefringent materials. In either case, the level of predictability is reduced as compared to a film that includes sufficient strain-induced crystallization such that its rate of crystallization is largely set, i.e., the birefringent materials in the multilayer optical film have entered Regime II.

Figure 12A:
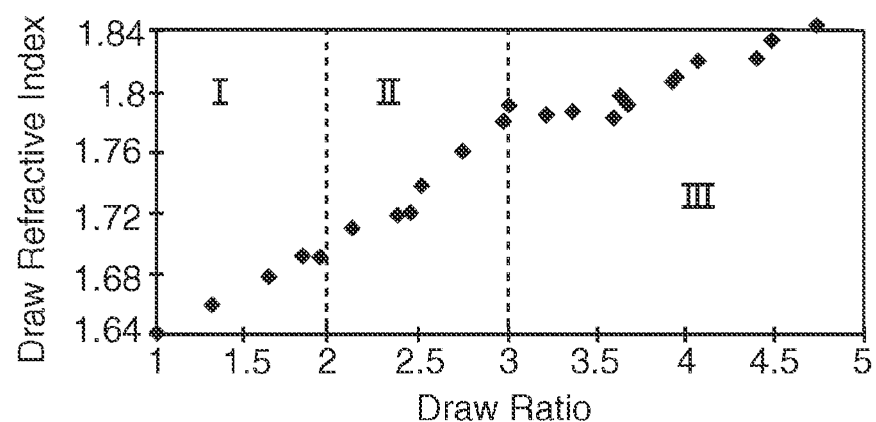
FIG. 12A illustrates the index of refraction in the direction of drawing (vertical axis) as a function of the draw ratio (horizontal axis) for one uniaxially drawn PEN film in which the orthogonal in-plane axis dimension is held generally constant.

In the case of many polymers, especially the polyesters including PEN, PET and copolymers including PEN and/or PET, a third regime develops in which the index of refraction increases at a much slower rate with respect to the draw ratio. Often the total polarizability will also change at a much slower rate as well. FIG. 12A illustrates the index of refraction in the direction of drawing (vertical axis) as a function of the measured draw ratio (horizontal axis) for one uniaxially drawn PEN film in which the orthogonal in-plane axis dimension is held generally constant. The PEN used for this illustrative case had an intrinsic viscosity of 0.48 and was drawn according to a linear draw profile of 20% per second initial draw rate at 130 degrees Celsius.

For the illustrated case, Regime II begins at a draw ratio of about two (2) and Regime III begins at a draw ratio of about three (3). The onset of these regimes depends on process and material conditions including, for example, raising the strain rate, raising the intrinsic viscosity, lowering the temperature, and/or lowering the glass transition temperature (e.g., by lowering the moisture and/or plasticizer content) may all lower the draw ratio at onset for Regimes II and III from those illustrated in FIG. 12A. The molecular weight distribution, rather than just an intrinsic viscosity may also alter the regime onsets. Analogous results can be expected for biaxially drawn films.

In view of the above discussion, one difference between a fully drawn multilayer optical film and an underdrawn multilayer optical film of the same construction is that the fully drawn multilayer optical film includes birefringent materials in which the crystallinity is higher than the crystallinity of the birefringent materials in the underdrawn multilayer optical films. Where the birefringent material in the multilayer optical film is a polyester, it may be preferred that the crystallinity of the birefringent polymer is about 18% or less, more preferably about 15% or less. In comparison, the crystallinity of the same birefringent polyesters in the fully drawn multilayer optical films will be at least about 20% or more, more typically about 25% or more.

In addition to an upper limit for crystallinity, underdrawn films can also be characterized by a lower limit for the crystallinity of the birefringent materials in the underdrawn multilayer optical film, because the birefringent materials in the films do preferably exhibit some level of strain-induced crystallinity. In other words, it is preferred that the birefringent materials in the multilayer optical films have entered Regime II as discussed above. For multilayer optical films including polyesters as the birefringent materials, it may be preferred that the lower limit of crystallinity of the birefringent materials in the multilayer optical film be at least about 3% or more, in some instances more preferably at least about 5% or more, and in other instances even more preferably at least about 10% or more. Higher levels of crystallinity typically provide higher levels of birefringence in the underdrawn state and reflect the degree of underdrawing. Higher birefringence can improve the performance of the initial underdrawn state in a finished post-formed article.

Although we do not wish to be limited by any particular theory, it is believed that the lowest level of crystallinity provides a minimum level of connectivity between the micro-crystalline domains, e.g. via tie chains, which substantially reduces the propensity for large scale relaxation of the developing morphology. In many instances, crystallization at these levels will move the birefringent materials in the multilayer optical film into Regime II. The exact threshold of lower crystallinity depends upon the chemical nature of the material including the composition and molecular weight as well as upon the process conditions such as temperature, rate and duration of draw and heating Although crystallinity may be used to characterize underdrawn multilayer optical films, underdrawn multilayer optical films may alternatively be characterized using what will be referred to herein as "total polarizability" of the layers including birefringent materials. Determination of total polarizability is based on the refractive indices of the layer or layers including birefringent materials within the multilayer optical film.

The "total polarizability difference" will be defined as the difference between the total polarizability of the drawn material and that of the quenched amorphous state of the same material. Any given material is expected to possess a maximum total polarizability difference in a certain maximal fully drawn state. Where the multilayer optical film includes two or more different layers with different compositions of birefringent materials, total polarizability difference will preferably be measured for the layers including birefringent materials with the largest total polarizability difference relative to its maximum total polarizability difference as determined by the methods discussed below.

Refractive indices may be measured by a variety of standard methods using, e.g., an Abbe refractometer or a prism coupling device (e.g. as available from Metricon, Piscataway, N.J.). Although it is difficult to directly measure the refractive indices of the materials in the individual layers of the optical stack of the multilayer optical film, the refractive indices of the optical stack as a whole can be reliably measured. Furthermore, the refractive indices of the optical stack as a whole are weighted averages of the refractive indices of the materials in each of the individual layers making up the optical stack.

If, for example, the optical stack is constructed of two or more materials, the interdiffusional effects between layers are small, and the refractive indices of only one of the materials changes significantly in response to drawing, then the refractive indices of the individual layers can be estimated based on the refractive indices of the optical stack as a whole. These estimates are based on the typically accepted assumption that the refractive indices of the optical stack as a whole are the optical-thickness-weighted averages of the refractive indices of the materials in the various layers of the optical stack.

In another variation, in those films in which one or more of the materials making up the layers of the optical stack are also present in thicker skin layers and/or internal protective boundary layers, then it can typically be assumed that the refractive indices are the same for the same material, whether that material is found in the layers of the optical stack or elsewhere in the multilayer optical film. As a result, if the refractive indices of only one of the materials making up the optical stack is unknown and the refractive indices of the other materials in the optical stack are known, then measurement of the refractive indices of the optical stack will allow for calculation of the refractive indices of the unknown material. In some instances, measurement of the refractive indices may require destructive peeling or other known techniques of isolating the various layers of the multilayer optical films.

Typically, the refractive indices of the birefringent materials in the multilayer optical film will be determined based on the above techniques because it is the refractive indices of the birefringent materials that change in response to drawing or deformation. Assuming conservation of molecular polarizability within the birefringent materials of the optical stack (an assumption that is typically considered a reasonable approximation for many semi-crystalline polymers, including the polyesters used in preferred underdrawn multilayer optical films, e.g., PEN, PET and copolymers of PET and PEN), an anisotropic analogue of the Clausius-Mossetti equation using a Lorenz-Lorentz local field yields the following equation which results in a number referred to above as the total polarizability of the birefringent materials:

$$(n_1^2-1)/(n_1^2+2)+(n_2^2-1)/(n_2^2+2)+(n_3^2-1)/(n_3^2+2)=\rho K=\text{Total polarizability}$$

where $n_1$, $n_2$ and $n_3$ are the refractive indices in the principal directions of a given layer within the multilayer optical film, ρ is the density of the materials in that layer, and K is a volume polarizability per unit mass for the materials in that layer. Total polarizability is a function of wavelength due to the wavelength dependence of the indices of refraction. As a result, when referred to numerically herein, total polarizability will be determined with respect to light having a wavelength of 632.8 nanometers (e.g., as provided by a helium-neon laser light source).

It should be noted that an alternative to the total polarizability equation can also be used. In this alternative, each of the three principal indices in the equation is set equal to the simple average of the three measured principal indices. The total polarizability is then called a refractivity and an analogous refractivity difference may be defined. Likewise, density and crystallinity may be calculated. These may vary from that calculated using the total polarizability. For discussion purposes, the total polarizability calculation is used in the examples that follow.

Many semi-crystalline polymers, such as isotactic polypropylene and polybutylene terephthalate, are difficult to quench in the amorphous state; or if quenched, are difficult to re-heat fast enough or process cold enough to prevent significant quiescent crystallization prior to drawing. Such polymers may not exhibit Regime I under typical process conditions. Rather, the connectivity in the morphology means that all subsequent drawing is at least partially effective and the material essentially begins in Regime II after casting and quenching. As with materials that exhibit Regime I behavior, these materials can still be drawn and oriented. Moreover, the higher the degree of underdrawing (i.e. the lower the degree of drawing), the higher the level of residual extensibility available during the post processing (e.g. thermoforming).

From a functional standpoint, the onset of Regime II sets a certain level of extensibility related to the ultimate extensibility. This ultimate extensibility will vary somewhat with draw conditions. The amount of underdrawing is relative to this ultimate extensibility. Fully drawn films are drawn near to this limit. Underdrawn films are drawn below this amount, but preferably have been drawn past the onset of Regime II. The level of underdrawing desired may be a function of the level of extensibility desired for the subsequent post forming process.

The level of underdrawing is also a function of direction. Upon onset of Regime II, a certain level of drawing is locked in. This amount may vary in direction depending upon the process conditions at the time of onset. For example, a uniaxially drawn film will have a higher degree of underdrawing in the non-drawn direction at the point of Regime II onset. In the case of mirror films, equal underdrawing in both directions may be preferred. This may be achieved by minimizing the in-plane birefringence. As used here, the in-plane birefringence is simply defined as the absolute value or magnitude of the difference between the maximum and minimum refractive index values in the plane on the film. In the case of a uniaxially drawn film, this is typically the difference between the indices of refraction in the draw and non-drawn directions. In the case of polarizing films, a large in-plane birefringence is desired within the constraints of the underdrawing required to obtain a desired level of extensibility in the post process.

As can be seen by the directional nature of underdrawing, crystallinity or total polarizability alone does not fully characterize the level of underdrawing, although it sets useful limits with regards to the transition between Regime I and II and between underdrawn and fully drawn films. It should be understood that a certain level of extensibility reflects a corresponding level of underdrawing. For example, films drawn quickly in Regime II may not achieve the same level of crystallinity as those drawn slowly or those that continue to be heated at the draw temperature after drawing to heat set the films. The latter may be less extensible than the former; however, they may still be more extensible than other films slightly more drawn but less heat set. Thus maximum and minimum levels of crystallinity and/or total polarizability difference are most applicable in delineating the bounds of what is meant as an underdrawn film and not necessarily a sole measure of the relative performance among that class of films.

The total polarizability difference of the birefringent materials in underdrawn multilayer optical films including PEN (and, by the definitions provided below in the section regarding materials selection, predominantly PEN copolymers) as measured in the birefringent layers is preferably within a range of from about 0.002 up to about 0.018, more preferably within a range of from about 0.002 up to about 0.016. Within either range, it may be desirable that the maximum in-plane birefringence of reflective polarizing multilayer optical films is less than about 0.22, more preferably less than about 0.17, and, in some cases, still more preferably less than about 0.15. In the case of underdrawn mirror films, a maximum in-plane birefringence of less than about 0.14 is preferred in combination with either of the ranges for the total polarizability difference in the birefringent materials.

Total polarizability difference of the birefringent materials in underdrawn multilayer optical films including PET (and, by the definitions provided below in the section regarding materials selection, predominantly PET copolymers) as the measured birefringent layer is preferably within a range of from about 0.002 up to about 0.030, more preferably within a range of from about 0.002 up to about 0.0024. In the case of mirror films, these ranges are preferably coupled with a maximum in-plane birefringence of less than about 0.11, more preferably less than about 0.04.

The differences between the preferred levels of total polarizability and birefringence for the various polymers reflects the differences in the amorphous and crystalline densities of the different materials. The differences also reflect the intrinsic maximum birefringence of the different polymers, as well as the limits of extensibility after the onset of Regime II as discussed above.

In addition to the total polarizability and maximum in-plane birefringence, underdrawn multilayer optical films can also be characterized by reflectivity. For example, where the total polarizability difference of the measured birefringent materials is within the various ranges discussed above, it may be preferred that the multilayer optical film reflect at least about 85% of normal incident light of desired wavelengths that is polarized along at least one in-plane axis, more preferably the film may reflect at least about 90% of normal incident light of desired wavelengths that is polarized along at least one in-plane axis. If the multilayer optical film is intended to be a mirror film, i.e., not a reflective polarizer, it may be preferred that the reflective performance of the film in terms of percent reflectance hold for at least one of and more preferably two generally perpendicular in-plane axes.

As indicated in the equation presented above, total polarizability of the material(s) in a given layer of the optical stack of the multilayer optical film represents the product of density and the volume polarizability per unit mass of the material(s) in that layer. The volume polarizability per unit mass (K) is typically considered an invariant material property under draw according to the conservation of molecular polarizability assumption discussed above. Drawing of birefringent materials causes strain-induced crystallization as discussed above and, in most birefringent materials, the density of the material varies based on whether the material is crystallized or amorphous.

As a result, the density of the birefringent materials in the multilayer optical films changes based on the amount of strain-induced crystallization in the birefringent materials. Those changes in density can be used to estimate the level of strain-induced crystallization in the underdrawn multilayer optical films according to the present invention. This method of determining the level of strain-induced crystallization is not, however, without its limits.

One class or type of preferred birefringent materials used in the multilayer optical films according to the present invention are semi-crystalline. If the crystals in the semi-crystalline birefringent materials are relatively small, an effective refractive index for the semi-crystalline aggregate may be measured. This is often the case in polymers, such as polyesters (e.g., PEN and PET), that are drawn from a relatively amorphous state to a state of semi-crystallinity. In such cases, the density of the birefringent material (based on the refractive indices) may be estimated from the total polarizability and used to determine the level of crystallinity in the birefringent materials using a standard correlation between crystallinity and density.

In either case, the above discussions set out different approaches to characterizing underdrawn films according to the present invention. In the first, the strain-induced crystallinity of the birefringent materials is measured and used to define underdrawn multilayer optical films. In the second, the refractive indices of the birefringent materials can be used to determine the total polarizability of the birefringent materials which can also be used to define underdrawn multilayer optical films. In still another manner, the strain-induced crystallinity can be determined based, at least in part, on the refractive indices used to determine total polarizability.

For example, the total polarizabilities of amorphous cast webs of PET and PEN are found to be about 0.989 and 1.083, respectively, and the densities of the amorphous materials are measured using a standard density gradient column at about 1.336 and 1.329 grams per cubic centimeter, respectively. The resulting volume polarizabilities can be calculated at about 0.740 and 0.815 cubic centimeters per gram for PET and PEN, respectively. Densities of drawn films of PET and PEN may now be calculated by dividing the total polarizabilities by the respective volume polarizabilities. Moreover, the crystallinity may be estimated given the density of the pure crystalline phase, estimated as 1.407 grams per cubic centimeter for the typical crystalline phase of PEN and 1.455 grams per cubic centimeter for the crystalline PET.

The crystallinity can be estimated via a linear interpolation of the actual density between the amorphous density (zero crystallinity) and the pure crystalline density. Such crystalline estimates may vary from other measures as it neglects densification of the non-crystalline phase due to orientation and rarefication of the crystalline phase due to imperfections and defects. Other methods for determining crystallinity include Differential Scanning calorimetry and X-ray Scattering. Measurements obtained by these methods may be correlated to the density or total polarizability methods described herein through the use of suitable drawn film standards. It can typically be assumed that copolymers will have volume polarizabilities that are weight averages of their components, so that similar calculations can be made on co-polymers, if the type of crystals are known. Usually, this is the crystal corresponding to the predominant crystallizing monomer or subunit. Total polarizability can be used to characterize the underdrawn state of many systems. However, lack of a definitive total polarizability measurement in no way limits the utility of the invention. In some cases, the extensibility of a non-birefringent layer may be limiting. For example, a non-birefringent semi-crystalline second material layer may still become drawn during film processing. Under drawing to suit this layer would be desirable When the material has very low or no inherent birefringence, as is the case with a few polymers such as poly methyl methacrylate, then little or no orientational information can be derived. Nevertheless, the extensibility of such a non-birefringent non-crystalline second material may also be limiting. In the case of non-crystalline materials, the orientation may be relaxed and thus the extensibility recovered by pre-heating prior to draw. Optimizing the conditions of such pre-heating must balance the recovered extensibility of the amorphous material against any lost extensibility by the birefringent semi-crystalline first material. In the examples that follow below, it is believed that the birefringent strain-hardening layers (e.g., PEN or 90/10 coPEN layers) are the limiting layers for extensibility, whereas the second material layers (e.g., PMMA, PETG, or 70/0/30 coPEN) are believed to be nearly isotropic for the conditions used to manufacture the optical stacks. Finally, in a semi-crystalline material, if the crystals are relatively large, haze and scattering may obscure index measurements.

Process Considerations for Post-Forming Multilayer Optical Films

Because the post-formed multilayer optical films used in connection with the present invention rely on birefringent materials that provide strain-induced refractive index differentials to obtain the desired optical properties, variations in deformation of the multilayer optical film during post-forming can be particularly problematic.

As discussed above, the index of refraction differentials ($\Delta x$, $\Delta y$) in the multilayer optical film as manufactured are, in large part, the result of drawing of the multilayer optical film during manufacturing which causes the indices of refraction of the birefringent materials to change. Those changes cause refractive index differentials large enough to provide the desired reflective properties. Because the strain in the multilayer optical film during manufacturing is largely uniform, the strain-induced index of refraction differentials are also largely uniform over the film, and the resulting reflective properties are also largely uniform.

In post-forming processes the birefringent layers in the multilayer optical film are subjected to additional strain. One difference from manufacturing of the multilayer optical film is, however, that the strain induced during post-forming is not uniform over the film. The variations in thickness of the optical stack in a post-formed multilayer optical film as discussed above are, in part, indicative of the variations in strain over the post-formed multilayer optical film.

As a result, if the birefringent materials in the multilayer optical film are capable of further strain-induced index of refraction changes, the index of refraction differentials in the multilayer optical film may be changed as a result of post-forming. Furthermore, if the strain induced during post-forming is not uniform, the index of refraction changes in the post-formed multilayer optical film may also be non-uniform and may result in non-uniform optical properties in the post-formed multilayer optical film.

In addition to non-uniform post-forming strain-induced changes, another difficulty associated with post-forming multilayer optical films including strain-induced refractive index differentials in connection with birefringent materials is that many post-forming processes employ heat to improve the working properties of the multilayer optical film during deformation. The strain-induced changes in the refractive indices of the birefringent materials in the multilayer optical film are typically the result of strain-induced crystallization of the birefringent materials. The strain-induced crystallization and corresponding refractive indices can, however, be changed when the birefringent materials are subjected to heat during post-forming.

For example, heating may result in increased crystallization due to the heat during post-forming or decreased crystallization as a result of melting or relaxation during post-forming. In either case, changes in the crystallization level of the birefringent materials can result in a change in the refractive index differentials in the film. The potential crystallization changes in the birefringent materials may be further exacerbated by the simultaneous post-forming deformation and heating of the film which, in combination, may cause greater changes in the recrystallization/refractive index of the birefringent materials than either action alone.

The present invention, however, overcomes these difficulties to provide articles including post-formed multilayer optical film and methods of producing those articles. These results are achieved even though all of the multilayer optical films referred to in connection with the present invention include birefringent materials and rely on strain-induced refractive index differentials to obtain the desired optical properties.

Although post-forming may be most advantageously pursued using the "underdrawn" multilayer optical films described above, it may also be possible to obtain desirable post-forming results using multilayer optical films including a birefringent material and other materials that do not meet the definitions of underdrawn multilayer optical films, e.g., constructed according to U.S. patent Ser. No. 08/472,241.

In the post-forming methods of the present invention, it may be desirable to heat the multilayer optical films to forming temperatures that are near to, but below, the peak crystalline melting temperatures of the birefringent materials. Such heating can improve the extensibility of multilayer optical films during post-forming processing. By heating the multilayer optical film to those levels, the tendency of the multilayer optical film to fracture or tear at a given draw ratio during post-forming may be decreased. In addition, the forces required to post-form the films may be reduced as a result of the increased forming temperature.

Underdrawn multilayer optical films may also have increased extensibility under these process conditions. Because processing under these conditions is in the melting regime, precise temperature control is desirable to ensure uniform drawing and reduce or prevent damage to the post-formed multilayer optical film in the article. Such damage could take the form of complete melting, with concomitant loss of birefringence and/or hole formation in the multilayer optical film.

Reducing the stress required for a given amount of deformation during post-forming may reduce the tendency of the materials in the film to fracture, thereby enhancing extensibility. Heating the multilayer optical film to a forming temperature near the peak crystalline melting temperature of the birefringent material in the film may also enhance extensibility by melting less perfect crystals, thereby loosening the morphological microstructure in the birefringent material layers.

For example, one material used in some preferred multilayer optical films according to the present invention is polyethylene naphthalate (PEN), which has a peak melting point of about 270 degrees Celsius (520 degrees Fahrenheit) using standard differential scanning calorimetry (DSC). The onset of melting is, however, often seen at about 255 degrees Celsius (490 degrees Fahrenheit) or below. This onset of melting may be attributable to the melting of less well-developed crystals within the PEN with the peak melting temperature being that point at which all or nearly all of the crystals in the material have melted. Heating the birefringent materials in the multilayer optical film may also increase mobility within the microstructure, thereby activating crystal slip and other deformation mechanisms that could enhance extensibility of the multilayer optical film.

The extent to which heating may improve extensibility of the multilayer optical films according to the present invention will, at least in part, vary based on the materials used in the films. Some materials may exhibit larger increases in extensibility when heated as compared to others. Furthermore, the combination of materials within each of the multilayer optical films according to the present invention can also affect improvements in extensibility of the film as a whole.

For example, to improve the extensibility of the multilayer optical films, it may be preferred to heat the multilayer optical films to a forming temperature in the range of from about 30 degrees Celsius (about 55 degrees Fahrenheit) below the peak crystalline melting temperature of the birefringent material up to about the peak crystalline melting temperature of the birefringent material during post-forming. It may be more preferred to heat the film to a forming temperature in the range of from about 15 degrees Celsius (about 30 degrees Fahrenheit) below the peak crystalline melting temperature of the birefringent material up to about the peak crystalline melting temperature of the birefringent material during post-forming. These forming temperatures may increase extensibility and reduce the likelihood of fracture of multilayer optical films during post-forming processing.

A way to improve uniformity in the multilayer optical film during post-forming is to include materials in the multilayer optical film that are subject to strain hardening during deformation. Strain hardening is a property of materials in which the stress required to achieve a particular level of strain increases as the material is strained (i.e., stretched). Essentially, strain hardening materials may provide self-regulation of the thinning process due to post-forming.

In terms of molding, as the multilayer optical film is stretched during post-forming, unquenched sections of the film that have not yet made contact with a mold surface will tend to draw more uniformly after the onset of strain hardening. As a result, those portions of the film that have been stretched to the point at which strain hardening occurs will progressively stretch less while those portions of the film that have not experienced strain hardening will continue to stretch at faster rates. The end result is that the thinner (i.e., strain hardened) portions of the film will thin to a certain point after which the thicker portions of the film will continue to stretch and become thinner, effectively evening out the stretching or thinning of layers in the multilayer optical film during post-forming processing. This reinforcement effect of strain hardening is also operative in post-forming processes in which no mold is present to provide quenching of the film during post-forming. One material that provides strain hardening properties in a multilayer optical film is PEN. In general, strain-hardening is typically observed in many semi-crystalline polymers at high enough levels of strain.

Strain-hardening can help to regulate the uniformity of the drawing process, thus potentially reducing variations in the amount of deformation experienced by the film during post-forming. If the bandwidth of the multilayer optical film as manufactured is specifically designed to the final biaxial draw ratio of the post-forming process, rather than the draw ratio at tear or fracture as discussed above, then strain hardening can allow the design of a multilayer optical film with a narrower, more reflective band for use in the post-forming process.

The effect of strain hardening may also influence the degree to which vacuum-forming as one post-forming process will allow for adequate or desirable mold replication. Pressurized or plug assisted molding techniques may be needed for accurate post-forming processing of materials in which strain hardening potentially increases the resistance of the film to stretching during the molding process. The effect of strain hardening may be influenced by both the post-forming draw conditions and the degree of draw (strain-hardening) before post-forming is initiated.

Figure 13:
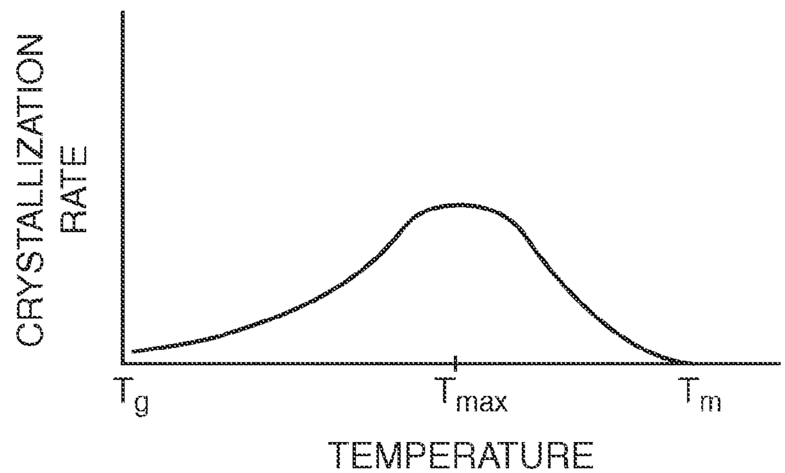
FIG. 13 is a graph illustrating temperature (horizontal axis) versus crystallization rate (vertical axis) for an exemplary birefringent material.

In addition to the above, one further consideration in developing an appropriate post-forming process may include an analysis of the rate of crystallization for the given materials as a function of temperature. Referring now to FIG. 13, an idealized graph of rate of crystallization (vertical axis) as a function of temperature (horizontal axis), it can be seen that crystallization rate increases with temperature to a certain point, referred to as the peak crystallization rate temperature $T_{max}$, after which the rate of crystallization tends to fall again as the temperature moves towards the peak crystalline melting temperature $T_m$ of the material. Differential scanning calorimetry may be used to estimate $T_{max}$. For PEN, $T_{max}$ has been estimated at about 220 degrees Celsius (about 430 degrees Fahrenheit) using differential scanning calorimetry upon heating at 20° C./min., and $T_{max}$ has been estimated at about 208 degrees Celsius (about 406 degrees Fahrenheit) using differential scanning calorimetry upon cooling at 5° C./min. Although we do not wish to be held to any theory, it is thought that the extensibility of multilayer optical films during post-forming can be improved in many cases if the forming temperatures used are not the same as the peak crystallization rate temperature of the birefringent material or materials in the film. This may be particularly applicable to films that have not already been heat set, and especially underdrawn films. Nevertheless, if the film is sufficiently underdrawn, extensibility and thus post-processability may still be acceptable after heating at these temperatures. The following discussion elucidates the effects of post forming near $T_{max}$ for some cases; e.g. certain underdrawn, non-heatset films comprising certain polyesters. It should be understood that multilayer optical films comprising materials other than polyesters may behave differently in their relation between peak crystallization temperature and optimal forming temperatures.

Further crystallization and morphological changes during pre-heating before post-forming may reduce extensibility and post-formability. In one aspect, it may be preferred that the forming temperature of the film during post forming be lower than the peak crystallization rate temperature of the birefringent material with the lowest peak crystallization rate temperature in the film, more preferably more than about 10 degrees Celsius below the peak crystallization rate temperature of the birefringent material with the lowest peak crystallization rate temperature in the film, and even more preferably more than about 20 degrees Celsius below the peak crystallization rate temperature of the birefringent material with the lowest peak crystallization rate temperature in the film. It may also be preferred that the forming temperature be greater than the peak crystallization rate temperature of the birefringent material with the highest peak crystallization rate temperature in the film, more preferably more than about 10 degrees Celsius above the peak crystallization rate temperature of the birefringent material with the highest peak crystallization rate temperature in the film, and even more preferably about 20 degrees Celsius above the peak crystallization rate temperature of the birefringent material with the highest peak crystallization rate temperature in the film.

These forming temperature limitations may be combined as desired. For example, it may be preferred that the forming temperature be more than about 10 degrees Celsius below the peak crystallization rate temperature of the birefringent material with the lowest peak crystallization rate temperature in the film or more than about 20 degrees Celsius above the peak crystallization rate temperature of the birefringent material with the highest peak crystallization rate temperature in the film. In another alternative, it may be desired that the forming temperature be more than about 20 degrees Celsius below the peak crystallization rate temperature of the birefringent material with the lowest peak crystallization rate temperature in the film or greater than the peak crystallization rate temperature of the birefringent material with the highest peak crystallization rate temperature in the film. Other combinations of these different limitations will also be apparent upon further analysis.

Where only one birefringent material is present in the multilayer optical film, the forming temperature limitations can be more simply expressed. It may be preferred that the forming temperature of the film be different than the peak crystallization rate temperature of the birefringent material in the film. Alternatively, it may be preferred to define the forming temperature in terms of ranges, e.g., it may be preferred that the forming temperature of the film be more than about 10 degrees Celsius below the peak crystallization rate temperature of the birefringent material, more preferably more than about 20 degrees Celsius below the peak crystallization rate temperature of the birefringent material in the film. It may also be preferred that the forming temperature be more than about 10 degrees Celsius above the peak crystallization rate temperature of the birefringent material film, more preferably about 20 degrees Celsius above the peak crystallization rate temperature of the birefringent material in the film.

After post-forming draw, it may be desirable to deliberately heat set the formed article to improve its reflectivity. This heat setting preferably follows the last post-forming drawing step; e.g., further crystallization can now be encouraged with attendant refractive index difference increases without consideration of further extensibility after the final post-forming draw step.

Although the methods of post-forming multilayer optical films in general are discussed above, the post-forming of underdrawn multilayer optical films may be varied while still providing desirable post-forming results. One significant variation is that the forming temperature of the underdrawn multilayer optical films may lie well below the peak crystallization rate temperatures of the birefringent materials within the films. Heat setting following the final post-forming draw step may also be desirable for articles manufactured from underdrawn multilayer optical films. For example, the crystallinity (and, as a result, the reflectance) of portions of the underdrawn films that have not been drawn during post-forming can be increased by heat-setting following the final post-forming draw steps. In addition, those portions of the underdrawn film that were drawn during post-forming can also experience increased crystallinity and the attendant reflectance.

The underdrawn multilayer optical films can be provided with and post-formed according to all of the variations described above with respect to multilayer optical films in general. In other words, they can be provided as highly reflective films that retain their reflectivity after post-forming, etc. Furthermore, the modifications discussed above for thinning effects should also be considered when manufacturing and processing underdrawn multilayer optical films as well.

Post-Forming Selected Areas of Multilayer Optical Films

The articles including post-formed multilayer optical film and the methods of post-forming multilayer optical film described thus far have focused on articles and methods in which the post-formed multilayer optical film exhibits uniform optical properties. There are, however other articles and methods according to the present invention in which it may be desirable to provide post-formed multilayer optical film with non-uniform appearance. For example, it may be desired to provide post-formed multilayer optical film in which selected areas of the multilayer optical film are reflective for light of desired wavelengths while other selected areas of the post-formed multilayer optical film transmit light with the same or other desired wavelengths.

It may also be desirable to provide an article including post-formed multilayer optical film in which selected areas in the post-formed multilayer optical film are transmissive for visible wavelengths while the remainder of the post-formed multilayer optical film is reflective for visible wavelengths. To accomplish that result using a multilayer optical film that is, as manufactured, reflective for visible light, the multilayer optical film in the selected areas could be stretched or thinned during the post-forming process such that all of the tuned bandwidths of the layers in the multilayer optical film stack in the selected transmissive areas are less than 400 nanometers after post-forming. The result of such a process would be an article including post-formed multilayer optical film that is highly reflective in the areas in which the reflective bandwidth remains in the visible spectrum, while the article would exhibit transmission in those areas in which the post-formed multilayer optical film has been thinned to allow transmission in the visible spectrum.

As an alternative to the previously described process, multilayer optical films could be provided and post-formed in methods that result in selected transmissive and reflective areas within the post-formed multilayer optical film in the same article, but in which the unthinned layers remain transparent while those selected areas that are thinned during post-forming become reflective. For example, the multilayer optical film as manufactured could be tuned to be reflective for wavelengths from about 900 to about 2025 nanometers, i.e., above the visible spectrum. Films designed to reduce higher order harmonics that give perceptible color in the visible region of the spectrum may be preferred. Some suitable films are described in U.S. Pat. Nos. Re. 34,605 and 5,360,659, and in U.S. Pat. No. 6,207,260 (Wheatley et al.).

If such a multilayer optical film were post-formed, the selected areas of the multilayer optical film that are to be reflective would be deliberately thinned during post-forming by an appropriate factor, e.g., 2.25, to retune the multilayer optical film in those selected areas such that visible wavelengths, i.e., those between about 400 to about 900 nanometers, were substantially reflected. The remaining portions or areas of the multilayer optical film and the article that are not thinned sufficiently to reflect light in the visible spectrum would remain transmissive to visible light.

Many variations on these concepts can be envisioned. For example, the multilayer optical films could be post-formed in methods such that the selected areas are sharply defined resulting in short transition zones between reflective/transparent areas, or they could be deliberately designed with long transition zones in which the post-formed multilayer optical film would exhibit iridescence as various wavelengths of light were reflected or transmitted. In another variation, different selected areas could be thinned to reflect different selected wavelengths. In that manner, the selected areas could exhibit, e.g., different colors. The end result of applying the principles of multilayer optical films and methods of post-forming multilayer optical films according to the present invention is that desired combinations of optical effects can be obtained by selecting films with the desired optical and post-forming properties and processing the films to obtain post-formed articles with the desired optical properties.

Figure 14:
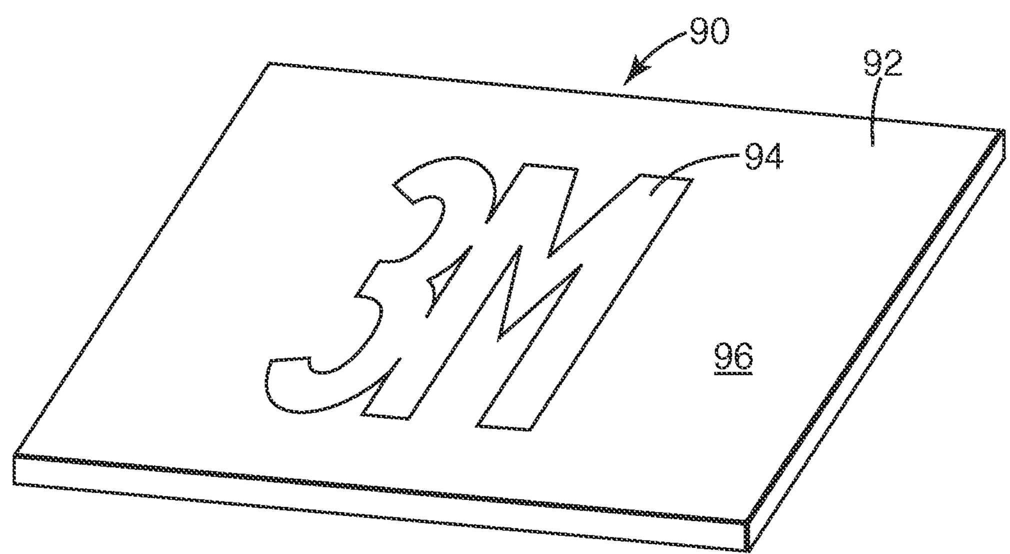
FIG. 14 is a perspective view of an article including post-formed multilayer optical film with selected areas having different optical properties.

One example of an article including post-formed multilayer optical film that is deformed in selected areas is depicted in FIG. 14. The article 90 is a light box including a cover 92 that includes selected areas 94 in the shape of indicia, in this case alphanumeric characters. In one embodiment, the post-formed multilayer optical film of the cover 92 can be formed from a multilayer optical film that is substantially reflective over the visible spectrum as manufactured. The multilayer optical film can be post-formed in manners such as those described above such that the multilayer optical film in the background area 96 surrounding the selected areas 94 is thinned during post-forming such that the multilayer optical film in the background area 96 is transparent to at least a portion of the visible spectrum while the selected areas 94 are substantially unchanged.

In another embodiment, the background areas 96 may be maintained as reflective to the visible spectrum while the selected areas 94 are deformed or thinned to provide a different optical effect from the background area 96. For example, the selected areas 94 may be embossed or blow molded or otherwise post-formed to thin the film in selected areas 94 sufficiently that they become transmissive to at least a portion of the visible spectrum. Other variations on the construction and manufacture of articles including post-formed multilayer optical film in which selected areas are post-formed can also be envisioned based on the examples discussed above.

Post-Forming Multilayer Optical Films with Substrates

Figure 15:
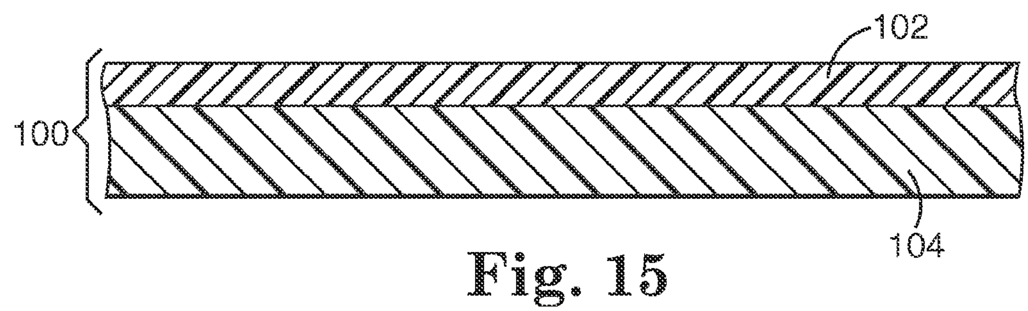
FIG. 15 is a cross-sectional view of a composite including an multilayer optical film and a substrate.

FIG. 15 illustrates another feature of multilayer optical films and articles including post-formed multilayer optical films according to the present invention. In some instances the post-formed multilayer optical films alone may lack sufficient body or rigidity to provide the desired mechanical properties. For example, the multilayer optical films may lack sufficient structural strength and/or stiffness to hold a desired shape. FIG. 15 illustrates one solution to that problem in that the multilayer optical film 102 may be laminated to or otherwise attached to a substrate 104 to provide a composite 100 with the desired mechanical properties. In some instances, the substrate 104 may be manufactured integrally with the multilayer optical film 102, and in other cases the multilayer optical film 102 may be manufactured independently and later attached to the substrate 104 to form the composite 100. If the substrate 104 is manufactured integrally with the multilayer optical film 102, it may be a thicker layer of one of the materials provided in the multilayer optical film 102 or it may be provided of another material that can be coextruded, cast, or otherwise formed with the multilayer optical film 102. In another alternative, the substrate 104 may be provided as a coating on the multilayer optical film 102.

Furthermore, although a substrate 104 is shown only one side of the multilayer optical film 102, it will be understood that the substrate 104 could be provided on both sides of the multilayer optical film 102. In addition, although the substrate 104 is depicted as a single layer, it will be understood that it could be a composite of different layers of the same or different materials based on the desired characteristics of the substrate 104

In some cases, the materials selected for the substrate 104 may have little, if any, effect on the optical properties of the multilayer optical film 102 but will provide a post-formable layer that is otherwise compatible with the multilayer optical film 102. In one aspect, the substrate 104 may simply supply desired structural stiffness/rigidity to the post-formed article, thereby reducing the need to laminate the post-formed multilayer optical film to another structure. Examples of suitable materials for the substrate 104 include, but are not limited to polycarbonates, polyvinyl chlorides, PETG, acrylics, methacrylics, nylons, polyolefin, polypropylene, etc.

Another mechanical property that may be supplied by the substrate 104 is strain-hardening during deformation as discussed above with respect to the multilayer optical film. That strain-hardening property may be used to limit the stresses placed on the attached multilayer optical film 102, thereby acting to distribute the stresses over the multilayer optical film 102 in a way that improves the post-formability of the composite 100 over the post-formability of the multilayer optical film 102 alone.

The materials selected for substrate 104 may provide desired optical properties instead of, or in addition to, desired mechanical properties. For example, the substrate 104 may function as a mirror for selected wavelengths of light such as infrared radiation, the substrate 104 may include colorants or otherwise introduce color into the composite 100, the substrate 104 may provide diffusing properties in either or both transmittance or reflectance (to, e.g., reduce iridescence).

One class of films that may be particularly useful in connection with post-forming of multilayer optical films is described in U.S. Pat. No. 6,256,002.

Figure 16:
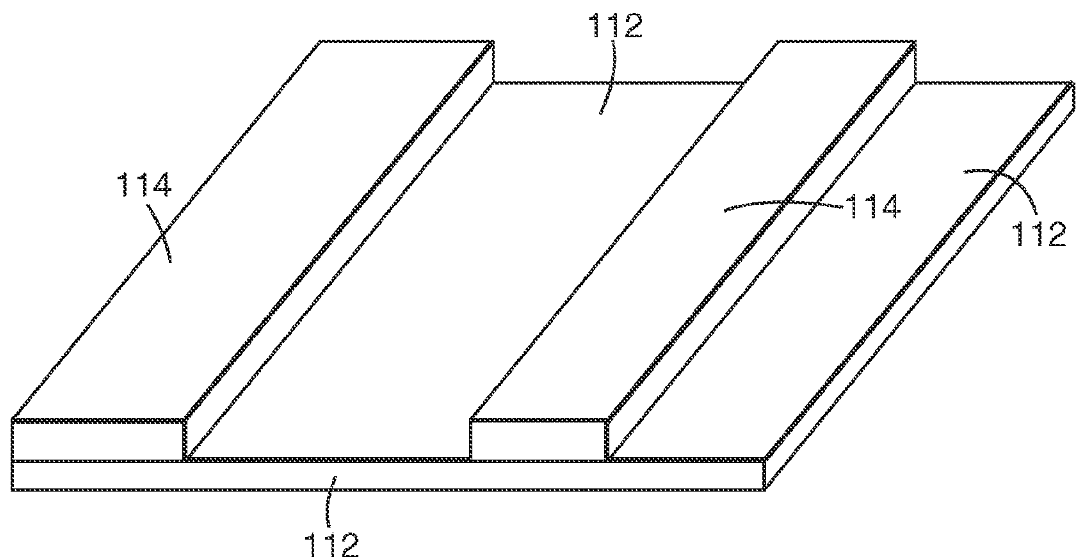
FIG. 16 is a plan view of the composite of FIG. 15 illustrating that the substrate may be provided in selected areas.

Although in many instances the substrate 104 will be coextensive with the multilayer optical film 102, it is also envisioned that the substrate may be attached only on selected areas of the multilayer optical film as depicted in FIG. 16 where the substrate 114 is provided in selected areas on the multilayer optical film 112. It will also be understood that the substrate 114 may be provided in the form of a grid, mesh or other discontinuous form on the multilayer optical film 112 to improve its post-formability. It may, for example, be advantageous to provide the substrate 114 discontinuously in manners that assist in defining the selected areas of the post-formed multilayer optical film as described above with respect to FIG. 14. In such an application, the substrate 114 may prevent or reduce drawing of the multilayer optical film 112 during post-forming in manners that are difficult or impossible to achieve through the use of post-forming techniques alone.

Regardless of whether the multilayer optical films used in connection with the present invention are included with substrates, underdrawn or fully drawn, etc. the selection of the materials in the films is discussed below.

Materials Selection

A variety of polymer materials suitable for use in the present invention have been taught for use in making coextruded multilayer optical films. For example, the polymer materials listed and described in U.S. Pat. Nos. 4,937,134, 5,103,337, 5,1225,448,404, 5,540,978, and 5,568,316 to Schrenk et al., and in U.S. Pat. Nos. 5,122,905, 5,122,906, and 5,126,880 to Wheatley and Schrenk are useful for making multilayer optical films according to the present invention. Of special interest are birefringent polymers such as those described in U.S. Pat. Nos. 5,486,949 and 5,612,820 to Schrenk et al, U.S. Pat. No. 5,882,774 (Jonza et al.), and U.S. application Ser. No. 09/006,601 (filed Jan. 13, 1998, now abandoned). Regarding the preferred materials from which the films are to be made, there are several conditions which should be met to make the multilayer optical films of this invention. First, these films should consist of at least two distinguishable polymers; the number is not limited, and three or more polymers may be advantageously used in particular films. Second, at least one of the two required polymers, referred to below as the first polymer, preferably has a stress optical coefficient having a large absolute value. In other words, it preferably should be capable of developing a large birefringence when stretched. Depending on the application, the birefringence may be developed between two orthogonal directions in the plane of the film, between one or more in-plane directions and the direction perpendicular to the film plane, or a combination of these. In the special case that the isotropic indices are widely separated, the preference for large birefringence in the first polymer may be relaxed, although at least some birefringence is desired. Such special cases may arise in the selection of polymers for mirror films and for polarizer films formed using a biaxial process which draws the film in two orthogonal in-plane directions. Third, the first polymer should be capable of maintaining birefringence after stretching, so that the desired optical properties are imparted to the finished film. Fourth, the other required polymer, referred to as the "second polymer", should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is often advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will typically be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will typically be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may typically be chosen so that, after processing, its refractive index will match that of the first polymer in either the stretching direction or the planar direction orthogonal to stretching. Further, the second polymer will typically be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative-positive or positive-negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and/or for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules applied to the visible spectrum will also generally be apply to the infrared and ultraviolet wavelengths, as well as any other electromagnetic radiation for which the films are designed.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Although many polymers may be chosen as the first polymer, certain of the polyesters have the capability for particularly large birefringence. Among these, polyethylene 2,6-naphthalate (PEN) is frequently chosen as a first polymer for films of the present invention. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention. The term "PET" as used herein will be understood to include PET and its high PET content copolymers that function similarly to PET alone.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly (aryl styrene)s, poly(styrene halide)s, poly(alkoxy styrene)s, poly(vinyl ester benzoate), poly(vinyl naphthalene), poly (vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly (butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly (ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For mirror films, a match of the refractive indices of the first polymer and second polymer in the direction normal to the film plane is sometimes preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52.

It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Some preferred multicomponent constructions are described in U.S. Pat. No. 6,207,260 (Wheatley et al.).

The selection criteria for the materials of the optical stack layers may also be useful in the selection of appropriate materials for thick internal or external skin protective layers. The criteria for the second polymer may be more desirable than those for the first polymer. In some cases, however, the mechanical properties of the birefringent first material, such as high glass transition temperature to reduce sticking to rollers, low coefficients of thermal expansion, mechanical stiffness, etc., may be desirable. In the case of films designed for post-forming, it may be desirable to use materials of lower draw stiffness to improve formability at a given applied stress, e.g., vacuum pressure, or otherwise improve extensibility.

EXAMPLES

Advantages of the invention are illustrated by the following examples. However, the particular materials and amounts thereof recited in these examples, as well as other conditions and details, are to be interpreted to apply broadly in the art and should not be construed to unduly limit the invention.

Example 1

Fully Drawn Mirror Film

A multilayer film of polyethylene 2,6-naphthalate (PEN) and polymethylmethacrylate (PMMA) was co-extruded, cast and drawn to make a fully drawn PEN:PMMA multilayer mirror film. A 0.48 IV PEN (made by 3M Co., St. Paul Minn.) was dried at 135° C. for 24 hours and then fed directly into a single screw extruder with an exit temperature of about 285° C. PMMA (CP-82 grade available from Ashland Chemical) was dried by feeding into a twin screw extruder equipped with a vacuum and with an exit temperature of about 260° C. The resin streams were co-extruded into a 224 multilayer feedblock set at 275° C. and equipped with an internal protective boundary layer (PBL). Pumping rates were maintained so that the approximate optical thickness of each PEN:PMMA layer pair was approximately equal in the optical stack, i.e. an “f-ratio” of 0.5. The PBL was supplied with PEN at approximately one-half the volume as that supplied to the sum of all the PEN layers in the optical stack. The layer pairs in the optical stack had an approximately linear gradient in optical thickness. The multilayer stack including the PBL was split with an asymmetric multiplier to form two streams in a width ratio of 1.55:1, spread to equivalent widths and re-stacked to form a two packet multilayer stack of 448 layers separated by an internal protective layer. An additional PEN (IV 0.48) skin was added to each side of the multilayer stack, with each skin layer comprising about 10% of the total volumetric flow. The total stream was cast from a die at about 285 C onto a quench wheel set at 65° C. The PEN skins refractive indices were essentially isotropic after casting with indices of 1.64 at 632.8 nm as measured by a Metricon Prism Coupler, available from Metricon, Piscataway, N.J. The cast thickness was approximately 0.07 cm.

The first draw process used a conventional length orienter (LO). The film was preheated with hot rollers set at 125 C and fed into a draw gap comprising a slow roll and fast roll and an infra-red heater set at 80% power. The infrared heater consisted of an assembly of IR heater elements (approximately 5000 watts per element), each about 65 cm long. The elements were approximately 10 cm above the film. Residence time in the draw gap was about 4 seconds. The fast roll was set to accomplish a 3.3 times draw and the drawn film was quenched. The average PEN indices were highly oriented at about 1.79, 1.59 and 1.55 as measured by the Metricon Prism Coupler) in the in-plane draw direction y-axis (MD), the in-plane crossweb direction x-axis (TD) and thickness (z) (ND) direction, respectively. The film was next drawn transversely using a conventional tenter in a second draw step to a final transverse draw ratio of about 4.0. The tenter was set at 132° C. in the preheat, 135° C. in the draw zone, 249° C. in the heat set zone and 49° C. in the quench zone. Preheating, drawing and heat setting were accomplished over periods of approximately 25, 5 and 40 seconds. The final PEN indices were 1.7284, 1.7585 and 1.5016 while the PMMA indices were approximately isotropic at 1.49, all at 632.8 nm as measured by the Metricon Prism Coupler. The measured reflectance band covered the spectrum from 400 nm to 950 nm with over 95% average reflectivity. The total polarizability was thus calculated as 1.1043 and the total polarizability difference was 0.0215 for the birefringent PEN layer. The density was estimated as 1.3549 g/cc as discussed above and the fractional crystallinity was calculated as 0.33.

Example 2

Underdrawn Mirror Film

A multilayer film of PEN and PETG (a copolymer of PET comprising some substitution of ethylene glycol with 1,4 cyclohexane diol during polymerization) was co-extruded, cast and drawn to make an underdrawn PEN:PETG multilayer mirror film. A 0.48 IV PEN (made by 3M Co., St. Paul Minn.) was dried at 135° C. for 24 hours and then fed directly into a single screw extruder with exit temperature about 285° C. PETG (available from Eastman Chemical, TN) was dried by feeding into a twin screw extruder equipped with a vacuum and with an exit temperature of about 285° C. These resin streams were co-extruded into a 209-multilayer feedblock set at 285° C. Pumping rates were maintained so that the approximate optical thickness of each PEN:PETG layer pair was approximately equal in the optical stack, i.e. an “f-ratio” of 0.5. The layer pairs in the optical stack had an approximately linear gradient in optical thickness. A PBL was then supplied with PEN in an amount approximately 20% of the final volumetric flow. The multilayer stack including the PBL was split with an asymmetric multiplier to form two streams in width ratio of 1.55:1, spread to equivalent widths and re-stacked to form a two packet multilayer stack of 418 optical layers separated by an internal protective layer. An additional PEN (IV 0.48) skin was added to each side of the multilayer stack, each skin layer comprising about 12.5% of the total volumetric flow. The total stream was cast from a die at about 285 C onto a quench wheel set at 65° C. The PEN skins refractive indices were essentially isotropic after casting with indices of 1.64 at 632.8 nm as measured by the Metricon Prism Coupler. The cast thickness was approximately 0.07 cm.

The first draw process used a conventional length orienter (LO). The film was preheated with hot rollers set at 120° C. and fed into a draw gap comprising a slow roll and fast roll and an infrared heater set at 60% power. The infrared heater consisted of an assembly of IR heater elements (approximately 5000 watts per element), each about 65 cm long. The elements were approximately 10 cm above the film. Residence time in the draw gap was about 4 seconds. The fast roll was set to accomplish a 2.7 times draw and the drawn film was quenched. The film was next drawn transversely using a conventional tenter in a second draw step to a final transverse draw ratio of about 3.3. The tenter was set at 132° C. in the preheat zone, 135° C. in the draw zone, 135 vC in the heat set zone and 49 C in the quench zone. Preheating, drawing and heat setting were accomplished over periods of approximately 25, 5 and 40 seconds. The final PEN indices were 1.69, 1.72 and 1.53 while the PETG indices were approximately isotropic at 1.56, all at 632.8 nm as measured by the Metricon Prism Coupler. Note that PMMA could be substituted for the PETG in this example with improved optical performance.

The film, made as described, is an underdrawn mirror film. This film was re-drawn simultaneously at 135° C. over 1 second to an additional measured true draw ratios of 1.27×1.22, with a biaxial draw ratio of about 1.55, as might occur during a thermoforming process. The same film was then further heat set for 4 minutes at 175° C. to form a fully drawn film. Shorter time periods, e.g. several seconds, could be applied at higher temperatures, e.g. 220° C., to accomplish similar heat set results. The underdrawn film had high extensibility. In another case, the underdrawn film was re-drawn simultaneously at 135° C. over 2.4 seconds to a measured true draw ratios of 1.63×1.58, i.e. the biaxial draw ratio during re-drawing was 2.6. The progress of index (n) development in the MD, TD and ND directions (x,y,z directions) at 632.8 nm as well as the calculated total polarizability (TP), total polarizability difference (TPD), estimated density (in g/cc) and fractional crystallinity (X) (calculated from the density) are presented in the following table:

| Case | MD n | TD n | ND n | TP | TPD | Density | X |
|---|---|---|---|---|---|---|---|
| Under-drawn | 1.6949 | 1.7283 | 1.5275 | 1.0904 | 0.0077 | 1.3379 | 0.1113 |
| Re-drawn 1.27 × 1.22 | 1.7033 | 1.7331 | 1.5168 | 1.0908 | 0.0080 | 1.3383 | 0.1167 |
| Re-drawn 1.63 × 1.58 | 1.7124 | 1.7302 | 1.5081 | 1.0891 | 0.0064 | 1.3363 | 0.0907 |
| Heat set | 1.7188 | 1.7511 | 1.4995 | 1.0962 | 0.0135 | 1.345 | 0.2021 |

In this series of examples, re-drawing to the higher biaxial draw ratio does not greatly alter the crystallinity or total polarizability.

Figure 17:
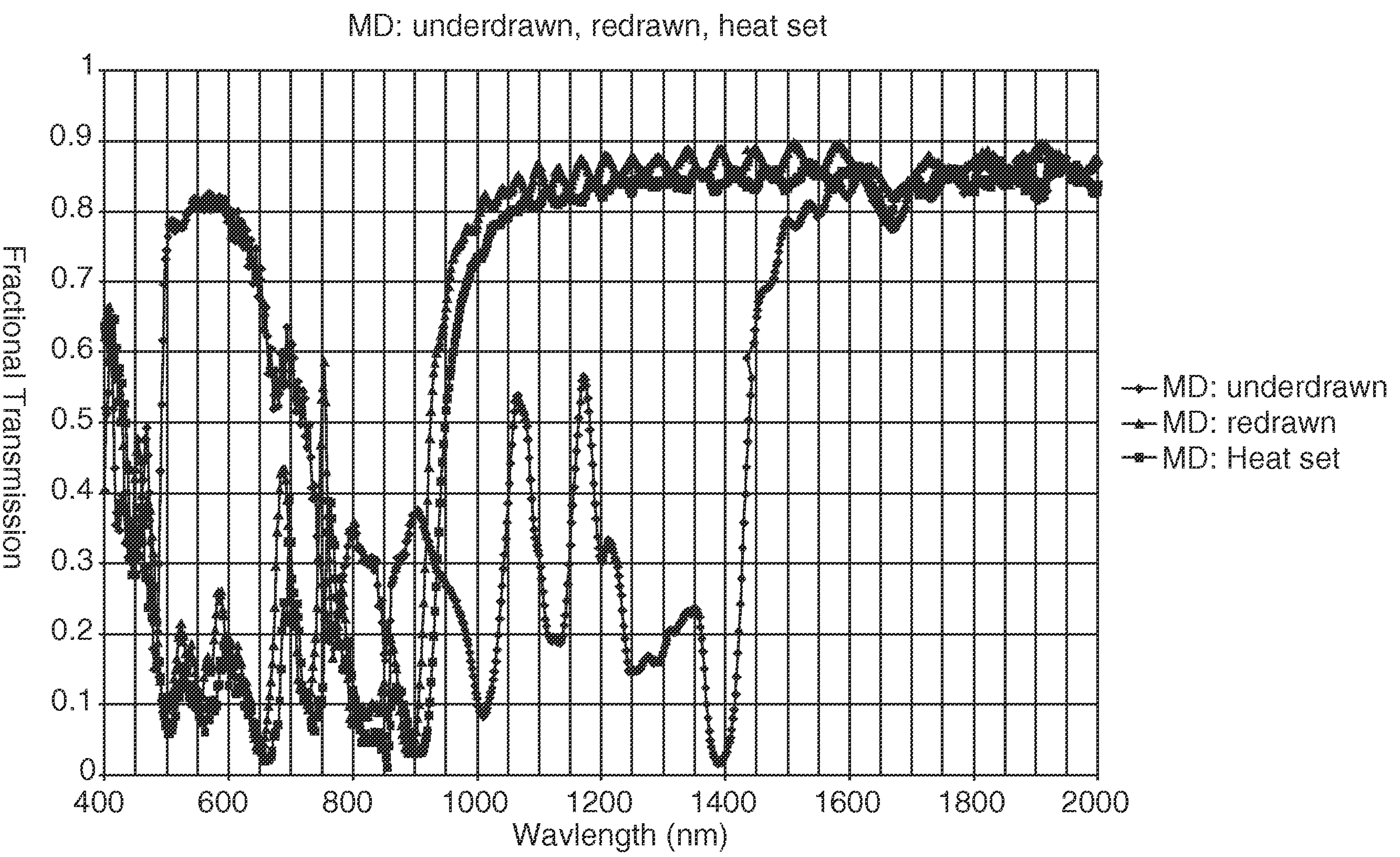
FIGS. 17 and 18 present the measured transmissions of light polarized in the MD and TD directions, respectively, as discussed in Example 2.
Figure 18:
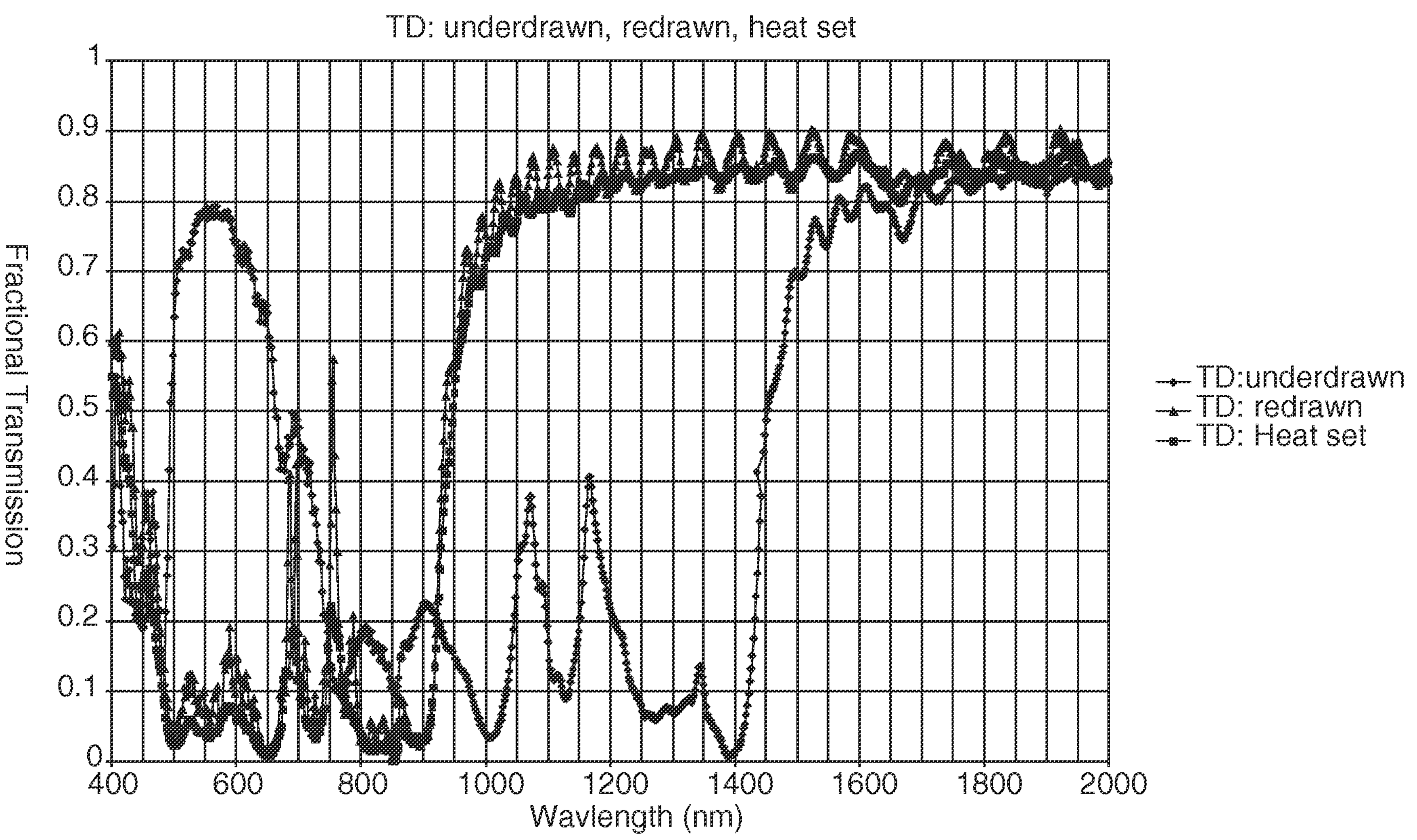

FIGS. 17 and 18 present the measured transmissions of light polarized in the MD and TD directions using a Perkin-Elmer Lambda-19. Outside of the multilayer reflection band, the transmission is about 85% rather than 100% due to surface reflections. The following table identifies some of the approximate spectral features:

| Case | Approx. Band | Ave. % Transmission MD | Ave. % Transmission TD | Approx. % Min. Transmission MD | Approx. % Min. Transmission TD | Location of Min. approx. |
|---|---|---|---|---|---|---|
| Under-drawn | 725-1425 nm | 26.2 | 14.7 | 1.8 | 0.5 | 1390 nm |
| Re-drawn 1.27 × 1.22 | 430-920 nm | 19.0 | 12.0 | 3.1 | 2.2 | 890 nm |
| Heat set | 420-950 nm | 15.6 | 10.0 | 1.1 | <0.3 | 855 nm |

The band is primarily the first order reflection band, although some second order reflections may also contribute to this band. Higher order peaks are evident as well, such as the third order peak at about 450 nm for the 1390 nm reflection peak (i.e. transmission valley). The band shifts in proportion to the biaxial draw ratio as expect between the underdrawn and re-drawn case. The band transmission decreases, i.e. the band reflectivity increases, after heat setting as a result of increased index differences between the birefringent PEN layers and the approximately isotropic PETG layers.

Example 3

Comparison of Fully Drawn, Underdrawn, and Cast Web Films

A fully drawn film made according to example 1, an underdrawn film made according to example 2 and an undrawn cast web made in a similar fashion to that in example 1 substituting a copolymer of PEN for the PEN layers and using thinner skins and PBL layers, were thermoformed into approximately spherical caps using the process described below The fully drawn film was a multilayer optical mirror film comprising approximately 400 optical layers alternating in PEN and PMMA with thicker PEN skin layers and a thick internal PEN layer, originally drawn 3.3×4.0. The underdrawn film was a multilayer optical mirror comprising approximately 400 optical layers alternating in PEN and PETG (a copolymer of PET) with thicker PEN skin layers and a thick internal PEN layer, originally drawn about 80% of the fully drawn film, i.e. 2.7×3.3, under similar process conditions of applied heating and line speed (e.g. strain rate) on the same process line. The cast web comprised approximately 400 layers alternating in a coPEN consisting of 90% PEN and 10% PET subunits (i.e. a 90/10 coPEN) and PMMA with thicker 90/10 coPEN skin layers and a thick internal 90/10 coPEN layer. The films were place over a circular aperture about 3.3 cm in diameter. A vacuum of nearly one atmosphere was applied and the films were heated for a few seconds using a heat gun. The temperature was estimated at about 200° C., using a thermocouple placed in the air stream of the heat gun at the same distance and residence time as the film.

The cast web drew the most but also drew the most unevenly, forming an elongated, roughly hemispherical cap. The base of the cap had an outer diameter of 3.2 cm. The height of the cap was about 1.75 cm. The cast web was originally about 675 microns thick. Near the top of the cap, the thickness varied between 140 and 225 microns. The biaxial draw ratio thus varied widely with a maximum value of around 4.8. The initial refractive index in the 90/10 coPEN skin layer was nearly isotropic, with a value of 1.6355 at 632.8 nm. At the thinnest part, the indices in the three principal directions in the final cap were approximately 1.6685, 1.6766 and 1.5784 at 632.8 nm.

The fully drawn mirror film and the underdrawn mirror films drew much more uniformly with a spread in thickness of about 10% or less across most of the approximately spherical cap, as would be expected with strain-hardening films. The fully drawn film was initially 68 microns and thinned to about 58 microns across the cap, giving a biaxial draw ratio of about 1.17. The base of the cap had an outer diameter of 3.25 cm. The height of the cap was about 0.55 cm. The indices of refraction in the birefringent PEN skin layer, initially at 1.7276, 1.7693 and 1.5014, remained about the same after thermoforming. The film remained highly reflective. The underdrawn film was initially 105 microns and thinned to about 78 microns across the cap, giving a biaxial draw ratio of about 1.35. The base of the cap had an outer diameter of 3.25 cm. The height of the cap was about 0.65 cm. The indices of refraction in the birefringent PEN skin layer, initially at 1.6939, 1.7367 and 1.5265, increased slightly in the originally in-plane directions to 1.7120 and 1.7467 while the thickness direction index decreased to 1.5081 after thermoforming. In this particular case, the initial underdrawn film was transparent at the lower spectral end of the visible wavelengths due to its increased thickness relative to the fully drawn film. The reflectivity across the visible spectrum increased in the spherical cap due to the band shifting to cover these lower wavelengths as well as the increase in index difference between the birefringent PEN and the nearly isotropic PETG layers.

Comparative Example 1

Thermoformed Cast Web

A cast web was about 34.5 mils thick was made as described in Example 1. The cast web as described in Example 3 was heated and vacuum formed into a deep cylindrical mold. The resulting part formed had a cylindrical shaft and a spherical end cap. The inner diameter of the cylinder was about 2.1 cm. The depth of the cylinder and spherical cap was about 1.9 cm. The deviation from the straight sides of the cylinder into the cap occurs at about 1 cm, so that the cap is nearly hemispherical. A grid was drawn on the part before forming with each line separated by about 0.6 cm.

Large nonuniformities in draw conditions were observed across the sample. Over the top of the cap, a grid segment was stretched to about 2.8 cm, suggesting a nominal draw over the hemisphere of about 4.7×4.7, resulting in a biaxial draw ratio of 22. Uniform drawing across the entire shaped part above the base would have required a biaxial draw ratio of about 4. There were signs of severe delamination failure in the cast web. This became a benefit for the analysis: to further analyze the part, the skin layer interior to the part was stripped off with the remainder of the piece remaining intact. Five samples were cut from the skin as shown in the table below:

| Sample | thickness (min.) | thickness (max.) | In-plane Index, nx | In-plane index, ny | Z Index, nz | biax draw ratio | Total Polarizability | Estimated Crystallinity |
|---|---|---|---|---|---|---|---|---|
| 1-base | 3.67 | 3.75 | 1.6435 | 1.6419 | 1.6429 | 1.0 | 1.330743 | 0.0186 |
| 2-top | 0.12 | 0.14 | 1.7293 | 1.7067 | 1.5419 | 28.5 | 1.353209 | 0.3077 |
| 3-cyl | 2.55 | 3.24 | 1.6572 | 1.6431 | 1.6275 | 1.45-1.15 | 1.3284 | −0.012 |
| 4-cyl | 1.25 | 1.76 | 1.6686 | 1.6395 | 1.6195 | 2.97-2.11 | 1.330097 | 0.0103 |
| 5-top | 0.12 | 0.14 | 1.7190 | 1.7030 | 1.5557 | 28.5 | 1.354125 | 0.3195 |

Thickness are measured in mils (0.001 inches). All optical measurements were taken at 632.8 nm using the Metricon Prism Coupler.

Sample #1 shows that the undrawn skin layer is about 11% of the total thickness of the cast web. Because of delamination, the base was only measured where this was not present. The biaxial draw ratio was then calculated using the ratio of this average base thickness to the final sample thickness.

Samples #2 and #3 were essentially at the top of the spherical cap. The true biaxial draw ratio is slightly higher than that anticipated by the gridline expansion as would be expected for a nonuniformly drawn piece: the cap is thinnest at the top. The thickness was determined both using a caliper gauge and using the thin film thickness calculation available on the Metricon. The latter yielded a value of 3.5 microns, that is, about 0.14 mils, in agreement with the caliper gauge. Note that the "in-plane" indices are less than other fully drawn mirror films, the high total polarizability resulting from the high z indices.

Sample #3 was taken from the bottom of the cylinder, from about 0.2 to 0.7 cm above the base. The long direction was cut around the circumference of the cylinder. This circumferential direction is considered the x direction for purposes of the preceding table. Sample #4 was cut directly above, from about 0.7 to 1.0 cm above the base. Apparently, the draw is more directed around the hoop of the cylinder than towards the cap as indicated by the indices of refraction. The low biaxial draw ratios lead to very low deviation from isotropy in this sample.

The effectiveness of the orientation process can also be seen by estimating the crystallinity using the concept of total polarizability. Due to experimental error, the estimates are only good to about +/−0.02 fractional crystallinity as defined here using the total polarizability concept. From the values indicated in the table, the base and cylinder wall sections were still essentially amorphous: only the highly drawn spherical cap had significant crystallinity. Besides the concomitant effects on reflectivity via the index differences, this non-uniformity also results in non-uniform mechanical properties of the formed part.

Example 4

Relative Extensibility of Fully Drawn and Underdrawn Films

The relative extensibility of a fully drawn film made in accordance with example 1 was compared to that of an underdrawn film made in accordance with example WM2. The initial biaxial draw ratio of the fully drawn film was 13.2 (3.3×4.0), while the initial biaxial draw ratio of the underdrawn film was 8.9 (2.7×3.3). Again, the draw conditions used to make these films were similar, except for the final draw ratios in each direction. Several samples of each were drawn simultaneously biaxially at an initial rate of 10%/second (e.g. 1.5×1.5 over 5 seconds) at 130° C. and 160° C. until breakage. A biaxial laboratory film stretcher was used, in which the film is gripped by pressure actuated clips. Because stress tends to concentrate at the clips, the film tends to break near a clip first and thus the reported elongation at break will tend to be slightly lower than what may be achieved under a more uniform stress field. The fully drawn samples tended to break at draw ratios of 1.3×1.3 or less, i.e. a biaxial draw ratio of about 1.7. The underdrawn samples tended to strain harden around draw ratios of 1.5×1.5 and tended to break around 1.7×1.7, i.e. a biaxial draw fully drawn film ratio of 2.9. A total biaxial draw ratio to break for each film case may be constructed by multiplying the initial biaxial draw ratio to form the film by the biaxial draw ratio to break. The total biaxial draw ratio to break for the fully drawn film is thus about 22.4 and for the underdrawn film about 25.9. The similarity might be expected given the similar process conditions. For example, fully drawn films made at higher temperatures or lower strain rates during the first drawing step, e.g. LO step, often require a higher draw ratio to achieve the same MD index level. Under these altered circumstances, the initial and total biaxial draw ratios would be higher for the fully drawn film than for the particular fully drawn film cited in this example. For the fully drawn film of this example, the total biaxial draw ratio may be slightly less than that of the underdrawn film of this example because the fully drawn film was also heat set.

Example 5

Uniaxial Extensibility of a Fully Drawn Film at Various Temperatures

The extensibility of a fully drawn film made in accordance with Example 1 was measured in uniaxial mode for a variety of temperatures using a standard Model #1122 Instron tensile tester available from Instron Corp., Canton Mass. Strips 2.5 cm wide were cut and mounted with an initial draw gap of 5 cm. Averages were taken over 5 samples and the maximum elongation also noted among the samples. The jaw up speed was set at 30 cm/second. The results are provided in the following table:

| Temperature ° C. | Average Elongation % | Maximum % Elongation | St. Dev. Of % Elongation | Nominal Peak Stress (psi) |
|---|---|---|---|---|
| 204 | 59.4 | 73.6 | 10.4 | 268 |
| 177 | 67.9 | 84.6 | 16.9 | 386 |
| 163 | 81.0 | 86.1 | 5.3 | 467 |
| 149 | 90.0 | 116.4 | 20.9 | 602 |
| 135 | 82.1 | 110.1 | 17.8 | 661 |
| 121 | 89.6 | 96.2 | 4.3 | 888 |

The draw ratio at break is the elongation at break plus unity, i.e. 1.82 for 135° C. Notice that the elongation to break is similar at 130° C. and 160° C. as in example 4. The peak stress usually coincided with the break stress. This example indicates the utility of elevating the post-forming temperature to lower the nominal drawing stress, e.g. to obtain greater formability for a given forming stress, e.g. a vacuum pressure. Thus thermoforming at lower pressures to the same extent of final biaxial draw can be achieved with higher forming temperatures under the conditions of this example. This example also indicates a reduction in extensibility as the post-forming temperature approaches the peak crystallization rate temperature. The draw ratio at break is reasonably constant at about 1.85 until the temperature of peak crystallization is approached (220° C.).

The draw ratios in the preceding table are not the biaxial draw ratios because the width is unconstrained and can neck down during elongation. A purely elastic, incompressible neck down in a true uniaxial draw to 1.85 draw ratio would result in a final neck down draw ratio of about 0.74 across the sample width and a final biaxial draw ratio of 1.36. The actual final draw ratio across the sample width was intermediate between 1.0 and 0.74, thus the biaxial draw ratio compares favorably with the reported extensibility of the fully drawn film in biaxial mode of example 4. Other factors that can effect the comparison include the less concentrated stress at the clips which might raise the biaxial draw ratio and the uni-directional nature of the extension which might lower the biaxial draw ratio.

Example 6

Postforming an Underdrawn Reflective Polarizer Film

A multilayer film of PEN and coPEN was co-extruded, cast and drawn to make a variety of PEN:coPEN multilayer reflective polarizer films. A 0.48 IV PEN (made by 3M Co., St. Paul Minn.) was dried at 135° C. for 24 hours and then fed directly into a single screw extruder with exit temperature about 285° C. A 0.54 IV 70/0/30 coPEN (i.e. a copolymer of PEN formed from 70% naphthalene dicarboxylic acid and 30 dimethyl isophthalate proportions by weight, and ethylene glycol; also made by 3M Co., St. Paul) was dried by feeding into a twin screw extruder equipped with a vacuum and with an exit temperature of about 285° C. The intrinsic viscosities (IV) were measured on resin pellets using a 60/40 weight % phenol/o-dichlorobenzene solvent at 30° C. These resin streams were co-extruded into a 224 multilayer feedblock set at 285° C. and equipped with an internal protective boundary layer (PBL). Pumping rates were maintained so that the approximate optical thickness of each PEN:coPEN layer pair was approximately equal in the optical stack, i.e. an "f-ratio" of 0.5. The PBL was supplied with coPEN in approximately one-half the volume as that supplied to the sum of all the PEN layers in the optical stack. The layer pairs in the optical stack had an approximately linear gradient in optical thickness. The multilayer stack including the PBL was split with an asymmetric multiplier to form two streams in width ratio of 1.55:1, spread to equivalent widths and re-stacked to form a two packet multilayer stack of 448 layers separated by an internal protective layer. The multilayer stack including the PBL was split again with an asymmetric multiplier to form two streams in width ratio of 1.25:1, spread to equivalent widths and re-stacked to form a four packet multilayer stack of 896 layers separated by an internal protective layer. An additional coPEN (IV 0.54) skin was added to each side of the multilayer stack with each skin layer comprising about 10% of the total volumetric flow. The total stream was cast from a die at about 285 C onto a quench wheel set at 65° C. The coPEN skins refractive indices were essentially isotropic after casting with indices of 1.6225 at 632.8 nm as measured by the Metricon Prism Coupler. The cast thickness was approximately 0.066 cm.

The film was drawn transversely using the laboratory biaxial stretcher of example 2. In each case, the draw ratio in the second in-plane direction was approximately unity. Case 1 was drawn at 130° C. and an initial rate of 20%/second over 20 seconds to a final measured draw ratio of 4.8 in a single draw step. Cases 2 and 3 were made using a very underdrawn intermediate. Cases 2 and 3 were drawn to approximately 3.5×, at 130° C., at an initial rate of 20%/second and over a total of 10 seconds. These Cases 2 and 3 were then re-heated for 44 seconds at the second draw step process temperature, i.e. the post forming step temperature, and post formed by drawing over 10 seconds in the same direction as the first step to a final draw ratio of about 4.5. Case 2 was re-heated and post formed at 130° C. with a final measured draw ratio of 4.6. Case 3 was re-heated and post formed at 175° C. with a final measured draw ratio of 4.4. Case 4 was made by a similar process to the first drawing step of Cases 2 and 3, i.e. drawn at 130° C. over 13 seconds to a final measured draw ratio of 3.8. Case 4 was then heated for 65 seconds at 130° C. without re-drawing. Thus Case 4 is indicative of an underdrawn portion of a final article that undergoes the post-forming temperatures without additional draw or post-forming heat set. Case 5 was drawn at 130° C. and an initial rate of 20%/second over 25 seconds to a final measured draw ratio of 5.4 in a single draw step. Case 6 was made by a similar process to the first drawing step of Cases 2 and 3, i.e. drawn at 130° C. over 13 seconds to a final measured draw ratio of 3.8. Case 6 was then heated for 65 seconds at 175° C. without re-drawing. The following table presents the final index values of the post formed film as measured using the Metricon Prism Coupler at 632.8 nanometers. The draw direction is x, the non-drawn in-plane direction is y, and the thickness direction is z. The calculated total polarizability (TP) is estimated for the birefringent layer, as are the total polarizability differences (TPD), the estimated density (in g/cc) and the fractional crystallinity (X) calculated based on the estimated density.

| Case | n x | n y | n z | TP | TPD | Density | X |
|---|---|---|---|---|---|---|---|
| 1, skin | 1.6426 | 1.6194 | 1.6110 | | | | |
| 1, stack | 1.7067 | 1.6211 | 1.5871 | | | | |
| 1, est. PEN | 1.7708 | 1.6228 | 1.5632 | 1.0925 | 0.0098 | 1.3405 | 0.1437 |
| 2, skin | 1.6330 | 1.6228 | 1.6195 | | | | |
| 2, stack | 1.7053 | 1.6218 | 1.5933 | | | | |
| 2, est. PEN | 1.7776 | 1.6208 | 1.5671 | 1.0969 | 0.0142 | 1.3459 | 0.2139 |
| 3, skin | 1.6254 | 1.6251 | 1.6230 | | | | |
| 3, stack | 1.7338 | 1.6258 | 1.5720 | | | | |
| 3, est. PEN | 1.8422 | 1.6265 | 1.5210 | 1.1025 | 0.0198 | 1.3528 | 0.3019 |
| 4, skin | 1.6315 | 1.6183 | 1.6188 | | | | |
| 4, stack | 1.6859 | 1.6251 | 1.5948 | | | | |
| 4, est. PEN | 1.7403 | 1.6282 | 1.5710 | 1.0870 | 0.0042 | 1.3337 | 0.0564 |
| 5, skin | 1.6424 | 1.6187 | 1.6142 | | | | |
| 5, stack | 1.7251 | 1.6183 | 1.5789 | | | | |
| 5, est. PEN | 1.8078 | 1.6185 | 1.5436 | 1.0966 | 0.01388 | 1.3455 | 0.2088 |
| 6, skin | 1.6256 | 1.6225 | 1.6220 | | | | |
| 6, stack | 1.7254 | 1.6227 | 1.5714 | | | | |
| 6, est. PEN | 1.8252 | 1.6229 | 1.5208 | 1.0943 | 0.0115 | 1.3427 | 0.1719 |

Case 1 is thus an example of a single step process that makes an underdrawn film. Cases 2 and 3 begin with an underdrawn intermediary but finish as fully drawn. Case 4 is approximately that underdrawn intermediary. It represents a low level of effective drawing (e.g. Regime II). Case 5 is a single-step fully drawn reflective polarizer. Case 6 is the underdrawn intermediary re-heated as in a post forming step without further drawing with a greatly enhanced level of effective drawing compared to Case 4 (e.g. Regime III).

The following table summarizes the optical performance of the various Cases:

| Case | Blue Edge | Red Edge | Ave. Fractional Transmission | Minimum Transmission | Location of Minimum |
|---|---|---|---|---|---|
| 1 | <400 nm | 900 nm | 0.117 | 0.003 | 852 nm |
| 2 | 413 | 973 | 0.112 | 0.012 | 897 |
| 3 | 403 | 1012 | 0.115 | 0.003 | 941 |
| 4 | 480 | 1074 | 0.199 | 0.033 | 992 |
| 5 | <400 | 885 | 0.063 | 0.002 | 810 |
| 6 | 470 | 1080 | 0.109 | 0.005 | 840 |

The blue edge is defined as the lower edge of the reflection band where the fractional transmission is 0.5. The red edge is defined as the upper edge of the reflection band where the fractional transmission is 0.5. The average transmission is a flat average across the reflection band from the blue edge plus 20 nm to the red edge minus 20 nm. The minimum transmission is the lowest value measured where the transmission measurement is smoothed over 3 nm, and the location is the wavelength of this occurrence. The band positions in part result from the different biaxial draw ratios and in part from the varying initial stack thickness of the cast web. The pass fractional transmissions were uniformly high across the reflection bands for every case, with band averages of greater than 0.86. The difference between this result and unity is accounted for the most part by surface reflections.

Cases 1, 2 and 3 are all films underdrawn to the final same amount. These cases demonstrate the utility of making an underdrawn film, e.g. Case 4, of low orientation and crystallinity (e.g. total polarizability) which is then subsequently post formed (e.g. into a shaped article). Case 4 underdrawn films can be further post formed as described in example 7.

Case 6 demonstrates the utility of a post forming heat setting step, e.g. after the shaping of an article by drawing and/or molding. Case 6 demonstrates at least the same optical performance as the re-drawn underdrawn cases. Thus a single article formed from an initially underdrawn film could have both re-drawn and non-drawn areas with similar optical performance. This performance compares reasonably with a fully drawn film.

Figure 19:
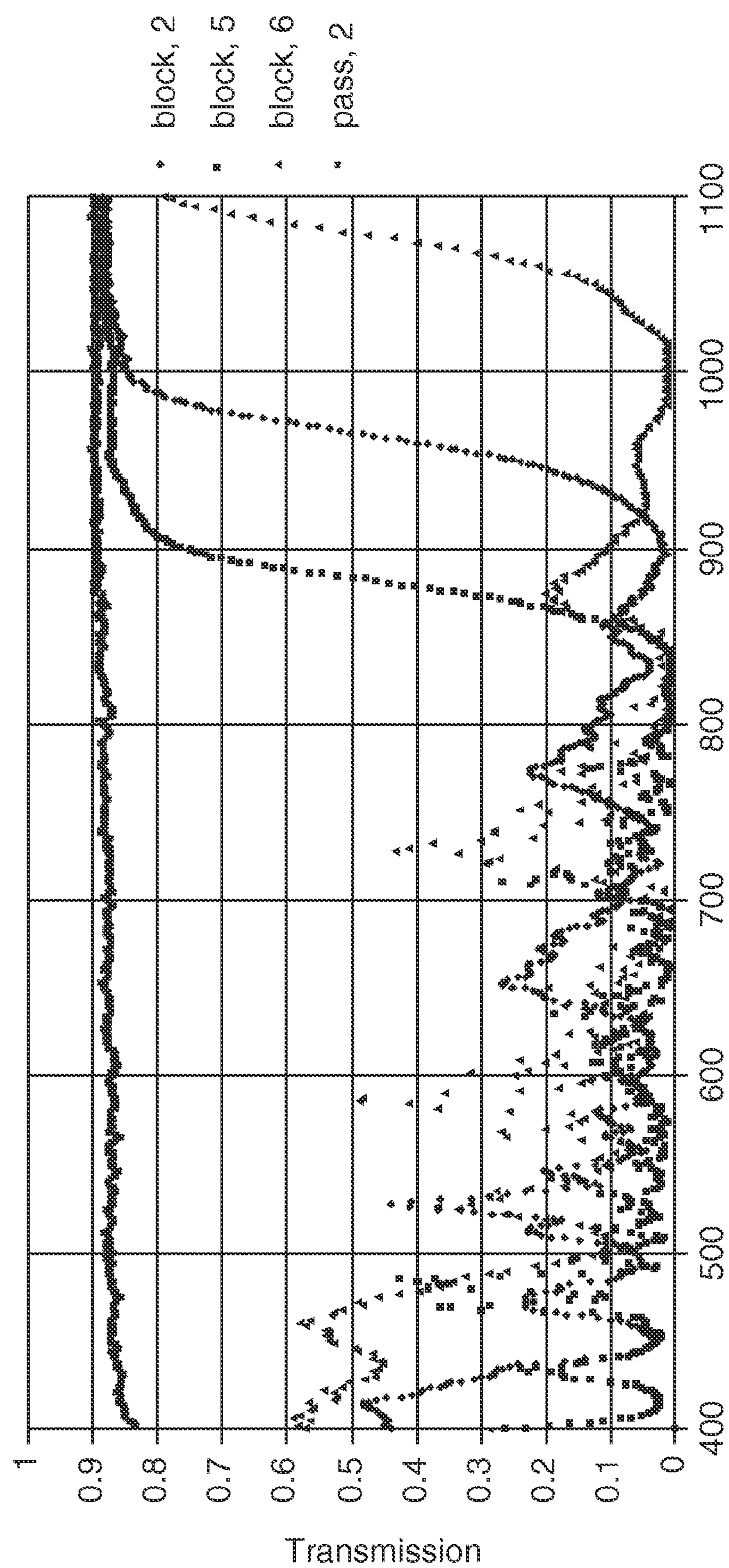
FIG. 19 compares the spectra of cases 2, 5 and 6 as discussed in Example 6.

FIG. 19 compares the spectra of cases 2, 5 and 6, for the block states of the reflective polarizer, i.e. the fractional transmission of light polarized in the draw direction at normal incidence. A typical pass state, i.e. the fractional transmission of light polarized in the non-drawn in-plane direction at normal incidence, is also presented.

approximately 4.8. This is case B. A portion of the film was destructively peeled and indices measured at 632.8 nm. Transmission spectra were measured using the Perkin-Elmer Lambda-19 spectrophotometer. Finally, the sample was again preheated for 25 seconds at 135° C., then further preheated for 25 seconds at 160° C. and re-drawn over another 4 seconds to a final measured draw ratio of approximately 6.0. This is case C. A portion of the film was destructively peeled and indices measured at 632.8 nm. Transmission spectra were measured using a Perkin-Elmer Lambda-19 spectrophotometer. The following table presents the final index values of the post formed film as measured using a Perkin-Elmer Lambda-19 spectrophotometer. The draw direction is x, the non-drawn in-plane direction is y, and the thickness direction is z. The calculated total polarizability (TP) is estimated for the birefringent layer, as are the total polarizability differences(TPD), the density (in g/cc) and the fractional crystallinity (X).

| Sample | n x | n y | n z | TP | TPD | Density | X |
|---|---|---|---|---|---|---|---|
| B, skin | 1.6426 | 1.6194 | 1.6152 | | | | |
| B, stack | 1.7704 | 1.6185 | 1.5864 | | | | |
| B, est. PEN | 1.7704 | 1.6176 | 1.5576 | 1.0908 | 0.0081 | 1.3384 | 0.1176 |
| C, skin | 1.6330 | 1.6228 | 1.6195 | | | | |
| C, stack | 1.7053 | 1.6218 | 1.5933 | | | | |
| C, est. PEN | 1.7776 | 1.6208 | 1.5671 | 1.0969 | 0.0142 | 1.3459 | 0.2139 |

It should be noted that a homogeneous undrawn cast web of PEN was drawn according to the conditions of Cases 1 and 5 at 175° C. The cast film drew non-uniformly and remained essentially isotropic. This should be contrasted with Case 3, which was underdrawn to about 3.5 at 130 C and then re-drawn at 175 C with approximately the same optical effect as the underdrawn film Case 2 and the single-step underdrawn film Case 1. According to the index measurements, the higher post-forming temperature of Case 3 could improve the optical performance. Actual performance of these cases is also affected by the band widths: wider bands tend to be leakier than narrower bands using the same layer gradient. Dispersion, i.e. the change in index with wavelength, is another factor. The index difference between the PEN and coPEN layers in this example tend to increase with decreasing wavelength. Thus the same stack construction will have better optical performance as the red edge shifts to lower wavelengths.

Example 7

Postforming an Underdrawn Film in Multiple Steps

An underdrawn reflective polarizer film may also be post formed through multiple steps. In this example, an undrawn multilayer cast web of PEN and coPEN was co-extruded and cast according to example 6. The film was drawn transversely using the laboratory biaxial stretcher of example 2. In each case, the draw ratio in the second in-plane direction was approximately unity. In case A, the cast web first was drawn at 135° C. and an initial rate of 20%/second over 10 seconds to a measured draw ratio of 3.2 in a single draw step. The film of case A could not be peeled apart using typical methods. The transmission spectra were measured using a Perkin-Elmer Lambda-19 spectrophotometer and the sample was preheated for 25 seconds at 135° C., then further preheated for 25 seconds at 160° C. and re-drawn over another 10 seconds to a final measured draw ratio of In these cases, the effect of the second re-drawing step was to increase the total polarizability and the amount of effective draw with only a modest effect on the index differences.

Figure 20:
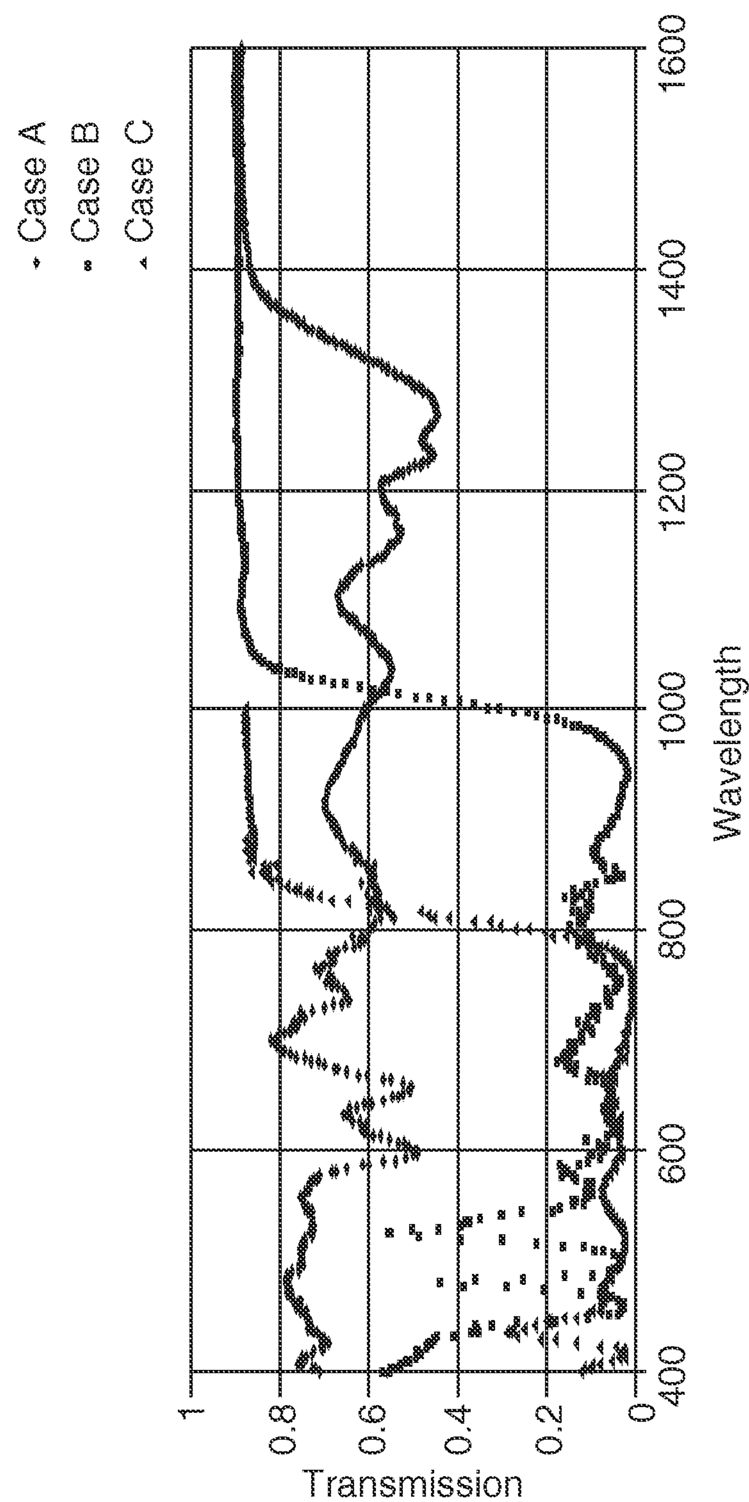
FIG. 20 presents the block fractional transmissions for the three cases discussed in Example 7.

FIG. 20 presents the block fractional transmissions for the three cases. The strength of the block reflectance band is similar for cases B and C. The band is slightly improved in case C in part due to an increase in the layer density due to thinning from case B to C.

Example 8

Thermoformed Mirror Film Headlamp

A 35.6 cm.×35.6 cm. (14 inch by 14 inch) sample of polymeric multilayer mirror film made according to Example 1 was thermoformed into the shape of a rectangular headlamp using a Formech 450 Vacuum Forming Machine (obtained from 6 McKay Trading Estate, Kensal Road, London). To start, the controls for heating zones 1, 2, and 3 of the vacuum former were set to level 3, and the apparatus was allowed to equilibrate for at least 30 minutes to ensure that the heating plate was at the correct temperature. A room temperature silicone rubber mold in the shape of a rectangular headlamp (Wagner's Halogen Headlamp H4701 High Beam) was placed in the center of the movable platform on the vacuum former, with the longest dimension pointing to the right and left with respect to the operator. The frame of the vacuum former was unlocked and lifted up, and the multilayer mirror film was taped over the open cavity directly above the mold and movable platform. The entire perimeter of the film was securely taped down using 5.08 cm (2 inch) wide Scotch™ brand 471 tape (available from 3M Company, St. Paul, Minn.) to ensure a hermetic seal, which is needed to maintain vacuum at a later step. It is important to ensure that there are no wrinkles in the tape that may create channels through which the vacuum might leak. The frame of the vacuum former was then closed down and locked to ensure a tight closure.

Two 1.27 cm (½ inch) metal block spacers were placed on the vacuum former frame's corners closest to the operator in order to allow the heating plate to be raised sufficiently to allow room for the mold. The heating plate was then slid onto the metal blocks so that the rails of the hot plate would lie on the edge of these blocks, and the heating plate was kept in position for 30 seconds to soften the film. The movable platform containing the silicone rubber mold was then raised all the way up so that the mold would deform the multilayer mirror film. The vacuum was immediately turned on and a vacuum pulled in order to stretch the film around the mold.

After ten seconds, the heating plate was removed from the sample by lifting a few inches and sliding it back into its original position. Lifting the hot plate is important to avoid burning the film. The film was then allowed to cool for about 10 seconds and the vacuum was turned off. After about 15 seconds, the movable platform and mold were dropped away from the film and the metal spacer blocks were removed from the vacuum former. The frame of the vacuum former was then unlocked and lifted to allow removal of the tape and film. This procedure resulted in a thermoformed article with no significant wrinkles or color distortions when viewed at a direction normal to the film.

Example 9

Embossed Color Shifting Security Film

A color shifting security film was made and embossed according to Examples 1 and 4 in U.S. Pat. No. 6,045,894 (Jonza et al.), which is herein incorporated by reference. A multilayer film containing about 418 layers was made on a sequential flat-film making line via a coextrusion process. This multilayer polymer film was made PET and ECDEL™ 9967 where PET was the outer layer or "skin" layer. A feedblock method (such as that described by U.S. Pat. No. 3,801,429) was used to generate about 209 layers with an approximately linear layer thickness gradient from layer to layer.

The PET, with an intrinsic viscosity (IV) of 0.60 dl/g was pumped to the feedblock at a rate of about 34.0 Kg/hr and the ECDEL™ at about 32.8 Kg/hr. After the feedblock, the same PET extruder delivered PET as protective boundary layers to both sides of the extrudate at about 8 Kg/hr total flow. The material stream then passed though an asymmetric double multiplier, as described in U.S. Pat. Nos. 5,094,788 and 5,094,793, with a multiplier ratio of about 1.40. The multiplier ratio is defined as the average layer thickness of layers produced in the major conduit divided by the average layer thickness of layers in the minor conduit. Each set of 209 layers has the approximate layer thickness profile created by the feedblock, with overall thickness scale factors determined by the multiplier and film extrusion rates.

The ECDEL™ melt process equipment was maintained at about 250° C., the PET (optics layers) melt process equipment was maintained at about 265° C., and the multiplier, skin-layer meltstream and die were maintained at about 274° C. The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 268° C. In this manner the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution which results in a narrower reflectance spectrum. Some layer thickness errors are introduced by the multiplier, and account for the minor differences in the spectral features of each reflectance band. The casting wheel speed was set at 6.5 m/min (21.2 ft/min).

After the multiplier, thick symmetric skin layers were added at about 35.0 Kg/hour that was fed from a third extruder. Then the material stream passed through a film die and onto a water cooled casting wheel. The inlet water temperature on the casting wheel was about 7° C. A high voltage pinning system was used to pin the extrudate to the casting wheel. The pinning wire was about 0.17 mm thick and a voltage of about 5.5 kV was applied. The pinning wire was positioned manually by an operator about 3-5 mm from the web at the point of contact to the casting wheel to obtain a smooth appearance to the cast web. The cast web was continuously oriented by conventional sequential length orienter (LO) and tenter equipment. The web was length oriented to a draw ratio of about 2.5 at about 100° C. The film was preheated to about 100° C. in about 22 seconds in the tenter and drawn in the transverse direction to a draw ratio of about 3.3 at a rate of about 20% per second. The film was heat set for about 20 seconds in an oven zone set at 226° C.

The finished film had a final thickness of about 0.08 mm. The band edge at normal incidence was 720 nm, just beyond the visible edge of 700 nm, so that the film looked clear. At 45 degrees, the band edge had shifted over to 640 nm, and the film appeared cyan. At 60 degrees, the total lack of transmitted red light made the film a brilliant cyan, due to the high reflectance of the multilayer stack even at this angle of incidence. If this film is viewed where there is only a single light source, the specular reflection was evident (red) even with a white paper background. When laminated to a black background (no transmitted light), the red was easily visible. Although this film exhibited the desired color change, a film of fewer layers and narrower bandwidth would be more desirable.

The film was then embossed between a roll at 149° C. (300° F.) and a pre-heated plate. The film thinned down from 3.4 mils to about 3.0 mils in the embossed regions. A surprising result of this embossing was the how apparent a gold reflection became. A bright gold was observed in the embossed region changing to cyan or deeper blue as the viewing angle is made shallower. The appearance was similar to gold leaf, yet (at least in this example) is not as uniform. Bright red and green were also apparent. The dramatic change from gold to blue while the unembossed areas change from clear to cyan provided an overt verification feature that was more dramatic than a transparent hologram.

Example 10

Vacuum Forming of a Trifurcated Light Guide

A trifurcated light guide was vacuum formed from a highly reflective PEN/PMMA multilayer mirror that was made as described in Example 2 of U.S. Pat. No. 6,080,467 (Weber et al.). A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil. The bandwidth at normal incidence was about 350 nm with an average in-band extinction of greater than 99%. The amount of optical absorption was difficult to measure because of its low value, but was less than 1%.

A 17.8 cm (7 inch) by 25.4 cm (10 inch) by 2.5 cm (1 inch) block of wood was used to prepare a vacuum forming mold. A series of small holes were drilled in the lowest part of grooves routed in the wood as shown in FIG. 10. After removing the release liner from one side of an acrylic foam double sided tape, the adhesive was applied to the periphery on the non-routed side of the wood block to form a chamber beneath the mold; the second release liner was not removed from the other side of the adhesive tape. The mold was then placed on the vacuum table of a vacuum forming apparatus. The multilayer film was mounted in a heating frame, and the film was heated for 4 minutes beneath an electrical heating element to 177° C. (350° C.). The film was then rapidly lowered onto the evacuated mold, drawing the polymer film into the grooved cavity. The film maintained its high reflectivity after the vacuum forming operation.

While the formed film was still in the mold, double-sided adhesive tape was applied to the portions of the film that were not drawn into the mold. A second sheet of mirror film was then adhered to the formed mirror film. The tips of the four termini were cut off to form an inlet with three outlets as shown in FIG. 10. The terminus of a fiber optic light fixture was inserted into the inlet of the light guide, and when light was directed into the light guide input, light emerged from each of the outlets.

Example 11

Structured Surfaced Multilayer Optical Film

A coextruded film containing 601 layers of PEN/coPEN was made on a sequential flat-film-making line via a coextrusion process as described in Example 10 of U.S. Pat. No. 5,882,774 (Jonza et al.). A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6naphthalene dicarboxylate methyl ester, 15% dimethyl isophthalate and 15% dimethyl terephthalate with ethylene glycol. The feedblock method was used to generate 151 layers. The feedblock was designed to produce a gradient distribution of layers with a ration of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils. Samples of the film were embossed using four different nickel electroformed tools and a large hydraulic Wabash Press equipped with a 7.6 cm (3 inch) piston and a platens heated to 191° C. (375° F.).

An X-cut fastener (negative) tool was placed on a 2.54 mm (0.1 inch) thick sheet of aluminum. The mirror film was placed on the tool and then covered with two sheets of 3 mil polyester terephthalate and another sheet of 0.1 inch aluminum. The sandwich was placed closed between the heated platens with minimal pressure and the sandwich was heated for 60 seconds. A force of 6000 lbs was applied to the sandwich for 60 seconds. After the force was removed, the embossed film was removed from the tool. The post-formed film showed altered colors in the square embossed areas with both transmitted and reflected light due to thinning of the multilayer optical stack.

A linear section of the X-cut fastener tool was placed on a 2.54 mm (0.1 inch) thick sheet of aluminum. The mirror film was placed on the tool and then covered with two sheets of 3 mil polyester terephthalate and another sheet of 0.1 inch aluminum. The sandwich was placed closed between the heated platens with minimal pressure and the sandwich was heated for 60 seconds. A force of 6000 lbs was applied to the sandwich for 60 seconds. After the force was removed, the embossed film was removed from the tool. The post-formed film showed altered colors in the linear embossed areas with both transmitted and reflected light due to thinning of the multilayer optical stack.

An X-cut flat top (positive) tool was placed on a stack of 16 sheets of notebook paper because of the rough back of the tool. The tool and paper were placed on a 2.54 mm (0.1 inch) thick sheet of aluminum. The mirror film was placed on the tool and then covered with two sheets of 3 mil polyester terephthalate and another sheet of 0.1 inch aluminum. The sandwich was placed closed between the heated platens with minimal pressure and the sandwich was heated for 90 seconds. A force of 6000 lbs was applied to the sandwich for 60 seconds. After the force was removed, the embossed film was removed from the tool. The post-formed film showed altered colors in the pyramidal embossed areas with both transmitted and reflected light due to thinning of the multilayer optical stack.

A 21 mil cube corner tool was placed on a 2.54 mm (0.1 inch) thick sheet of aluminum. The mirror film was placed on the tool and covered with a sheet of ¼ inch silicone rubber. The sandwich was placed closed between the heated platens with minimal pressure and the sandwich was heated for 30 seconds. A force of 2000 lbs was applied to the sandwich for 60 seconds. After the force was removed, the perforated film was removed from the tool. The post-formed film showed altered colors in the hexagonal embossed areas with both transmitted and reflected light due to thinning of the multilayer optical stack.

The same 21 mil cube corner tool was also used to cold emboss the multilayer optical film. The cube corner tool was adhesively attached to a 0.25 inch sheet of polymethylmethacrylate. The mirror film was placed on the tool and covered with a sheet of ¼ inch silicone rubber. The sandwich was placed into the press and a force of 2000 lbs was applied to the sandwich for 10 seconds. After the force was removed, the embossed film was removed from the tool. The post-formed film showed altered colors in the triangular pyramidal embossed areas with both transmitted and reflected light due to thinning of the multilayer optical stack.

The structured surfaced multilayered films of this example are useful as optical filters, controlled transmission reflectors, optical diodes, diffuse polarizing/depolarizing reflectors, focussing reflectors, decorative films, and light guides. The thin flexible films can be used in the same ways as a highly reflective metallized film without worry of corrosion and cracking of the metallic thin film upon severe/extreme deformation, embossing, or perforation or the dangers associated with their conductivity.

Example 12

Corrugated Ribbons

Figure 21:
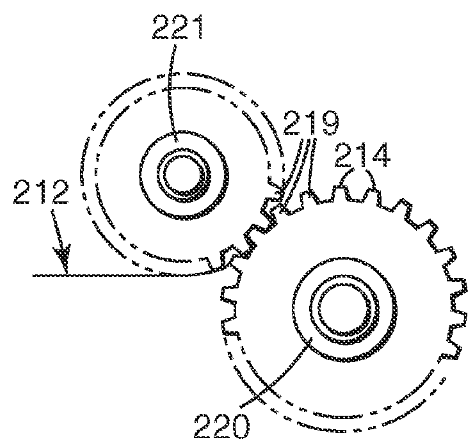
FIG. 21 is a partial schematic diagram of a corrugating apparatus used in connection with Example 12.

A post-forming process that may be used to produce a decorative item, such as any of the previously mentioned decorative items, is a corrugation process. FIG. 21 shows an arrangement for corrugating the films that includes first and second generally cylindrical corrugating members or rollers 220 and 221 each having an axis and a multiplicity of spaced ridges 219 defining the periphery of the corrugating members 220 and 221. Each corrugating member 220 and 221 is driven by its own drive mechanism. The spaces between ridges 219 are adapted to receive ridges 219 of the other corrugating member in meshing relationship with the multilayer optical film 212 inserted therebetween. The arrangement also includes means for rotating at least one of the corrugating members 220 or 221 so that when the film 212 is fed between the meshed portions of the ridges the film 212 will be generally conformed to the periphery of the first corrugating member 220.

Process parameters that influence the decorative appearance of the resulting corrugated films include the temperatures of the corrugating rollers, the nip pressure between the corrugating rollers, the diameter of the corrugating rollers, the line speed, the shape of ridges 219, and the number of corrugations per inch that the rollers are designed to produce. The number of corrugations per inch is determined by the spacing between ridges 219. Specifically, a pair of intermeshing ridges creates one corrugate. As the examples presented below will illustrate, these parameters may be adjusted to produce different decorative effects.

Figure 22:
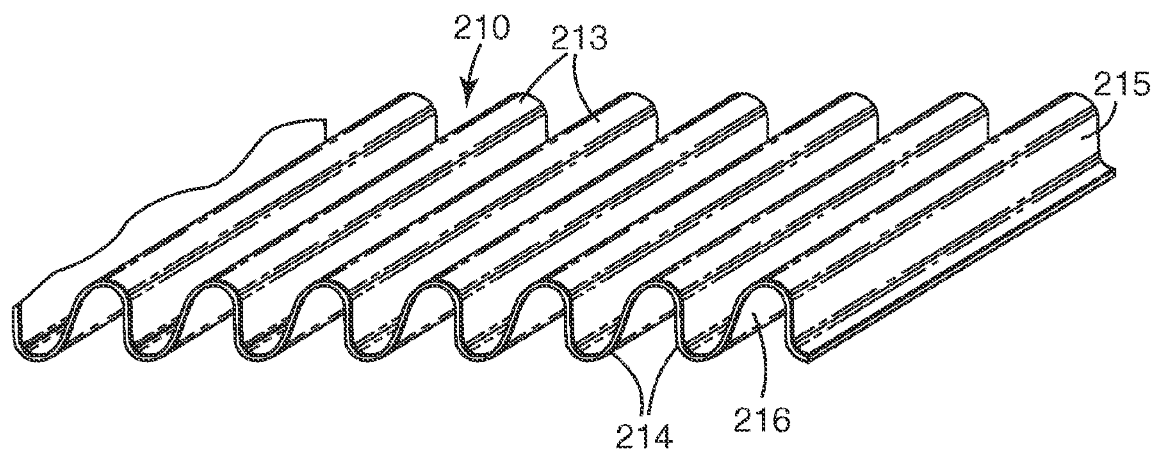
FIG. 22 is a perspective view of the corrugated multilayer optical film discussed in Example 12.
Figure 23:
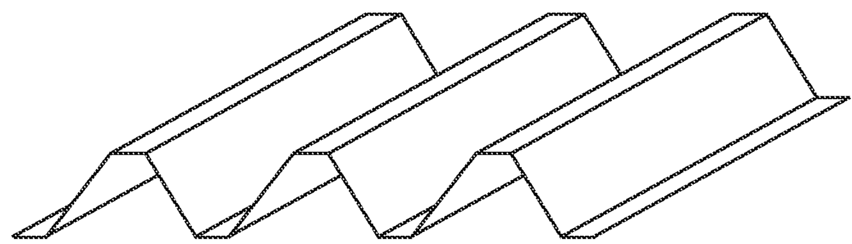
FIG. 23 is a perspective view of the corrugated multilayer optical film discussed in Example 12 with undulations configured differently from those shown in FIG. 22.

The structure 210 that results from the previously described corrugation process is shown in FIG. 22. The undulations may be characterized by arcuate portions 213, valley portions 214, and intermediate portions 215 and 216 which connect the arcuate portions to the valley portions. While the undulations shown in FIG. 22 are sinusoidal in shape, it should be recognized that the corrugation process may create undulations of other shapes, such as shown in FIG. 23, for example. In addition, the corrugates need not extend along the width of the film. Rather, they may extend in any direction in the plane of the film.

In accordance with one aspect of the present invention, in additions to the undulations formed by the corrugation process, the corrugation process also results in variations in the thickness of the film layers. In particular, the ridges 219 of the corrugating members stretch the intermediate portions 215 and 216 of corrugated film 210 so that these portions are thinner than arcuate and valley portions 213 and 214. Because of the variations in thickness of the film, the different portions of the film will reflect light of different wavelengths, producing a noticeable shift in color of the intermediate portions compared to the arcuate and valley portions 213 and 214. This phenomenon, referred to as color or band shifting, occurs because the range of wavelengths reflected by a multilayer optical film is, in part, a function of the physical thickness of the layers in the multilayer optical film.

Optical Characteristics of Corrugated Films

The pre-corrugated film was fabricated to have a uniform thickness within a specified tolerance (typically about ±5%). When held taut and viewed in normal transmission under fluorescent room lighting, the pre-corrugated film appeared to exhibit primarily a single color, for example, cyan. Flexure of the film produced substantial changes in the film color so that a range of colors were visible along the film. That is, the pre-corrugated film exhibited angularly sensitive reflective color filtration. This effect occurs because the film reflects incident light in one wavelength range and transmits light in another wavelength range, with the wavelength ranges of reflection and transmission varying with changes in the angle of incidence of the light. Thus, the particular color that is observed on a given portion of the film may differ from the color observed on another portion of the film because flexure of the film causes light to strike the different portions of film at different angles of incidence. In other words, the number of colors that are observed increases as the number of different planes occupied by various portions of the film increases.

Figure 24:
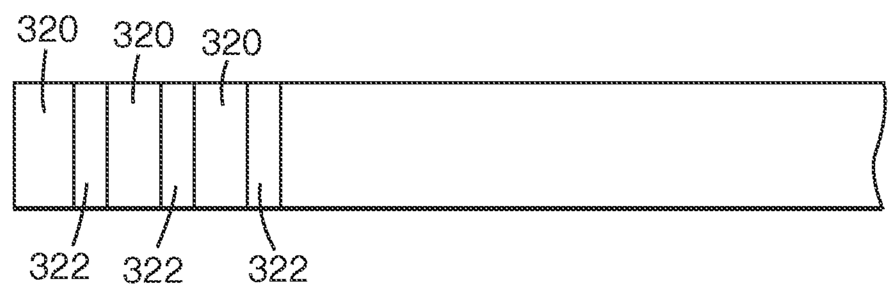
FIG. 24 shows a plan view of a portion of a multilayer optical film after it has undergone a corrugation process such as discussed in Example 12.

FIG. 24 shows an exemplary pattern observed in normal transmission after the film has undergone a corrugation process in accordance with the method of the present invention to provide the film with an undulating variation in thickness. The appearance of the film has changed substantially in comparison to the pre-corrugated film. In contrast to the primarily cyan appearance of the pre-corrugated film (when it is tautly arranged without any flexure so that the number of different planes which reflect light is minimized), the corrugated film displays different colored bands that extend in the cross-web direction. In particular, bands 320 and 322 of alternating color are formed, with bands 20 appearing in one color (e.g., yellow) and bands 322 appearing in another color (e.g., cyan). Bands 320 correspond to intermediate portions 215 and 216 shown in FIG. 22, which have a reduced layer thickness as a result of the corrugation process, and bands 322 correspond to the arcuate and valley portions 213 and 214. In other words, the corrugated film has alternating bands or striations of different colors along its length because of color shifting arising from the thickness variations.

When observing light reflected from the corrugated film, the corrugated film appears to have a greater brilliance in comparison to the pre-corrugated film. This is caused by the increased angularity of the film produced by the corrugation process. The increased angularity increases the number of source locations from which light is directed back to the viewer. In addition, the different portions of the film extend in different planes and light is reflected over a greater range of incident angles, which as previously mentioned, results in different colors of light being observed.

The corrugating process as employed in the present invention will now be further described by the following specific examples.

Example 12(a)

A decorative colored mirror film was made using the corrugation process of the present invention. The pre-creped film was prepared from a coextruded film containing 224 layers made on a sequential flat-film making line by a coextrusion process. This multilayer polymer film was made from polyethylene naphthalate (PEN) (60 wt. % phenol/40 wt. dichlorobenzene) with an intrinsic viscosity of 0.48dl/g available from Eastman Chemical Company and polymethyl methacrylate (PMMA) available from ICI Acrylics under the designation CP82. PETG 6763 provided the outer or "skin" layers. PETG 6763, believed to be a copolyester based on terephthalate as the dicarboxylate and 1,4-cyclohexane dimethanol and ethylene glycol as the diols, is commercially available from Eastman Chemicals Co., Rochester, N.Y. A feedblock method (such as that described by U.S. Pat. No. 3,801,429) was used to generate about 224 layers which were coextruded onto a water chilled casting wheel and continuously oriented by conventional sequential length orienter (LO) and tenter equipment. PEN was delivered to the feedblock by one extruder at a rate of 24.2 Kg/hr and the PMMA was delivered by another extruder at a rate of 19.3 Kg/hr. These meltstreams were directed to the feedblock to create the PEN and PMMA optical layers. The feedblock created 224 alternating layers of PEN and PMMA with the two outside layers of PEN serving as the protective boundary layers (PBLs) through the feedblock. The PMMA melt process equipment was maintained at about 274° C.; the PEN melt process equipment, feedblock, skin-layer modules were maintained at about 274° C.; and the die was maintained at about 285° C. A gradient in layer thickness was designed for the feedblock for each material with the ratio of thickest to thinnest layers being about 1.25.

After the feedblock, a third extruder delivered PETG as skin layers (same thickness on both sides of the optical layer stream) at about 25.8 Kg/hr. Then the material stream passed through a film die and onto a water cooled casting wheel using an inlet water temperature of about 24° C. A high voltage pinning system was used to pin the extrudate to the casting wheel at 3.1 meters/min. The pinning wire was about 0.17 mm thick and a voltage of about 4.9 kV was applied. The pinning wire was positioned manually by an operator about 3-5 mm from the web at the point of contact to the casting wheel to obtain a smooth appearance to the cast web.

The cast web was length oriented with a draw ratio of about 3.1:1 at about 130° C. In the tenter, the film was preheated before drawing to about 135° C. in about 30.9 seconds and then drawn in the transverse direction at about 140° C. to a draw ratio of about 4.5:1, at a rate of about 20% per second. The finished pre-corrugated film had a final thickness of about 0.05 mm.

The pre-corrugated multilayer film was fed into the nip between the corrugating rollers 220 and 221 shown in FIG. 21. The corrugating members had a diameter of about 9.01-9.02 inches, with ridges shaped to form about 7½ corrugations per inch along the length of the resultant corrugated film. Both corrugating members were heated to 250° F. The nip pressure applied between the corrugating members was 50 pounds force per lineal inch (pli), and the line speed was 5 feet per minute (fpm).

The precorrugated multilayer colored mirror film, as observed in normal transmission under fluorescent room lighting, exhibited randomly distributed areas of clear, cyan and blue elongated in the crossweb direction. The resulting corrugated colored mirror film had significantly changed in its visual appearance. As observed in normal transmission under fluorescent room lighting, both the peak and valley portions or regions of the corrugated colored mirror film were cyan in color. The intermediate portions or regions located between the peaks and valleys changed to yellow in color in normal transmission as observed under fluorescent room lighting. It is believed that this observed color change in the connecting regions between the peaks and valleys was due to film thinning during the corrugation process. The caliper of the corrugated colored mirror film in the intermediate regions was measured and found to be thinner than the caliper measured for the peak and valley regions. The caliper of the intermediate regions was also thinner than the caliper of the pre-corrugated multilayer mirror film.

The caliper of the pre-corrugated colored mirror film and the caliper of the intermediate regions between the peaks and valleys of the corrugated colored mirror film were measured in a conventional manner using a manual caliper instrument (Model #293-761, manufactured by Mitutoyo Corporation, 31-19, Shiba5-chome, Minato-ku, Tokyo 108, Japan). The caliper data was obtained by averaging ten measurements randomly chosen from within each film sample. The caliper data for this film is presented below:

| | |
|---|---|
| Thickness of precorrugated colored mirror film: | 1.54 mils (std dev 0.11) |
| Thickness of intermediate region between the peaks and valleys of the corrugated film: | 1.17 mils (std dev 0.33) |

Example 12(b)

A decorative colored mirror film was prepared in a manner similar to that described for Example 12(a) above. The pre-corrugated multilayer colored mirror film 12 was formed from a coextruded film containing 224 layers made on a sequential flat-film making line by a coextrusion process. This multilayer polymer film was made from polyethylene naphthalate (PEN)(60 wt. % phenol/40 wt. % dichlorobenzene)) with an intrinsic viscosity of 0.48 dl/g available from the Eastman Chemical Company and polymethyl methacrylate (PMMA) available from ICI Acrylics under the designation CP82, where PEN provided the outer or "skin" layers. A feedblock method (such as that described by U.S. Pat. No. 3,801,429) was used to generate about 224 layers which were coextruded onto a water chilled casting wheel and continuously oriented by conventional sequential length orienter (LO) and tenter equipment. PEN was delivered to the feedblock by one extruder at a rate of 38.8 Kg/hr and the PMMA was delivered by another extruder at a rate of 30.1 Kg/hr. These meltstreams were directed to the feedblock to create the PEN and PMMA optical layers. The feedblock created 224 alternating layers of PEN and PMMA with the two outside layers of PEN serving as the protective boundary layers (PBL's) through the feedblock. The PMMA melt process equipment was maintained at about 274° C.; the PEN melt process equipment, feedblock, skin-layer modules were maintained at about 274° C.; and the die was maintained at about 285° C. A gradient in layer thickness was designed for the feedblock for each material with the ratio of thickest to thinnest layers being about 1.31.

After the feedblock, a third extruder delivered 0.48 IV PEN as skin layers (same thickness on both sides of the optical layer stream) at about 23.9 Kg/hr. Then the material stream passed through a film die and onto a water cooled casting wheel using an inlet water temperature of about 29° C. A high voltage pinning system was used to pin the extrudate to the casting wheel at 5.2 meters/min. The pinning wire was about 0.17 mm thick and a voltage of about 6.2 kV was applied. The pinning wire was positioned manually by an operator about 3-5 mm from the web at the point of contact to the casting wheel to obtain a smooth appearance to the cast web.

The cast web was length oriented with a draw ratio of about 3.1:1 at about 130° C. In the tenter, the film was preheated before drawing to about 140° C. in about 18 seconds and then drawn in the transverse direction at about 140° C. to a draw ratio of about 4.6:1, at a rate of about 15% per second. The finished pre-corrugated film had a final thickness of about 0.05 mm.

The corrugating members of the corrugating arrangement were shaped to form about 13 corrugations per inch along the length of the corrugated film. Both corrugating members were heated to 250° F., the nip pressure between the corrugating rollers was 50 pli, and the line speed was 15 fpm.

The pre-corrugated film was cyan in color when observed in normal transmission under fluorescent room lighting. The resulting corrugated film had changed in visual appearance. As observed in normal transmission under fluorescent room lighting, the peak and valley regions and the intermediate regions between the peaks and valleys all remained cyan in color, but the intermediate regions exhibited a deeper shade of cyan. Moreover, when observing light reflected from the film, the film appeared much more brilliant than the film described in Example 1, giving the film a visual appearance strikingly different from the film in Example 1. The increased brilliance presumably occurred because of the increased angularity in the film resulting from the formation of the peaks and valleys.

Example 12(c)

The corrugated colored mirror film prepared in Example 12(a) was cut into rolls of film ½ inch in width using a conventional razor blade. A 4⅞ inch diameter confetti bow having 31 loops was then formed from the roll of film. The bow was prepared using a Cambarloc bow machine available from Cambarloc Engineering, Inc. Lebanon, Mo.

Example 12(d)

The corrugated colored mirror film prepared in Example 12(b) was cut into ½ inch width rolls, from which confetti bows were prepared, as described in Example 3.

Example 12(e)

A decorative color mirror film was prepared in a manner similar to that described in Example 12(a). The pre-corrugated multicolored mirror film was formed from a coextruded film containing 224 layers made on a sequential flat-film making line by a coextrusion process. This multilayer polymer film was made from copolyethylene naphthalate (LMPP) comprised of 90 mol % naphthalate and 10 mol % terephathalate as the dicarboxylates and 100% ethylene glycol as the diol with an intrinsic viscosity of 0.48 dl/g and polymethyl methacrylate (PMMA) available from ICI Acrylics under the designation CP71, where LMPP provided the outer or skin layers. A feedblock method (such as that described by U.S. Pat. No. 3,801,429) was used to generate about 224 layers which were coextruded onto a water chilled casting wheel and continuously oriented by conventional sequential length orienter (LO) and tenter equipment. LMPP was delivered to the feedblock by one extruder at a rate of 46.0 Kg/hr and the PMMA was delivered by another extruder at a rate of 35.9 Kg/hr. These meltstreams were directed to the feedblock to create the LMPP and PMMA optical layers.

The feedblock created 224 alternating layers of LMPP and PMMA with the two outside layers of LMPP serving as the protective boundary layers through the feedblock. The PMMA melt process equipment was maintained at about 265° C.; the PEN melt process equipment, feedblock, skin-layer modules were maintained at about 265° C.; and the die was maintained at about 285° C. A gradient in layer thickness was designed for the feedblock for each material with the ratio of thickest to thinnest layers being about 1:2. An axial rod, as described in filed patent application U.S. Ser. No. 09/006,288 (now abandoned), was used to narrow the bandwidth.

After the feedblock, a third extruder delivered 0.48 IV LMPP as skin layers (same thickness on both sides of the optical layer stream) at about 93.2 Kg/hr. Then the material stream passed through a film die and onto a water cooled casting wheel using an inlet water temperature of about 18 C. A high voltage pinning system was used to pin the extrudate to the casting wheel at 6.6 meters/min. The pinning wire was about 0.17 mm thick and a voltage of about 5.6 kV was applied. The pinning wire was positioned manually by an operator about 3-5 mm from the web at the point of contact to the casting wheel to obtain a smooth appearance to the cast web.

The cast web was length oriented with a draw ratio of about 3:3:1 at about 120 C. In the tenter, the film was preheated before drawing to about 125 C in about 14 seconds and then drawn in the transverse direction at about 125 C to a draw ratio of about 4:3:1, at a rate of about 20% per second. The finished pre-corrugated film had a final thickness of about 0.05 mm.

The pre-corrugated film was cyan in color when observed in normal transmission under fluorescent room lighting. The resulting corrugated film when observed in normal transmission under fluorescent lighting exhibited a magenta color at the outside edges of the peaks and valleys while the remaining regions of the film maintained the cyan color.

Example 13

Point Embossed Colored Mirror Film

A decorative colored mirror film was made by point embossing a multilayer colored mirror film using conventional embossing equipment. The input film used for the embossing was a coextruded film containing 224 layers made on a sequential flat-film making line by a coextrusion process. This multilayer polymer film was made from polyethylene naphthalate (PEN) (60 wt. % phenol/40 wt. % dichlorobenzene)) with an intrinsic viscosity of 0.48 dl/g available from the Eastman Chemical Company and polymethyl methacrylate (PMMA) available from ICI Acrylics under the designation CP82. PETG 6763 provided the outer or "skin" layers. PETG 6763, believed to be a copolyester based on terephthalate as the dicarboxylate and 1,4-cyclohexane dimethanol and ethylene glycol as the diols, is commercially available from Eastman Chemicals Co., Rochester, N.Y. A feedblock method (such as that described by U.S. Pat. No. 3,801,429) was used to generate about 224 layers which were coextruded onto a water chilled casting wheel and continuously oriented by conventional sequential length orienter (LO) and tenter equipment. PEN was delivered to the feedblock by one extruder at a rate of 24.2 Kg/hr and the PMMA was delivered by another extruder at a rate of 19.3 Kg/hr. These meltstreams were directed to the feedblock to create the PEN and PMMA optical layers. The feedblock created 224 alternating layers of PEN and PMMA with the two outside layers of PEN serving as the protective boundary layers (PBL's) through the feedblock. The PMMA melt process equipment was maintained at about 274° C.; the PEN melt process equipment, feedblock, skin-layer modules were maintained at about 274° C.; and the die was maintained at about 285° C. A gradient in layer thickness was designed for the feedblock for each material with the ratio of thickest to thinnest layers being about 1.25.

After the feedblock, a third extruder delivered PETG as skin layers (same thickness on both sides of the optical layer stream) at about 25.8 Kg/hr. Then the material stream passed through a film die and onto a water cooled casting wheel using an inlet water temperature of about 24° Celsius. A high voltage pinning system was used to pin the extrudate to the casting wheel at 3.1 meters/min. The pinning wire was about 0.17 mm thick and a voltage of about 4.9 kV was applied. The pinning wire was positioned manually by an operator about 3-5 mm from the web at the point of contact to the casting wheel to obtain a smooth appearance to the cast web.

The cast web was length oriented with a draw ratio of about 3.1:1 at about 130° C. In the tenter, the film was preheated before drawing to about 135° C. in about 30.9 seconds and then drawn in the transverse direction at about 140° C. to a draw ratio of about 4.5:1, at a rate of about 20% per second. The finished film had a final thickness of about 0.05 mm.

The film was passed between two nipped heated embossing rollers. The top embossing roller, which was heated to 250 degrees F., had a raised diamond shaped embossing pattern engraved on its surface. The embossing pattern was designed so that 5% of the surface area of the film would be embossed with the diamond pattern.

The bottom laminating roller had a smooth surface and was heated to 250 degrees F. The nip pressure was 100 pounds force per lineal inch (pli) and the line speed was 5 feet per minute (fpm).

Prior to embossing, the multilayer colored mirror film exhibited randomly distributed areas of clear, cyan, and blue elongated in the crossweb direction, as observed in normal transmission under fluorescent room lighting. The resulting embossed colored mirror film had changed in its visual appearance. As observed in normal transmission under fluorescent room lighting, the embossed areas of the film were magenta in color, while the film in the areas between the embossed regions remained similar in appearance to the pre-embossed film, that is, exhibiting randomly distributed areas of clear, cyan and blue elongated in the crossweb direction. It is believed that this observed color change in the embossed areas of the film compared to the non-embossed areas of the film was due to film thinning that occurred as a result of the embossing process. Cross sectional scanning electron photomicrographs (SEMs) taken of the resulting embossed colored mirror film showed that the thickness of the embossed areas of the film were approximately 63% of the thickness of the non-embossed areas of the film.

The embossed colored mirror film was then slit into ½ inch width rolls using a conventional razor blade slitting method. A 4.875 inch diameter confetti bow having 31 loops was then formed from the roll of film. The bow was prepared using a Cambarloc bow machine (see U.S. Pat. No. 3,464,601) available from Cambarloc Engineering, Lebanon, Mo.

The patents, patent applications, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. An article comprising a multilayer optical film comprising an optical stack comprising a plurality of layers, the layers comprising at least one birefringent polymer and at least one different polymer, wherein the optical stack comprises a strain-induced index of refraction differential along a first in-plane axis and substantially the entire optical stack reflects at least about 85% of light of desired wavelengths that is polarized along the first in-plane axis, and further wherein the thickness of the optical stack varies by at least about 10% or more; and wherein the birefringent polymer is a polyester.

2. The article of claim 1, wherein the thickness of the optical stack varies by at least about 20% or more.

3. The article of claim 1, wherein substantially the entire optical stack reflects at least about 90% of light of desired wavelengths that is polarized along the first in-plane axis.

4. The article of claim 1, wherein the optical stack further comprises a strain-induced index of refraction differential along a second in-plane axis that is perpendicular to the first in-plane axis.

5. The article of claim 1, wherein the optical stack further comprises a first major surface, the first major surface comprising at least one depressed area formed thereon.

6. The article of claim 1, further comprising a rigid substrate attached to the multilayer optical film.

* * * * *